(12) United States Patent
Inoue et al.

(10) Patent No.: US 9,285,574 B2
(45) Date of Patent: Mar. 15, 2016

(54) VARIABLE MAGNIFICATION PROJECTION OPTICAL SYSTEM AND IMAGE PROJECTION APPARATUS

(71) Applicant: KONICA MINOLTA, INC., Tokyo (JP)

(72) Inventors: Kazuhiko Inoue, Sakai (JP); Yusuke Imai, Osaka (JP); Katsuhiro Takamoto, Sakai (JP); Sadanobu Imamura, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/610,559

(22) Filed: Jan. 30, 2015

(65) Prior Publication Data

US 2015/0219884 A1 Aug. 6, 2015

(30) Foreign Application Priority Data

Feb. 4, 2014 (JP) .................................. 2014-019005

(51) Int. Cl.
*G02B 15/14* (2006.01)
*G02B 15/177* (2006.01)
*G02B 13/16* (2006.01)
*G03B 21/14* (2006.01)

(52) U.S. Cl.
CPC .............. *G02B 15/177* (2013.01); *G02B 13/16* (2013.01); *G03B 21/142* (2013.01)

(58) Field of Classification Search
USPC .................................. 359/649–704, 811–830
See application file for complete search history.

(56) References Cited

U.S. PATENT DOCUMENTS

| 6,785,055 | B2 | 8/2004 | Nishikawa et al. | |
|---|---|---|---|---|
| 7,948,688 | B2 * | 5/2011 | Watanabe | G02B 7/102 359/699 |
| 2006/0187556 | A1 * | 8/2006 | Inoko | G02B 15/177 359/680 |
| 2007/0195427 | A1 * | 8/2007 | Sugita | G02B 15/177 359/692 |
| 2011/0013151 | A1 * | 1/2011 | Nagahara | G02B 15/177 353/101 |

FOREIGN PATENT DOCUMENTS

| JP | 2001-108900 | 4/2001 |
|---|---|---|
| JP | 2002-350727 | 12/2002 |
| JP | 2003-015038 | 1/2003 |
| JP | 2008-052174 | 3/2008 |

* cited by examiner

*Primary Examiner* — Mohammed Hasan
(74) *Attorney, Agent, or Firm* — Brinks Gilson & Lione

(57) ABSTRACT

A variable magnification projection optical system includes, in order from a magnification conjugate side to a reduction conjugate side, a first lens group, a second lens group, a third lens group, a fourth lens group, a fifth lens group, a sixth lens group, and an optical stop which is arranged at any position from a front of a lens arranged closest to the magnification conjugate side in the fourth lens group to a front of a lens arranged closest to the magnification conjugate side in the fifth lens group, wherein the fourth lens group is configured to include, in order from the magnification conjugate side, two or more negative lenses and a positive lens, and wherein the following condition expressions (1), (2) and (3) are satisfied:

$|Et/ft| \geq 10$ (1)

$|Ew/fw| \geq 15$ (2)

$0.87 \leq 23\phi_T/23_{WT} \leq 1.15$ (3).

14 Claims, 33 Drawing Sheets

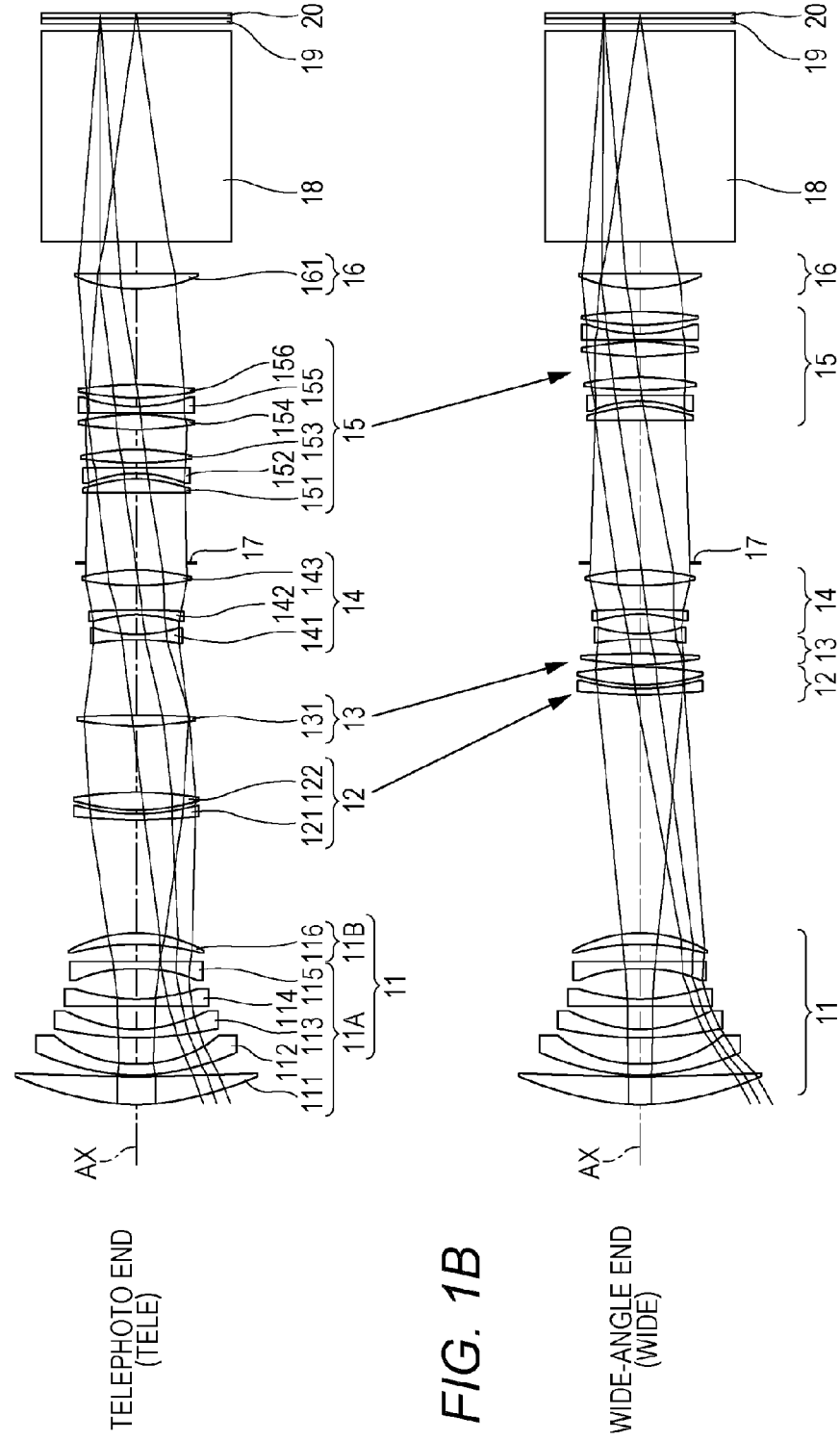

TELEPHOTO END (TELE)

WIDE-ANGLE END (WIDE)

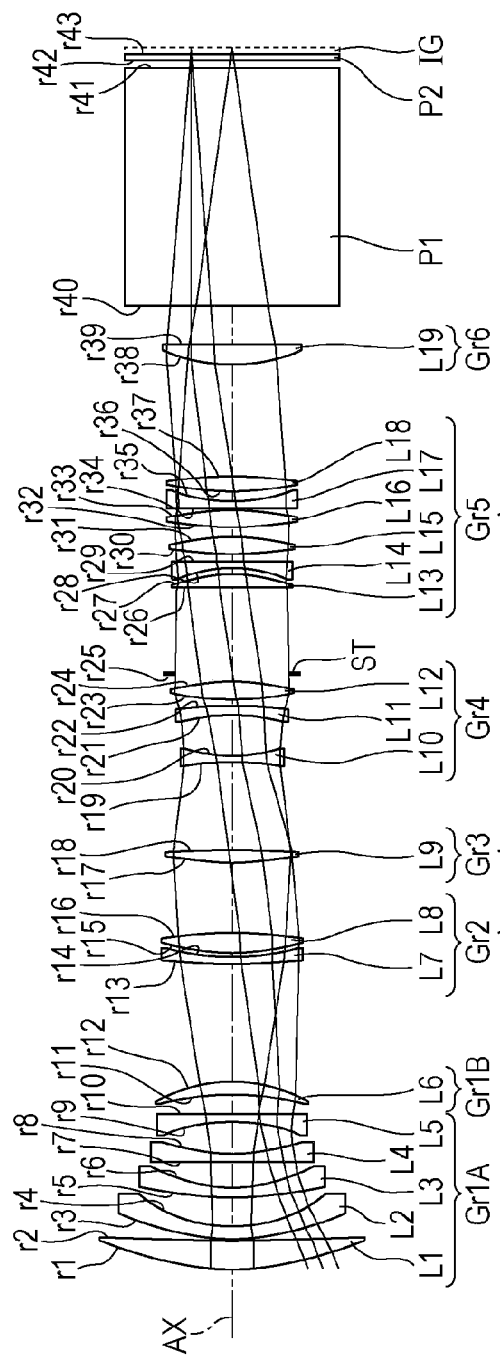
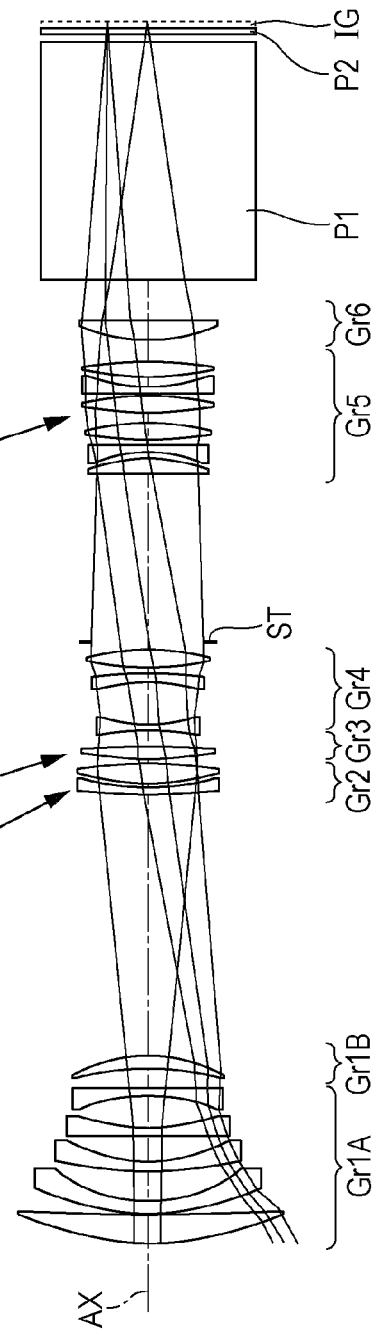
FIG. 6A TELEPHOTO END (TELE)
FIG. 6B WIDE-ANGLE END (WIDE)

TELEPHOTO END (TELE)

WIDE-ANGLE END (WIDE)

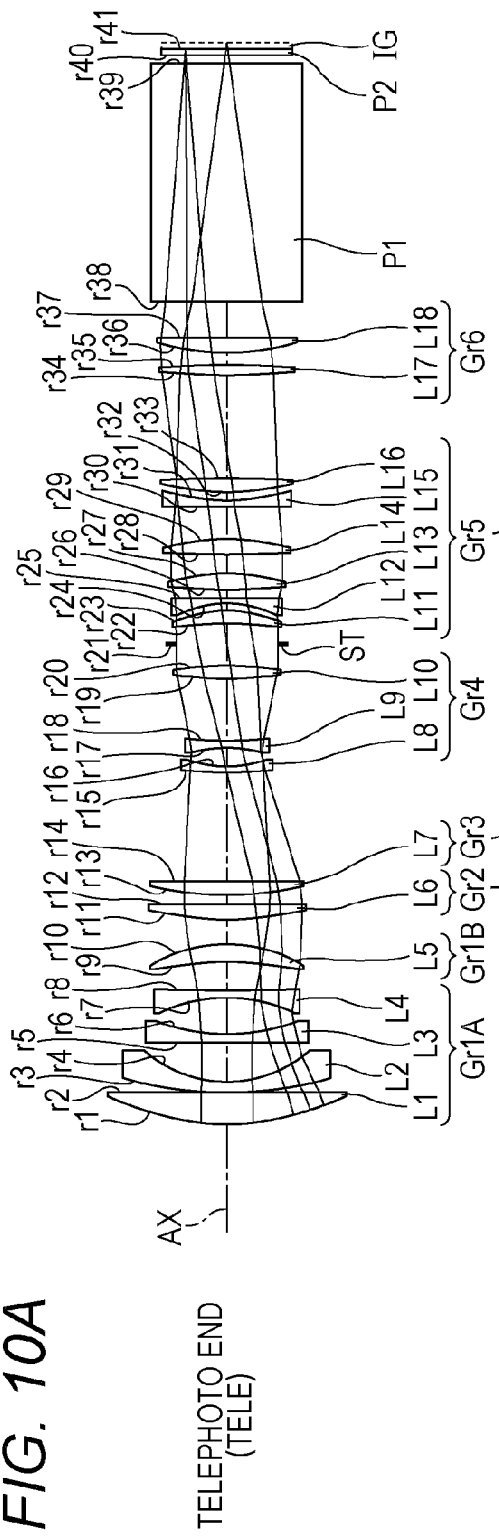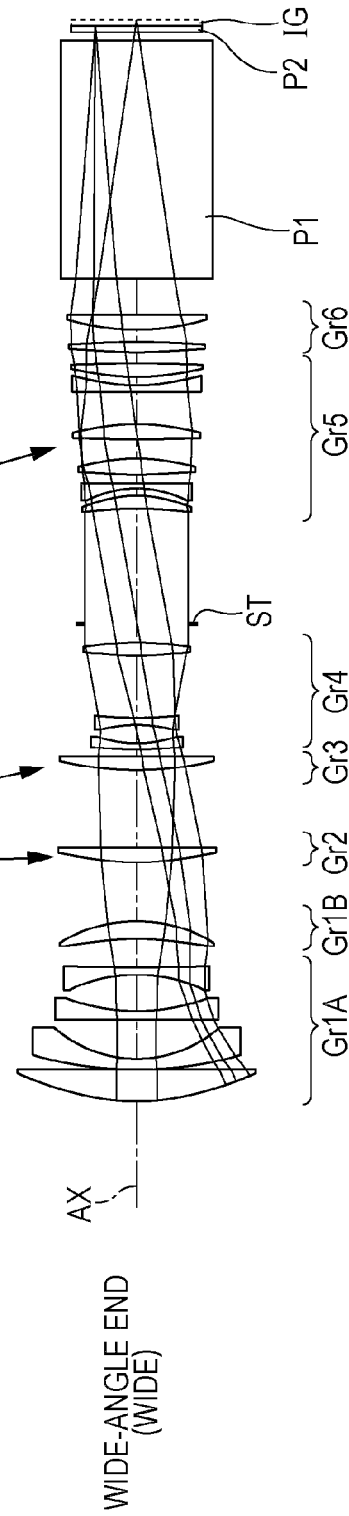

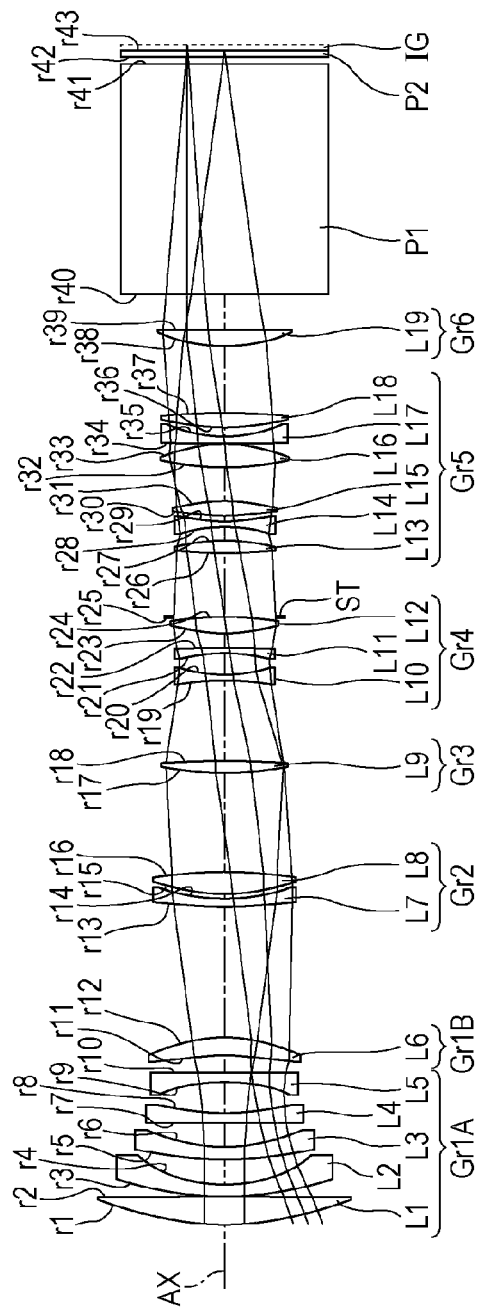
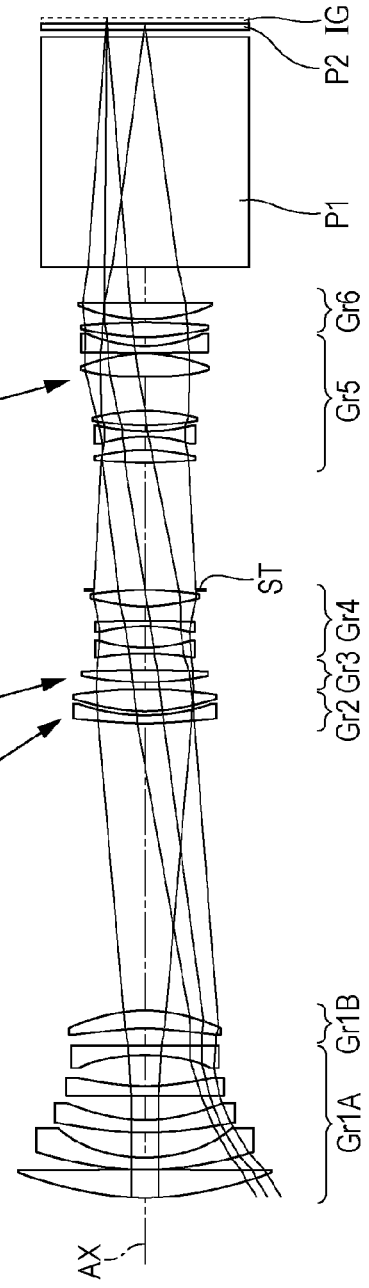
FIG. 12A TELEPHOTO END (TELE)
FIG. 12B WIDE-ANGLE END (WIDE)

SPHERICAL ABERRATION
(SINUSOIDAL CONDITION)

ASTIGMATISM

SPHERICAL ABERRATION
(SINUSOIDAL CONDITION)

ASTIGMATISM

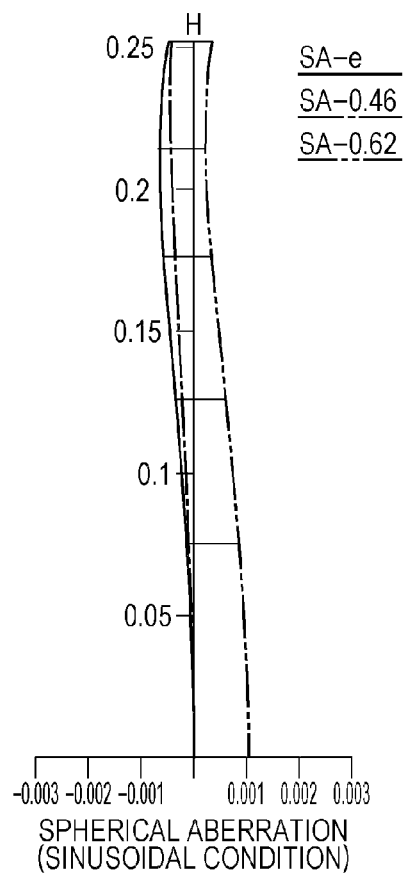
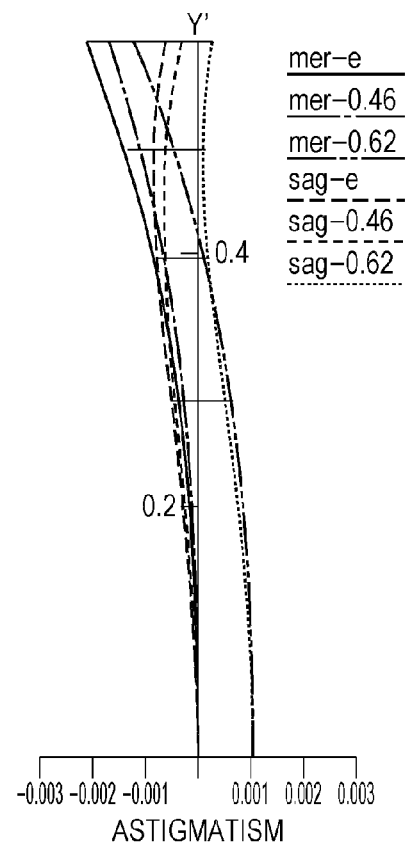
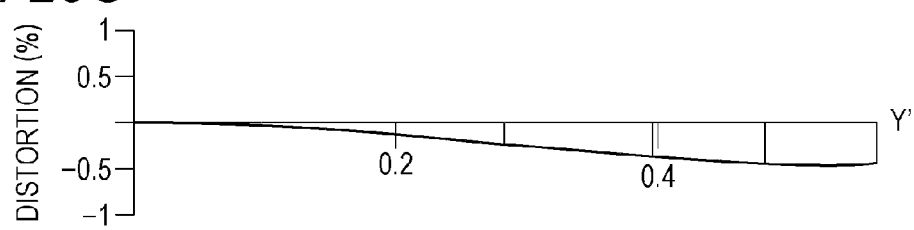
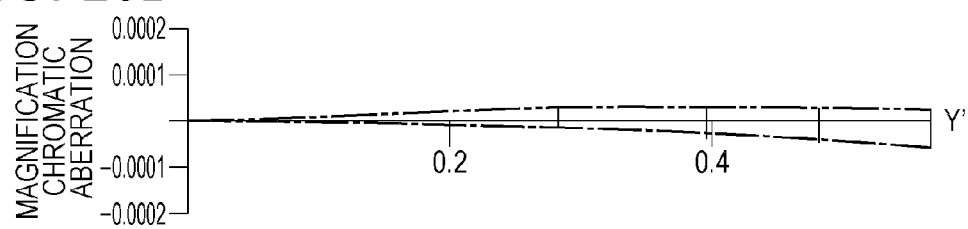

SPHERICAL ABERRATION
(SINUSOIDAL CONDITION)

ASTIGMATISM

SPHERICAL ABERRATION
(SINUSOIDAL CONDITION)

ASTIGMATISM

SPHERICAL ABERRATION
(SINUSOIDAL CONDITION)

ASTIGMATISM

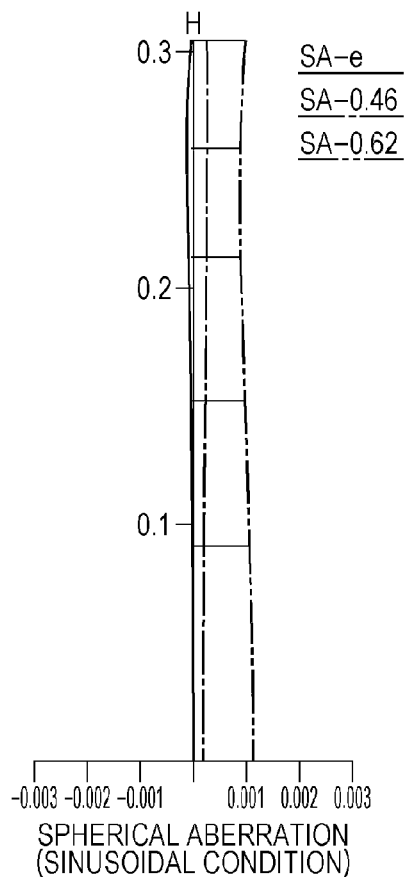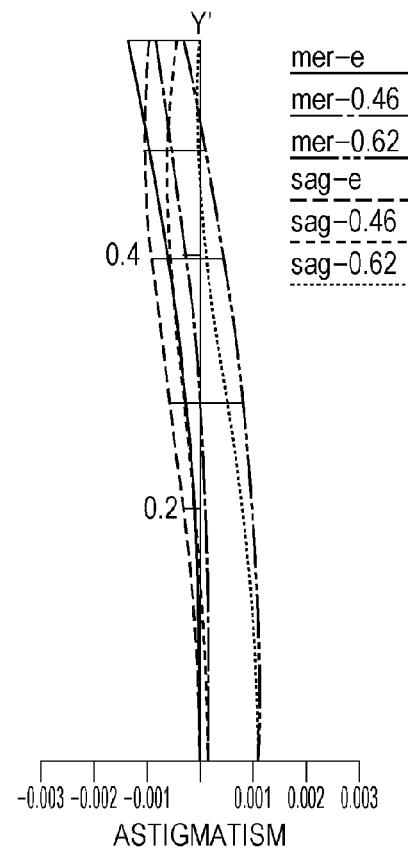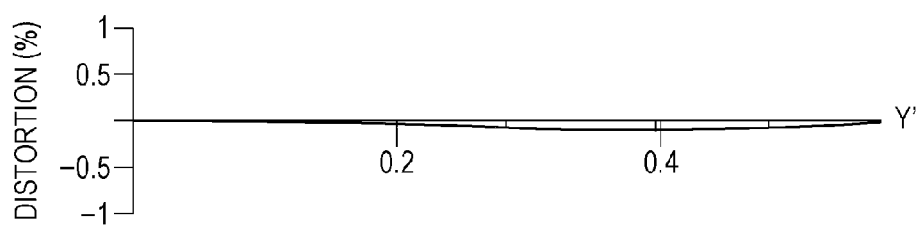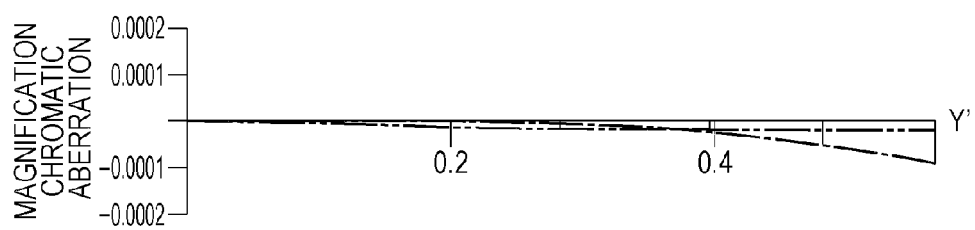

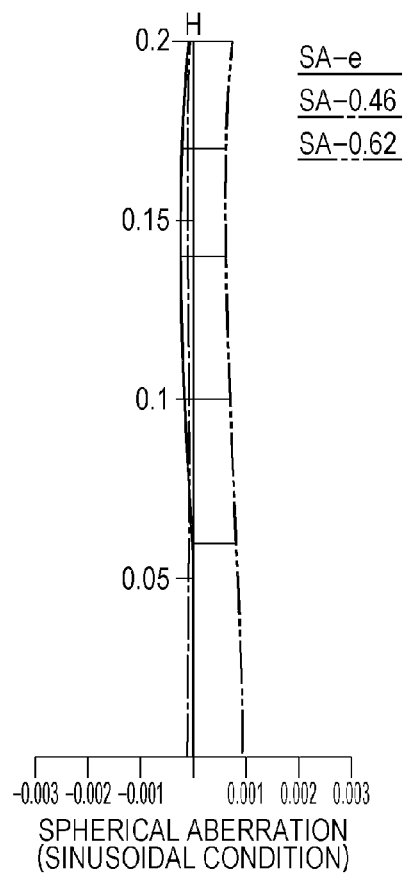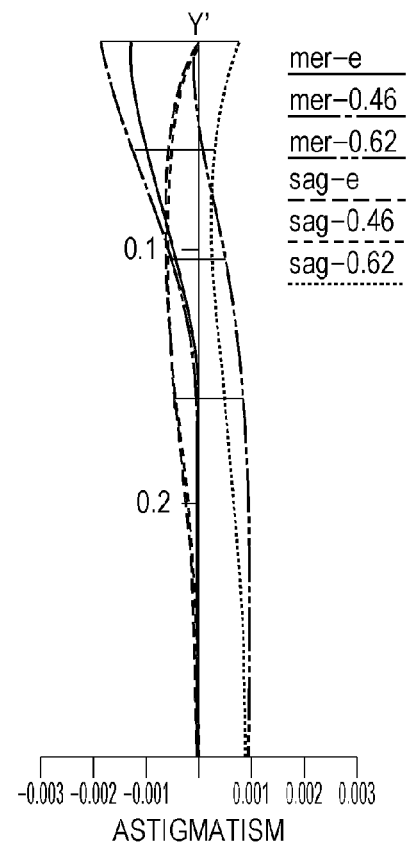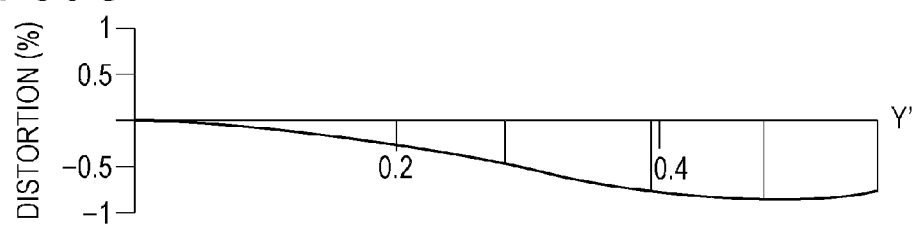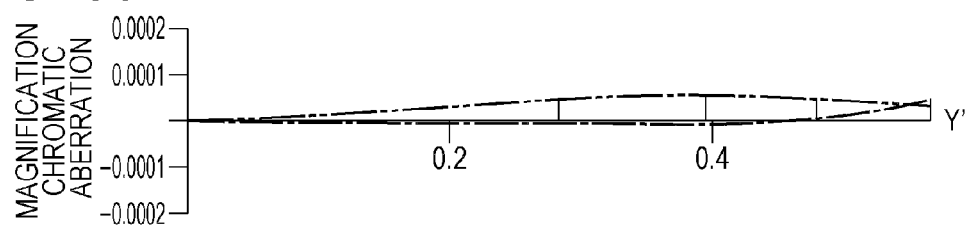

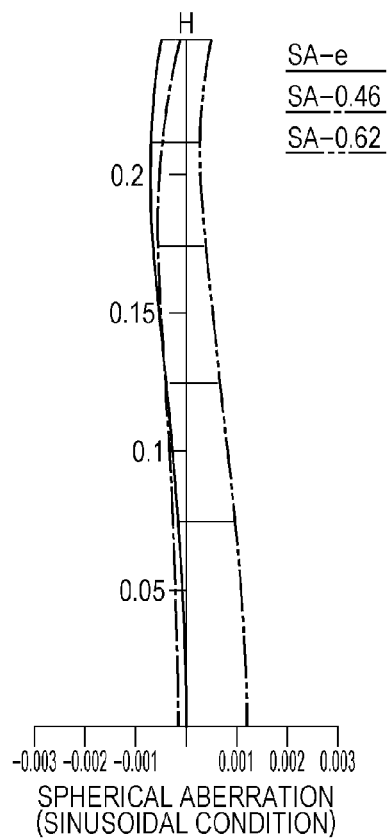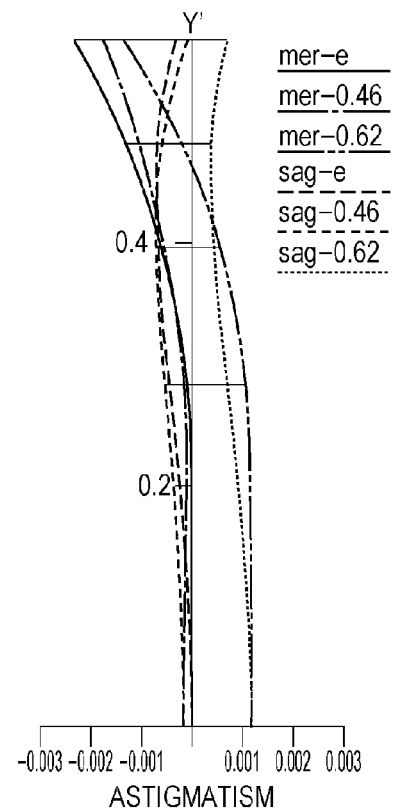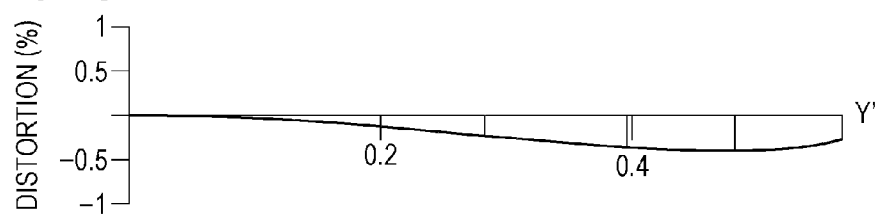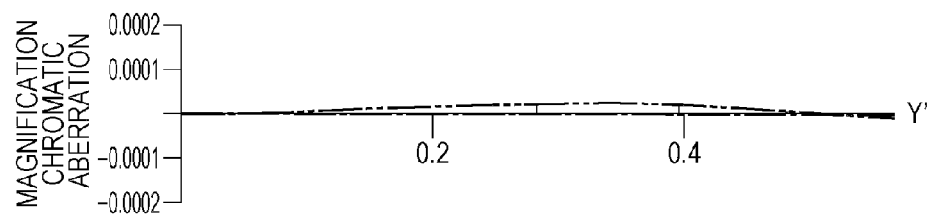

VARIABLE MAGNIFICATION PROJECTION OPTICAL SYSTEM AND IMAGE PROJECTION APPARATUS

The entire disclosure of Japanese Patent Application No. 2014-019005 filed on Feb. 4, 2014 including description, claims, drawings, and abstract are incorporated herein by reference in its entirety.

BACKGROUND OF THE INVENTION

1. Field of the Invention

The present invention relates to a variable magnification projection optical system capable of changing a variable magnification ratio to project a magnified image light formed in an image forming element onto a screen and an image projection apparatus using the variable magnification projection optical system.

2. Description of the Related Art

An image projection apparatus which is generally called a projector is an apparatus which projects a magnified image light formed in an image forming element on a screen. In particular, with respect to image projection apparatuses for cinema, with the spread of digital cinema, miniaturization and high definition of image forming elements are required, and accordingly, miniaturization and high resolution of variable magnification projection optical systems installed in the image projection apparatuses for cinema are also required.

As these variable magnification projection optical systems, there are optical systems disclosed in JP 2001-108900 A, JP 2003-015038 A, JP 2002-350727 A, and JP 2008-052174 A. The projection zoom lens disclosed in JP 2001-108900 A is a projection zoom lens which magnifies a plane image and projects and images the magnified plane image. First to sixth groups having respective negative, positive, positive, negative, positive, and positive refracting powers are arranged in order from the magnification side. During changing of a projection distance, in order to conjugate the plane image with a projection surface, the first group is moved in an optical axis direction, and during changing of magnification, the first group, the fourth group, the sixth group are fixed, and the second group, the third group, and the fifth group are moved in the optical axis direction. A focal length fw of the entire system at the wide-angle end, a back focus bf (value in air), a total lens length OAL (length from the surface of the first group closest to the magnification side to the surface of the sixth group closest to the reduction side), a focal length f3 of the third group, an average value ν6P of Abbe numbers of convex lenses constituting the sixth group, an average value ν4M of Abbe numbers of concave lenses constituting the fourth group, and an average value ν5M of Abbe numbers of concave lenses constituting the fifth group satisfy the condition expressions: $OAL > 90 \cdot bf/fw$, $1.5 < f3/fw < 2.5$, $\nu 6P > 50$, and $(\nu 4M + \nu 5M)/2 < 40$.

The projection zoom lens disclosed in JP 2003-015038 A is a projection zoom lens where, first to sixth groups having the respective refracting powers of negative, positive, positive, negative, positive, and positive are arranged in order from the magnification side, and an aperture stop is arranged between the third and fourth lens groups. During continuously changing of magnification from the wide-angle end to the telephoto end, the first, fourth, and sixth lens groups are fixed, and the second, third, and fifth lens groups are moved on the optical axis. A focal length fw of the entire system at the wide-angle end, a focal length f1 of the first lens group, a back focus Bf when the conjugate point of the magnification side is infinity, and a length L of the entire system satisfy the conditions: $1.4 < Bf/fw$, $1.0 < |f1|/fw < 1.7$, and $6.5 < L/fw < 9.0$.

In addition, the projection zoom lens disclosed in JP 2002-350727 A is a projection zoom lens where six components of first to sixth groups having respective negative, positive, positive, negative, positive, and positive refracting powers are arranged in order from the magnification side, and the projection zoom lens is substantially telecentric at the reduction side. During change of magnification from the telephoto end to the wide-angle end, the third group and the fifth group are moved from the magnification side to the reduction side, and a stop is arranged in the fourth group.

In addition, the zoom lens disclosed in JP 2008-052174 A, is a zoom lens which magnifies and projects display elements and is configured to include, in order from the magnification side, six groups of first to sixth groups. The zoom lens is configured to include, a first group having a negative refracting power, a second group having a positive refracting power and being moved during changing of magnification, a fifth group having a positive refracting power and being moved during changing of magnification, and a sixth group having a positive refracting power and to include a third group having a positive or negative refracting power and being moved during changing of magnification and a fourth group having a negative refracting power which includes a stop or a third group having a negative refracting power which includes a stop and a fourth group having a positive or negative refracting power and being moved during changing of magnification. The sixth group is configured to include one positive lens, and when a distance on an optical axis from a center of a lens surface at the reduction side of the positive lens of the sixth group to a surface of a display element arranged perpendicular to the optical axis is denoted by Bf, when a radius of curvature of the positive lens of the sixth group at the magnification side is denoted by CR1, and when a minimum F value of the zoom lens is denoted by F, a condition expression $1.35 \leq Bf/CR1 \times F \leq 2.00$ is satisfied. In the case where the third group has a negative refracting power and includes a stop and the fourth group has a positive or negative refracting power and is moved during changing of magnification, at least one of the positive lenses constituting the fourth group and the fifth group is configured with a material satisfying $nd > 1.58 \nu d > 59$, and herein a refractive index with respect to d-line (wavelength of 587.56 nm) is denoted by nd and an Abbe number with respect to d-line (wavelength of 587.56 nm) is denoted by νd, and in the case where fourth group has a negative refracting power and includes a stop and the third group has a positive or negative refracting power and is moved during changing of magnification, at least one of the positive lenses constituting the fifth group is configured with a material satisfying $nd > 1.58 \nu d > 59$. In addition, in the case where the third group has a negative refracting power and includes a stop and the fourth group has a positive or negative refracting power and is moved during changing of magnification, a composite focal length of the fourth group and the fifth group at the time of the zoom lens being at the wide-angle end is denoted by fxw, and in the case where the fourth group has a negative refracting power and includes a stop and the third group has a positive or negative refracting power and is moved during changing of magnification, a focal length of the fifth group is denoted by fxw. In the case where the zoom lens is at the wide-angle end, a focal length is denoted by fw. In this case, a condition expression $1.70 \leq fxw/fw \leq 4.80$ is satisfied.

However, in order to achieve high resolution, suppression of various types of aberration such as spherical aberration, image surface curvature, axial chromatic aberration, and magnification chromatic aberration is required. However, as the variable magnification ratio is increased, the various types of aberration are greatly changed between the telephoto end and the wide-angle end, so that there is a circumstance that the aforementioned requirement is not compatible with the high variable magnification ratio. Therefore, the high resolution and the high variable magnification ratio are difficult to be compatible with each other.

JP 2001-108900 A, JP 2003-015038 A, JP 2002-350727 A, and JP 2008-052174 A are reviewed from this point of view. In the zoom lenses disclosed in JP 2001-108900 A and JP 2003-015038 A, it is considered that, if the high resolution is achieved, the configuration of the fourth lens group including a stop becomes inappropriate, so that it is not possible to effectively suppress the spherical aberration. In addition, in the zoom lenses disclosed in JP 2002-350727 A and JP 2008-052174 A, it is considered that, if the high resolution is achieved, the chromatic aberration of the fourth lens group is insufficiently suppressed, so the chromatic aberration at the wide-angle end and the telephoto end are increased.

SUMMARY OF THE INVENTION

The present invention has been made in light of the foregoing, and an object thereof is to provide a variable magnification projection optical system capable of sufficiently suppressing various types of aberration such as spherical aberration, image surface curvature, axial chromatic aberration, and magnification chromatic aberration and implementing a higher resolving power and an image projection apparatus using the variable magnification projection optical system.

In order to solve the above-described technical problems, the present invention provides a variable magnification projection optical system and an image projection apparatus having the following configurations. In addition, terms used hereinafter in the description of the specification are defined as follows.

(a) A refractive index $n_d$ is a refractive index of d-line (wavelength of 587.56 nm).

(b) An Abbe number is an Abbe number vd defined by $vd=(n_d-1)/(n_F-n_C)$ when refractive indexes of d-line, F-line (wavelength of 486.13 nm), and C-line (wavelength of 656.28 nm) are denoted by $n_d$, $n_F$, and $n_C$ respectively, and the Abbe number is denoted by vd.

(c) $\theta_{gF}$ is defined as an indicator representing abnormal dispersibility. When a refractive index of g-line (wavelength of 435.84 nm) is denoted by $n_g$, the $\theta_{gF}$ is defined by the following expression.

$$\theta_{gF}=(n_g-n_F)/(n_F-n_C)$$

In addition, $\Delta\theta_{gF}$ is defined as an indicator representing by which degree the abnormal dispersibility is deviated from that of a standard glass material. The $\Delta\theta_{gF}$ is defined by the following expression.

$$\Delta\theta_{gF}=\theta_{gF}-(0.6438-0.001682\times vd)$$

(d) With respect to a lens, in the case where terms of "concave", "convex", or "meniscus" are used, these terms represent a shape of the lens in the vicinity of an optical axis (in the vicinity of the center of the lens).

(e) A refracting power (optical power, a reciprocal of a focal length) of each single lens constituting a cemented lens represents a power in the case where both sides of the lens surfaces of the single lens are air.

(f) Since a resin material used for a composite aspherical lens has only an auxiliary function for a substrate glass material, the composite aspherical lens is not treated as an independent optical member but it is treated equally as the case where a substrate glass material has an aspherical surface. The number of lenses is also treated to be one. In addition, the refractive index of the lens is also set to be a refractive index of the glass material for the substrate. The composite aspherical lens is a lens having an aspherical shape formed by applying a thin resin material on the glass material for the substrate.

To achieve the abovementioned object, according to an aspect, a variable magnification projection optical system reflecting one aspect of the present invention comprises, in order from a magnification conjugate side to a reduction conjugate side, a first lens group having a totally negative refracting power and being stationary during changing of magnification, a second lens group having a totally positive refracting power and being movable during changing of magnification, a third lens group having a totally positive refracting power and being movable during changing of magnification, a fourth lens group having a totally negative refracting power and being stationary or movable during changing of magnification, a fifth lens group having a totally positive refracting power and being movable during changing of magnification, a sixth lens group having a totally positive refracting power and being stationary during changing of magnification, and an optical stop which is arranged at any position from a front of a lens arranged closest to the magnification conjugate side in the fourth lens group to a front of a lens arranged closest to the magnification conjugate side in the fifth lens group, wherein the fourth lens group is configured to include, in order from the magnification conjugate side, two or more negative lenses and a positive lens, and wherein the following condition expressions (1), (2) and (3) are satisfied.

$$|E_T/f_T|\geq 10 \tag{1}$$

$$|E_W/f_W|\geq 15 \tag{2}$$

$$0.87\leq\phi_{23T}/\phi_{23W}\leq 1.15 \tag{3}$$

wherein, $E_T$ is a paraxial exit pupil position at the telephoto end, $E_W$ is a paraxial exit pupil position at the wide-angle end, $f_T$ is a focal length at the telephoto end, $f_W$ is a focal length at the wide-angle end, $\phi_{23T}$ is a composite refracting power of the second and third lens groups at the telephoto end, and $\phi_{23W}$ is a composite refracting power of the second and third lens groups at the wide-angle end.

In addition, preferably, in the above-described variable magnification projection optical system, during changing of magnification from the telephoto end to the wide-angle end, the third and fifth lens groups are moved from the magnification conjugate side to the reduction conjugate side.

The variable magnification projection optical system is an optical system where six groups are configured to be aligned in order of negative, positive, positive, negative, positive, and positive from the magnification conjugate side to the reduction conjugate side. In the optical system, in the case where the third and fifth lens groups are moved from the magnification conjugate side to the reduction conjugate side during changing of magnification from the telephoto end to the wide-angle end, the third lens group having a positive refracting power approaches the fourth lens group closer to the wide-angle end than to the telephoto end, and on the contrary, the fifth lens group having a positive refracting power approaches the fourth lens group closer to the telephoto end than to the wide-angle end. Therefore, in the variable magnification projection optical system, at both of the telephoto end and the wide-angle end, the lens groups having positive refracting powers are arranged in the vicinity of the optical stop. In general, if the positive refracting power of the lens group arranged in the vicinity of the optical stop is increased, the optical system tends to have spherical aberration in the "under" direction. If the spherical aberration is insufficiently corrected, the resolving power of the on-axis light is decreased. However, in the variable magnification projection optical system, the fourth lens group close to the optical stop consecutively includes negative lenses, so that the spherical aberration is able to be strongly corrected in the "over" direction. As a result, it is possible to achieve high resolving power.

In addition, the condition expression (1) represents a condition of a paraxial exit pupil position with respect to a focal length at the telephoto end, the condition expression (2) represents a condition of a paraxial exit pupil position with respect to a focal length at the wide-angle end, and the condition expressions (1) and (2) represent that telecentricity is secured. If the values are smaller than the lower limit values of the condition expressions (1) and (2), since an angle of off-axis light is increased, reflection/transmission efficiency at the time of performing color synthesis by a dichroic prism or reflection/transmission efficiency by a TIR (Total Internal Reflection) prism is deteriorated. Therefore, it is not preferred.

In addition, the condition expression (3) represents a condition of the telephoto end to the wide-angle end in the composite refracting power of the second and third lens groups and represents that the composite refracting power of the second and third lens groups is substantially equal at the telephoto end and the wide-angle end. If the value is larger than the upper limit value of the condition expression (3) or smaller than the lower limit value thereof, the variable magnification projection optical system is able to suppress variation of the image plane at the telephoto end and the wide-angle end, and thus it is preferred. However, in the case where the entire first lens group is used as a focusing group, the variable magnification projection optical system has a configuration having a high error sensitivity and is easily affected by manufacturing errors, and focusing performance is not stabilized (not easily focused) during focus manipulation (during focusing), and thus, it is not preferred. Particularly, since a projector is generally configured so that the entire first lens group is used as a focusing group, it is preferable that the variable magnification projection optical system satisfies the condition expression (3).

In addition, in another aspect, in the above-described variable magnification projection optical system, at least one of the negative lenses included in the fourth lens group preferably satisfies the following condition expression (4), and the entire negative lenses included in the fourth lens group preferably satisfy the following condition expression (5).

$$0.003 \leq \Delta\theta_{gF} \leq 0.055 \quad (4)$$

$$-0.035 \leq (\Sigma(\Delta\theta_{gF4i} \times \phi_{4i}))/\phi_W \leq -0.001 \quad (5)$$

wherein, $\Delta\theta_{gF4i}$ is $\Delta\theta_{gF}$ of the i-th negative lens from the magnification conjugate side which is included in the fourth lens group. Herein, $\Delta\theta_{gF} = \theta_{gF} - (0.06438 - 0.01682 \times vd)$, $\theta_{gF} = (n_g - n_F)/(n_F - n_C)$, and vd is an Abbe number. In addition, $\phi_{4i}$ is a refracting power of the i-th negative lens from the magnification conjugate side which is included in the fourth lens group, and $\phi_W$ is a composite refracting power of the entire optical system at the wide-angle end.

In addition, in another aspect, in the above-described variable magnification projection optical systems, at least one of the negative lenses included in the fourth lens group preferably satisfies the following condition expression (6), and the entire negative lenses included in the fourth lens group preferably satisfy the following condition expression (7).

$$0.03 \leq \Delta\theta_{gF} \leq 0.055 \quad (6)$$

$$-0.035 \leq (\Sigma(\Delta\theta_{gF4i} \times \phi_{4i}))/\phi_W \leq -0.01 \quad (7)$$

In a projection optical system, the chromatic aberration needs to be well corrected, and in the variable magnification projection optical system, the axial chromatic aberration and the spherical aberration are able to be corrected. In general, since an imaging optical system has a positive refracting power as the entire system, the refracting power with respect to light having a relatively short wavelength tends to be larger than the refracting power with respect to light having a relatively long wavelength, so that the axial chromatic aberration occurs. In addition, since the refractive index of a lens varies with the wavelength, irregularity according to the wavelength occurs in the spherical aberration occurring due to light beams passing through the peripheries of the lens. On the contrary, if a negative lens having abnormal dispersibility is arranged in the vicinity of an optical stop, a focal position of the light having a short wavelength is moved to the "over" side, so that it is possible to correct the axial chromatic aberration. In addition, as the wavelength of the light passing through the peripheries of the negative lens having the abnormal dispersibility becomes shorter, the effect that the spherical aberration becomes "over" is able to be obtained. Therefore, it is also possible to correct the irregularity of the spherical aberration according to the wavelength.

Herein, the condition expressions (4) and (6) define the magnitude of the abnormal dispersibility. In addition, each of the condition expressions (5) and (7) defines a sum of the values obtained by multiplying the respective refracting powers with the abnormal dispersibilities of the respective negative lenses included in the fourth lens group. As the value is decreased, the abnormal dispersibility of the negative lens becomes strong. Therefore, the variable magnification projection optical system satisfies the condition expressions (4) and (5), and the fourth lens group arranged in the vicinity of the optical stop includes the negative lens having the abnormal dispersibility, so that it is possible to suppress the axial chromatic aberration and the irregularity of the spherical aberration according to the wavelength. Similarly, the variable magnification projection optical system satisfies the condition expressions (6) and (7), and the fourth lens group arranged in the vicinity of the optical stop includes the negative lens having the abnormal dispersibility, so that it is possible to suppress the axial chromatic aberration and the irregularity of the spherical aberration according to the wavelength. Particularly, the condition expressions (6) and (7) are satisfied, so that it is possible to achieve higher resolving power.

In addition, in another aspect, in the above-described variable magnification projection optical systems, lenses included in the fifth lens group preferably satisfy the following condition expressions (8) and (9).

$$0.025 \leq (\Sigma(\Delta\theta_{gF5i} \times \phi_{5i}))/\phi_W \leq 0.065 \quad (8)$$

$$0.8 \leq d_{z5}/f_W \leq 1.65 \quad (9)$$

wherein, $\Delta\theta_{gF5i}$ is $\Delta\theta_{gF}$ of the i-th lens from the magnification conjugate side which is included in the fifth lens group, $\phi_{5i}$ is a refracting power of the i-th lens from the magnification conjugate side which is included in the fifth lens group, and $d_{z5}$ is a movement amount of the fifth lens group from the magnification conjugate side to the reduction conjugate side during changing of magnification from the telephoto end to the wide-angle end.

In addition, in another aspect, in the above-described variable magnification projection optical systems, lenses included in the fifth lens group preferably satisfy the following condition expressions (10) and (11).

$$0.035 \leq (\Sigma(\Delta\theta_{gF5i} \times \phi_{5i}))/\phi_W \leq 0.045 \quad (10)$$

$$1 \leq d_{z5}/f_W \leq 1.65 \quad (11)$$

In general, in a variable magnification optical system, the magnification chromatic aberration between the wide-angle end and the telephoto end swings at the plus side and the minus side, in other words, the difference in the magnification chromatic aberration between the wide-angle end and the telephoto end is large, so that the performance at the wide-angle end and the performance at the telephoto end are not compatible to each other, and the balance of the performance is lost between the wide-angle end and the telephoto end.

Herein, each of the condition expressions (8) and (10) defines a sum of the values obtained by multiplying the respective refracting powers with the abnormal dispersibilities of the respective negative lenses included in the fifth lens group. As the value is decreased, the abnormal dispersibility of the negative lens becomes strong. Therefore, as each value of the condition expressions (8) and (10) is increased, the abnormal dispersibility of the positive lens goes to the Krutz side and the abnormal dispersibility of the negative lens goes to the Lange side. Therefore, with respect to the lenses, the magnification chromatic aberration is able to be biased to the minus direction. The light beam passing through the inside of the fifth lens group passes at a high position from the optical axis closer to the wide-angle end than to the telephoto end, and the magnification chromatic aberration at the wide-angle end is larger than the magnification chromatic aberration at the telephoto end and is biased to the minus direction. Therefore, the condition expression (8) or (10) is satisfied, so that it is possible to reduce the difference in the magnification chromatic aberration between the wide-angle end and the telephoto end. In addition, each of the condition expressions (9) and (11) defines a movement amount of the fifth lens group during changing of magnification. As the movement amount of the fifth lens group is increased, the height of the light beam passing through the inside of the lens varies at the telephoto end and the wide-angle end. Therefore, the condition expression (9) or (11) is satisfied, so that it is possible to effectively reduce the difference in the magnification chromatic aberration.

In this manner, in each of the variable magnification projection optical systems satisfies the condition expressions (8) and (10) or satisfies the condition expressions (9) and (11), and the glass material having the abnormal dispersibility is effectively used for the fifth lens group which is moved during changing of magnification. Therefore, the variation of the magnification chromatic aberration according to the changing of magnification is suppressed, so that it is possible to reduce the difference in the magnification chromatic aberration at the telephoto end and the wide-angle end.

In addition, in another aspect, in the above-described variable magnification projection optical systems, the first lens group preferably includes one or more negative lens satisfying the following condition expression (12).

$$0.03 \leq \Delta\theta_{gF} \leq 0.055 \quad (12)$$

Although the difference in the magnification chromatic aberration at the telephoto end and the wide-angle end is suppressed by moving the fifth lens group using the lens having the abnormal dispersibility during changing of magnification, the difference is not necessarily 0. Therefore, the variable magnification projection optical system according to the embodiment employs the negative lens satisfying the condition expression (12) and having the abnormal dispersibility as the first lens group, so that it is possible to further suppress the difference in the magnification chromatic aberration.

In addition, in another aspect, in the above-described variable magnification projection optical systems, the first to fourth lens groups preferably satisfy the following condition expressions (13) and (14).

$$|\phi_{14T}/\phi_T| \leq 0.3 \quad (13)$$

$$|\phi_{14W}/\phi_W| \leq 0.3 \quad (14)$$

wherein, $\phi_{14T}$ is a composite refracting power of the first to fourth lens groups at the telephoto end, and $\phi_{14W}$ is a composite refracting power of the first to fourth lens groups at the wide-angle end.

The condition expressions (13) and (14) define afocal properties. A combined system of the first to fourth lens groups arranged from the optical stop in the magnification conjugate side is substantially afocal, so that the width of light flux between the fourth lens group and the fifth lens group are substantially parallel along the optical axis direction. Therefore, since the change in the F number according to the movement of the fifth lens group does not easily occur, in the variable magnification projection optical system, it is possible to suppress the variation of the F number at the telephoto end and the wide-angle end during changing of magnification.

In addition, in another aspect, in the above-described variable magnification projection optical systems, the first lens group is preferably divided into a plurality of sub lens groups during focusing, and at least one lens group of the plurality of sub lens groups is preferably moved in the optical axis direction during focusing, so that focusing is performed. In addition, in another aspect, in the above-described variable magnification projection optical system, the plurality of sub lens groups preferably include a 1A-th sub lens group having a totally negative refracting power and a 1B-th sub lens group, and the 1A-th and 1B-th sub lens groups are preferably moved during focusing so as to have different loci. In addition, in another aspect, in the above-described variable magnification projection optical system, the plurality of sub lens groups preferably include a 1A-th lens group having a totally negative refracting power which is movable during focusing and a 1B-th lens group which is stationary during the focusing.

Each of the variable magnification projection optical systems has a configuration having a low error sensitivity and is not easily affected by manufacturing errors, and focusing performance is stabilized (easily focused) during focus manipulation (during focusing). Particularly, the 1A-th sub lens group and the 1B-th sub lens group are moved so as to have different loci, so that it is possible to widen a focus range (distance range where the focusing is able to be performed). In addition, the 1B-th sub lens group is stationary, so that the configuration becomes simple and the focusing performance is particularly stabilized.

In addition, in another aspect, in the above-described variable magnification projection optical systems, the second lens group is preferably configured to include, in order from the magnification conjugate side to the reduction conjugate side, one or more negative lenses and one or more positive lenses, and the following condition expression (15) is preferably satisfied.

$$1.8 \leq d_{Z2}/f_W \leq 2.5 \quad (15)$$

wherein, $d_{Z2}$ is a movement amount of the second lens group from the magnification conjugate side to the reduction conjugate side during changing of magnification from the telephoto end to the wide-angle end.

In the above-described variable magnification projection optical system, the variation of the light beam passing position of the on-axis light is smaller at the reduction conjugate side than at the optical stop during changing of magnification. Therefore, the range of the axial chromatic aberration during changing of magnification occurring at the rear group may be allowed to be smaller than that at the optical stop. However, in the entire system of the variable magnification projection optical system, the difference in the axial chromatic aberration during changing of magnification is not necessarily small. Therefore, in the variable magnification projection optical system, the movement amount of the second lens group is set so that the condition expression (15) is satisfied, so that it is possible to suppress the variation of the light beam passing position of the on-axis light in the so-called variator group which greatly contributes to the change of magnification, and it is possible to allow the difference in the axial chromatic aberration during changing of magnification to be small.

In addition, in another aspect, in the above-described variable magnification projection optical systems, the following condition expressions (16) and (17) are preferably satisfied.

$$f_T/f_W \geq 1.45 \quad (16)$$

$$\omega_W \geq 26.5 \quad (17)$$

wherein, $\omega_W$ is a half angle of view at the wide-angle end.

In the configuration of the related art, in the case where the condition expression (16) is satisfied, if various types of aberration such as spherical aberration, image surface curvature, axial chromatic aberration, and magnification chromatic aberration are suppressed, the half angle of view $\omega_W$ at the wide-angle end is not allowed to be set to be large. On the other hand, in the configuration of the related art, in the case where the condition expression (17) is satisfied, if various types of aberration such as spherical aberration, image surface curvature, axial chromatic aberration, and magnification chromatic aberration are suppressed, the variable magnification ratio is not allowed to be set to be large. However, in the above-described variable magnification projection optical system, since the condition expressions (1) to (15) are appropriately satisfied, various types of aberration can be suppressed as described above. Even in the case where the condition expressions (16) and (17) are satisfied, in the above-described variable magnification projection optical system, it is possible to implement high magnification and a wide angle of view (wide angle) while suppressing the various types of aberration such as spherical aberration, image surface curvature, axial chromatic aberration, and magnification chromatic aberration.

In addition, according to another aspect of the present invention, an image projection apparatus preferably includes an image forming element which forms image light and a projection optical system which magnifies and projects the image light formed in the image forming element, and the projection optical system is preferably one of the above-described variable magnification projection optical systems.

In the image projection apparatus, it is possible to sufficiently suppress various types of aberration such as spherical aberration, image surface curvature, axial chromatic aberration, and magnification chromatic aberration and implement a higher resolving power.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIGS. 1A and 1B are schematic lens cross-sectional diagrams illustrating a configuration for describing a variable magnification projection optical system according to an embodiment;

FIGS. 6A and 6B are cross-sectional diagrams illustrating lens arrangement of a variable magnification projection optical system according to Example 2;

FIGS. 10A and 10B are cross-sectional diagrams illustrating lens arrangement of a variable magnification projection optical system according to Example 4;

FIGS. 12A and 12B are cross-sectional diagrams illustrating lens arrangement of a variable magnification projection optical system according to Example 5;

FIGS. 20A to 20D are aberration graphs at the intermediate point of the variable magnification projection optical system of Example 2;

FIGS. 28A to 28D are aberration graphs at the telephoto end of the variable magnification projection optical system of Example 5;

FIGS. 30A to 30D are aberration graphs at the wide-angle end of the variable magnification projection optical system of Example 5;

FIGS. 32A to 32D are aberration graphs at the intermediate point of the variable magnification projection optical system of Example 6.

DESCRIPTION OF THE PREFERRED EMBODIMENTS

Figure 2A:
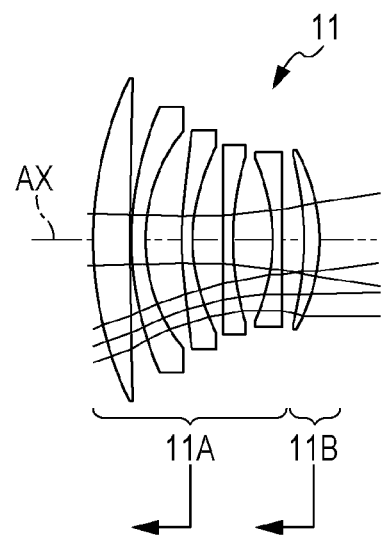
FIGS. 2A and 2B are diagrams for describing operations of a first lens group of a first aspect during focusing of the variable magnification projection optical system according to the embodiment.

Hereinafter, an embodiment of the present invention will be described with reference to the drawings. However, the scope of the invention is not limited to the illustrated examples. In addition, in each figure, components designated with the same reference numerals denote the same components, and the description thereof will be appropriately omitted. In addition, the number of lens constituents of a cemented lens is not 1 as the entire cemented lens, but it denotes the number of single lenses constituting the cemented lens.

<Description of Variable Magnification Projection Optical System According to Embodiment and Image Projection Apparatus Using the Same>

Figure 2B:
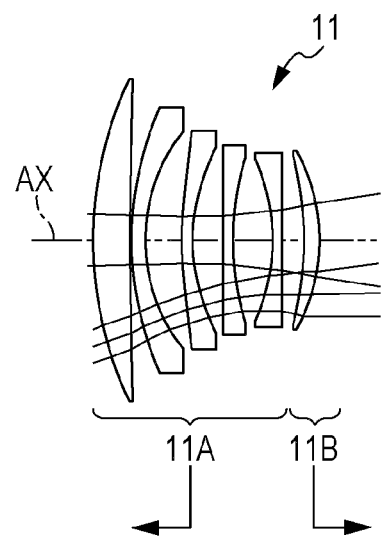
Figure 3A:
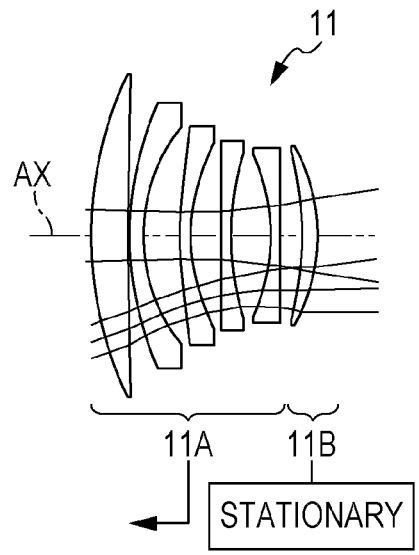
FIGS. 3A and 3B diagrams for describing operations of a first lens group of a second aspect during focusing of the variable magnification projection optical system according to the embodiment.
Figure 3B:
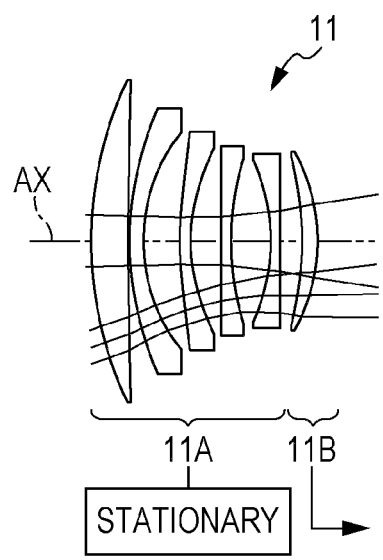

FIGS. 1A and 1B are schematic lens cross-sectional diagrams illustrating a configuration for describing the variable magnification projection optical system according to the embodiment. FIGS. 2A and 2B are diagrams for describing operations of a first lens group of a first aspect during focusing of the variable magnification projection optical system according to the embodiment. FIG. 2A represents the case where, during focusing, the front and rear groups of the first lens group are moved along the optical axis in the same direction, and FIG. 2B represents the case where, during focusing, the front and rear groups of the first lens group are moved along the optical axis in the different directions (reverse directions). FIGS. 3A and 3B are diagrams for describing operations of a first lens group of a second aspect during focusing of the variable magnification projection optical system according to the embodiment. FIG. 3A represents the case where, during focusing, the front group of the first lens group is moved along the optical axis and the rear group is stationary, and FIG. 3B represents the case where, during focusing, the front group of the first lens group is stationary and the rear group is moved along the optical axis.

The variable magnification projection optical system according to the embodiment is an optical system which magnifies and projects image light formed in an image forming element onto a screen arranged at a position separated by a predetermined distance.

An image projection apparatus using the variable magnification projection optical system is configured to include an image forming element which forms image light and a projection optical system which magnifies and projects the image light formed in the image forming element, and the variable magnification projection optical system according to the embodiment is used as the projection optical system. More specifically, the image projection apparatus is configured with the variable magnification projection optical system according to the embodiment, an image forming element which forms image light, a light source which emits illumination light, and an illumination optical system which guides the illumination light irradiated from the light source to the image forming element. The image forming element is a spatial light modulation element which forms the image light by modulating the illumination light based on video signals input from a video circuit. The image forming element is, for example, a digital micromirror device (DMD), a reflection type liquid crystal panel, a transmission type liquid crystal panel, or the like.

The DMD includes a mirror plane formed by two-dimensionally arranging a large number of micro-mirror elements in linearly independent two directions and is configured so that a reflection angle of each mirror element is able to be switched between the independent two directions. Each mirror element corresponds to each pixel of the image projected onto the screen. If the reflection angle is set to the one of the two directions, the mirror element is in "ON" state, so that the image light reflected on the mirror element in the ON state is projected onto the screen through the variable magnification projection optical system. On the other hand, if the reflection angle is set to the other of the two directions, the mirror element is in "OFF" state, so that the pixel on the screen corresponding to the mirror element in the OFF state is displayed as a black pixel.

Figure 4A:
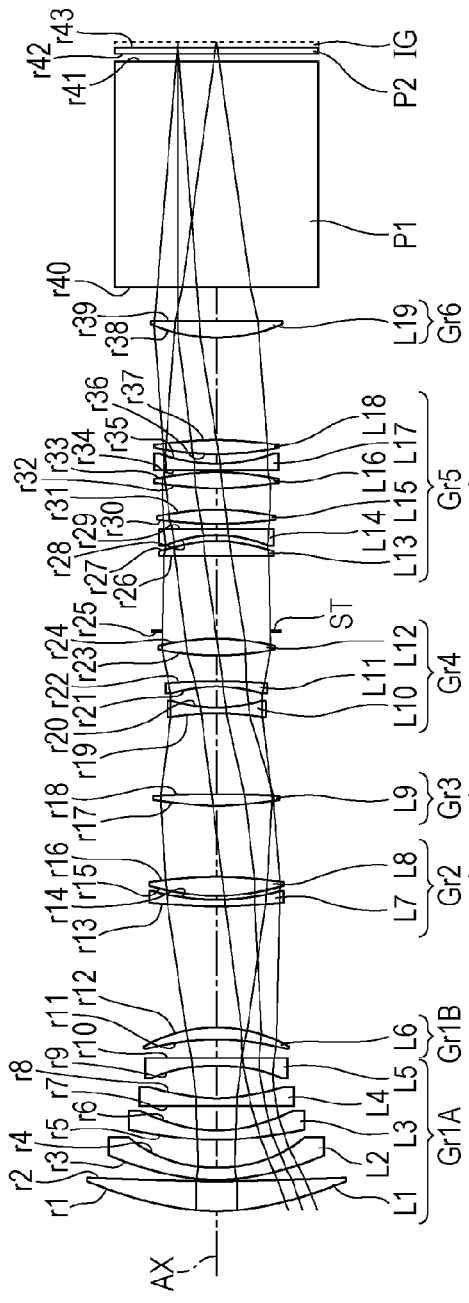
FIGS. 4A and 4B are cross-sectional diagrams illustrating lens arrangement of a variable magnification projection optical system according to Example 1.
Figure 4B:
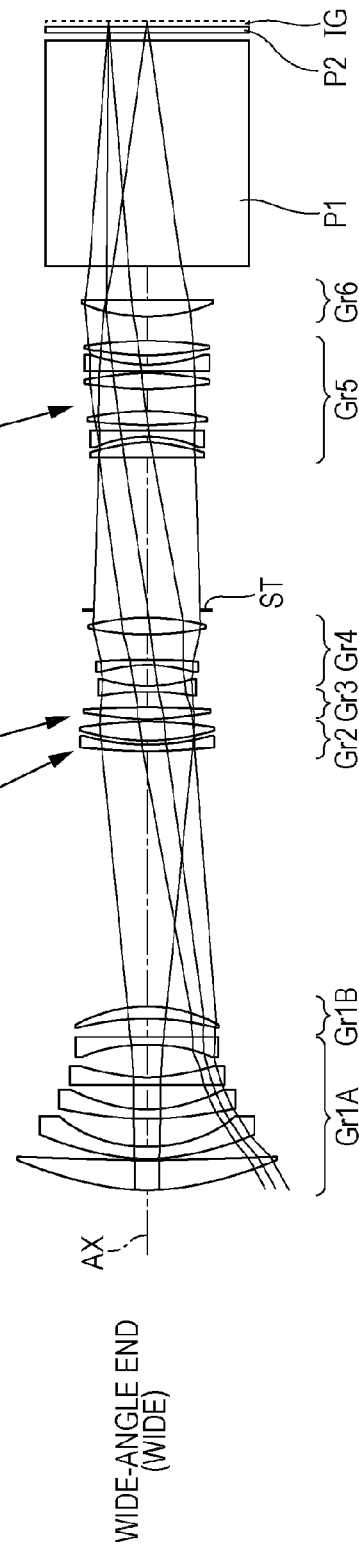

For example, as illustrated in FIGS. 1A and 1B, the variable magnification projection optical system 1 used in the image projection apparatus is configured to include in order from a magnification conjugate side to a reduction conjugate side, first to sixth lens groups 11 to 16 having one or plural optical lenses and an optical stop 17 which is arranged at any position from a front of a lens arranged closest to the magnification conjugate side in the fourth lens group 14 to a front of a lens arranged closest to the magnification conjugate side in the fifth lens group 15, and the fourth lens group 14 is configured to include, in order from the magnification conjugate side, two or more negative lenses and a positive lens. In addition, the variable magnification projection optical system 1 exemplified in FIGS. 1A and 1B has the same configuration as that of the variable magnification projection optical system 1A (FIGS. 4A and 4B) according to Example 1 described later.

The first lens group 11 has a totally negative refracting power and is stationary during changing of magnification. More specifically, in the example illustrated in FIGS. 1A and 1B, the first lens group 11 is configured to include six lenses of 1st to 6th lenses 111 to 116. The 1st lens 111 is a positive meniscus lens which is convex to the magnification conjugate side, the 2nd lens 112 is a negative meniscus lens which is convex to the magnification conjugate side, the 3rd lens 113 is a negative meniscus lens which is convex to the magnification conjugate side, the 4th lens 114 is a plano-concave negative lens of which magnification conjugate side is planar, the 5th lens 115 is a plano-concave negative lens of which reduction conjugate side is planar, and the 6th lens 116 is a positive meniscus lens which is convex to the reduction conjugate side.

The second lens group 12 has a totally positive refracting power and is movable during changing of magnification. More specifically, in the example illustrated in FIGS. 1A and 1B, the second lens group 12 is configured to include two lenses of 7th and 8th lenses 121 and 122. The 7th lens 121 is a negative meniscus lens which is convex to the magnification conjugate side, and the 8th lens 122 is a biconvex positive lens.

The third lens group 13 has a totally positive refracting power and is movable during changing of magnification. More specifically, in the example of illustrated in FIGS. 1A and 1B, the third lens group 13 is configured to include one lens of a 9th lens 131. The 9th lens 131 is a biconvex positive lens.

The fourth lens group 14 has a totally negative refracting power and is stationary or movable during changing of magnification. In the example illustrated in FIGS. 1A and 1B, the fourth lens group 14 is stationary during changing of magnification, but in Example 2 illustrated in FIGS. 6A and 6B described later, the fourth lens group Gr4 is movable during changing of magnification. More specifically, in the example illustrated in FIGS. 1A and 1B, the fourth lens group 14 is configured to include three lenses of 10th to 12th lenses 141 to 143. The 10th lens 141 is a biconcave negative lens, the 11th lens 142 is a negative meniscus lens which is convex to the reduction conjugate side, and the 12th lens 143 is a biconvex positive lens. In this manner, the fourth lens group 14 is configured to include, in order from the magnification conjugate side, two or more negative lenses (in the example illustrated in FIGS. 1A and 1B, the two lenses of the 10th and 11th lenses 141 and 142) and a positive lens (in the example illustrated in FIGS. 1A and 1B, the 12th lens 143). In addition, in the example illustrated in FIGS. 1A and 1B, as an example of the optical stop 17, the aperture stop 17 is included in the fourth lens group 14 so as to be arranged closest to the reduction conjugate side of the fourth lens group 14. Therefore, during changing of magnification from the telephoto end to the wide-angle end, the aperture stop 17 is stationary. Therefore, it is considered that the aperture stop 17 is arranged to be independent of the fourth and fifth lens groups 14 and 15, or it is considered that the aperture stop 17 is included in the fifth lens group 15 so as to be arranged closest to the magnification conjugate side in the fifth lens group 15.

The fifth lens group 15 has a totally positive refracting power and is movable during changing of magnification. More specifically, in the example illustrated in FIGS. 1A and 1B, the fifth lens group 15 is configured to include six lenses of 13th to 18th lenses 151 to 156. The 13th lens 151 is a plano-convex positive lens which is convex to the reduction conjugate side, the 14th lens 152 is a plano-concave negative lens of which reduction conjugate side is planar, the 15th lens 153 is a biconvex positive lens, the 16th lens 154 is a biconvex positive lens, the 17th lens 155 is a plano-concave negative lens of which magnification conjugate side is planar, and the 18th lens 156 is a biconvex positive lens.

The sixth lens group 16 has a totally positive refracting power and is stationary during changing of magnification. More specifically, in the example illustrated in FIGS. 1A and 1B, the sixth lens group 16 is configured to include one lens of a 19th lens 161. The 19th lens 161 is a biconvex positive lens.

Each of the lenses 111 to 161 of the first to sixth lens groups 11 to 16 may be, for example, a glass lens or may be, for example, a lens configured with a resin material such as a plastic.

In addition, during changing of magnification from the telephoto end to the wide-angle end, the second, third and fifth lens groups 12, 13, and 15 of the variable magnification projection optical system 1 are substantially monotonously moved in the direction from the magnification conjugate side to the reduction conjugate side. More specifically, in the variable magnification projection optical system 1 illustrated in FIGS. 1A and 1B, the second lens group Gr2 is monotonously moved with a proportional relationship in the direction from the magnification conjugate side to the reduction conjugate side so that the locus becomes a straight line, and the third and fifth lens groups Gr3 and Gr5 are monotonously moved with the movement ratio being gradually decreased in the direction from the magnification conjugate side to the reduction conjugate side so that the locus becomes a curved line.

In addition, in the variable magnification projection optical system 1, the first lens group 11 may be divided into a plurality of sub lens groups during focusing, and at least one lens group among the sub lens groups is moved in the optical axis direction during focusing, so that the focusing is performed. The variable magnification projection optical system 1 has a configuration having a low error sensitivity and is not easily affected by manufacturing errors, and focusing performance is stabilized (easily focused) during focus manipulation (during focusing).

More specifically, for example, as illustrated in FIGS. 2A and 2B and FIGS. 3A and 3B, the first lens group 11 may be divided into two sub lens groups (front group 11A and rear group 11B) during focusing. In addition, for example, as illustrated in FIG. 2A, each of the front group 11A and the rear group 11B is moved in the same direction along the optical axis during focusing, so that the focusing is performed. In addition, for example, as illustrated in FIG. 2B, for example, the front group 11A and the rear group 11B are moved in the different directions along the optical axis or moved along the optical axis so as to have different loci during focusing, so that the focusing is performed. In this manner, during focusing, both of the front group 11A and the rear group 11B are able to be moved, so that it is possible to perform the focusing while correcting the aberration. Particularly, the front group 11A and the rear group 11B are moved so as to have different loci, so that it is possible to widen a focus range (distance range where the focusing is able to be performed).

In addition, for example, as illustrated in FIG. 3A, the rear group 11B is stationary and the front group 11A is moved along the optical axis during focusing, so that the focusing is performed. In addition, for example, as illustrated in FIG. 3B, the front group 11A is stationary and the rear group 11B is moved along the optical axis during focusing, so that the focusing is performed. In this manner, the one of the sub lens groups is stationary during focusing, so that the configuration becomes simple and the focusing performance is particularly stabilized.

In the variable magnification projection optical system 1 illustrated in FIGS. 1A and 1B, during focusing (focusing manipulation, focus alignment manipulation), the first lens group 11 is divided into the front group 11A having a totally negative refracting power configured to include the 1st to 5th lenses 111 to 115 and the rear group 11B configured to include the 6th lens 116, and as illustrated in FIG. 3A, during focusing, the rear group 11B is stationary and the front group 11A is moved along the optical axis, so that the focusing is performed.

In addition, in the case where a paraxial exit pupil position at the telephoto end is denoted by $E_T$, a paraxial exit pupil position at the wide-angle end is denoted by $E_W$, a focal length at the telephoto end is denoted by $f_T$, a focal length at the wide-angle end is denoted by $f_W$, a composite refracting power of the second and third lens groups 12 and 13 at the telephoto end is denoted by $\phi_{23T}$, and a composite refracting power of the second and third lens groups 12 and 13 at the wide-angle end is denoted by $\phi_{23W}$, the variable magnification projection optical system 1 satisfies the following condition expressions (1), (2), and (3).

$$|E_T/f_T| \geq 10 \tag{1}$$

$$|E_W/f_W| \geq 15 \tag{2}$$

$$0.87 \leq \phi_{23T}/\phi_{23W} \leq 1.15 \tag{3}$$

In addition, in the example illustrated in FIGS. 1A and 1B, a prism 18, a plate-shaped optical member 19, and an image forming element 20 are arranged at the reduction conjugate side of the variable magnification projection optical system 1. The plate-shaped optical member 19 is an optical member having a shape of parallel plate and schematically represents various optical filters and a cover glass for the image forming element 20, and the like. The image forming element 20 is the above-described DMD, liquid crystal panel, or the like. By these components, the image light of the image forming element 20 is guided to the screen along the optical axis AX by the variable magnification projection optical system 1 with an appropriate variable magnification ratio, and the image light of the image forming element 20 is magnified and projected on the screen.

The variable magnification projection optical system 1 having this configuration is an optical system where six groups are configured to be aligned in order of negative, positive, positive, negative, positive, and positive from the magnification conjugate side to the reduction conjugate side. In the optical system, in the case where the third and fifth lens groups 13 and 15 are moved from the magnification conjugate side to the reduction conjugate side during changing of magnification from the telephoto end to the wide-angle end, the third lens group 13 having a positive refracting power approaches the fourth lens group 14 closer to the wide-angle end than to the telephoto end, and on the contrary, the fifth lens group 15 having a positive refracting power approaches the fourth lens group 14 closer to the telephoto end than to the wide-angle end. Therefore, in the variable magnification projection optical system 1 according to the embodiment, at both of the telephoto end and the wide-angle end, the lens groups having positive refracting powers are arranged in the vicinity of the optical stop 17. In general, if the positive refracting power of the lens group arranged in the vicinity of the optical stop is increased, the optical system tends to have spherical aberration in the "under" direction. If the spherical aberration is insufficiently corrected, the resolving power of the on-axis light is decreased. However, in the variable magnification projection optical system 1 according to the embodiment, the fourth lens group 14 close to the optical stop 17 consecutively includes negative lenses (10th and 11th lenses 141 and 142), so that the spherical aberration is able to be strongly corrected in the "over" direction. As a result, it is possible to achieve high resolving power.

In addition, the condition expression (1) represents a condition of a paraxial exit pupil position with respect to a focal length at the telephoto end, the condition expression (2) represents a condition of a paraxial exit pupil position with respect to a focal length at the wide-angle end, and the condition expressions (1) and (2) represent that telecentricity is secured. If the values are smaller than the lower limit values of the condition expressions (1) and (2), since an angle of off-axis light is increased, reflection/transmission efficiency at the time of performing color synthesis by a dichroic prism or reflection/transmission efficiency by a total internal reflection (TIR) prism is deteriorated. Therefore, it is not preferred.

From this point of view, more preferably, the condition expression (1A) is expressed as follows.

$$|E_T/f_T| \leq 25 \tag{1A}$$

In addition, from this point of view, more preferably, the condition expression (2A) is expressed as follows.

$$|E_W/f_W| \geq 40 \tag{2A}$$

In addition, the condition expression (3) represents a condition of the telephoto end to the wide-angle end in the composite refracting power of the second and third lens groups 12 and 13 and represents that the composite refracting power of the second and third lens groups 12 and 13 is substantially equal at the telephoto end and the wide-angle end. If the value is larger than the upper limit value of the condition expression (3) or smaller than the lower limit value thereof, the variable magnification projection optical system 1 is able to suppress variation of the image plane at the telephoto end and the wide-angle end, and thus it is preferred. However, in the case where the entire first lens group 11 is used as a focusing group, the variable magnification projection optical system has a configuration having a high error sensitivity and is easily affected by manufacturing errors, and focusing performance is not stabilized (not easily focused) during focus manipulation (during focusing), and thus, it is not preferred. Particularly, since a projector is generally configured so that the entire first lens group 11 is used as a focusing group, it is preferable that the variable magnification projection optical system 1 satisfies the condition expression (3).

From this point of view, more preferably, the condition expression (3A) is expressed as follows.

$$0.89 \leq \phi_{23T}/\phi_{23W} \leq 1.11 \tag{3A}$$

In addition, in the above-described variable magnification projection optical system 1 according to the embodiment, at least one of the negative lenses included in the fourth lens group 14 satisfies the following condition expression (4), and the entire negative lenses included in the fourth lens group satisfy the following condition expression (5).

$$0.003 \leq \Delta\theta_{gF} \leq 0.055 \tag{4}$$

$$-0.035 \leq (\Sigma(\Delta\theta_{gF4i} \times \phi_{4i}))/\phi_W \leq -0.001 \tag{5}$$

wherein, $\Delta\theta_{gF4i}$ is $\Delta\theta_{gF}$ of the i-th negative lens from the magnification conjugate side which is included in the fourth lens group 14. Herein, $\Delta\theta_{gF} = \theta_{gF} - (0.06438 - 0.01682 \times vd)$, $\theta_{gF}=(n_g-n_F)/(n_F-n_C)$, and $\nu d$ is an Abbe number. In addition, $\phi_{4i}$ is a refracting power of the i-th negative lens from the magnification conjugate side which is included in the fourth lens group 14, and $\phi_W$ is a composite refracting power of the entire optical system at the wide-angle end.

As the glass material satisfying the condition expressions (4) and (5), for example, there are FC5, FCD1, FCD100, and the like manufactured by HOYA.

In addition, in the above-described variable magnification projection optical system 1 according to the embodiment, at least one of the negative lenses included in the fourth lens group 14 satisfies the following condition expression (6), and the entire negative lenses included in the fourth lens group 14 satisfy the following condition expression (7).

$$0.03 \leq \Delta\theta_{gF} \leq 0.055 \tag{6}$$

$$-0.035 \leq (\Sigma(\Delta\theta_{gF4i} \times \phi_{4i}))/\phi_W \leq -0.01 \tag{7}$$

As the glass material satisfying the condition expressions (6) and (7), for example, there are FCD1 and the like manufactured by HOYA.

In general, in a projection optical system, the chromatic aberration needs to be well corrected, and in the variable magnification projection optical system 1 according to the embodiment, the axial chromatic aberration and the spherical aberration are able to be corrected.

In general, since an imaging optical system has a positive refracting power as the entire system, the refracting power with respect to light having a relatively short wavelength tends to be larger than the refracting power with respect to light having a relatively long wavelength, so that the axial chromatic aberration occurs. In addition, since the refractive index of a lens varies with the wavelength, irregularity according to the wavelength occurs in the spherical aberration occurring due to light beams passing through the peripheries of the lens. On the contrary, if a negative lens having abnormal dispersibility is arranged in the vicinity of an optical stop, a focal position of the light having a short wavelength is moved to the "over" side, so that it is possible to correct the axial chromatic aberration. In addition, as the wavelength of the light passing through the peripheries of the negative lens having the abnormal dispersibility becomes shorter, the effect that the spherical aberration becomes "over" is able to be obtained. Therefore, it is also possible to correct the irregularity of the spherical aberration according to the wavelength.

Herein, the condition expressions (4) and (6) define the magnitude of the abnormal dispersibility. In addition, each of the condition expressions (5) and (7) defines a sum of the values obtained by multiplying the respective refracting powers with the abnormal dispersibilities of the respective negative lenses included in the fourth lens group 14. As the value is decreased, the abnormal dispersibility of the negative lens becomes strong. Therefore, the variable magnification projection optical system 1 according to the embodiment satisfies the condition expressions (4) and (5), and the fourth lens group 14 arranged in the vicinity of the optical stop 17 includes the negative lens having the abnormal dispersibility, so that it is possible to suppress the axial chromatic aberration and the irregularity of the spherical aberration according to the wavelength. Similarly, the variable magnification projection optical system 1 according to the embodiment satisfies the condition expressions (6) and (7), and the fourth lens group 14 arranged in the vicinity of the optical stop includes the negative lens having the abnormal dispersibility, so that it is possible to suppress the axial chromatic aberration and the irregularity of the spherical aberration according to the wavelength. Particularly, the condition expressions (6) and (7) are satisfied, so that it is possible to achieve higher resolving power.

In addition, in the above-described variable magnification projection optical system 1 according to the embodiment, the lenses included in the fifth lens group 15 satisfy the following condition expressions (8) and (9).

$$0.025 \leq (\Sigma(\Delta\theta_{gF5i} \times \phi_{5i}))/\phi_W \leq 0.065 \tag{8}$$

$$0.8 \leq d_{z5}/f_W \leq 1.65 \tag{9}$$

wherein, $\Delta\theta_{gF5i}$ is $\Delta\theta_{gF}$ of the i-th lens from the magnification conjugate side which is included in the fifth lens group 15, $\phi_{5i}$ is a refracting power of the i-th lens from the magnification conjugate side which is included in the fifth lens group 15, and $d_{z5}$ is a movement amount of the fifth lens group 15 from the magnification conjugate side to the reduction conjugate side during changing of magnification from the telephoto end to the wide-angle end.

In addition, in the above-described variable magnification projection optical system according to the embodiment, the lenses included in the fifth lens group 15 satisfy the following condition expressions (10) and (11).

$$0.035 \leq (\Sigma(\Delta\theta_{gF5i} \times \phi_{5i}))/\phi_W \leq 0.045 \tag{10}$$

$$1 \leq d_{z5}/f_W \leq 1.65 \tag{11}$$

In general, in a variable magnification optical system, the magnification chromatic aberration between the wide-angle end and the telephoto end swings at the plus side and the minus side, in other words, the difference in the magnification chromatic aberration between the wide-angle end and the telephoto end is large, so that the performance at the wide-angle end and the performance at the telephoto end are not compatible to each other, and the balance of the performance is lost between the wide-angle end and the telephoto end.

Herein, each of the condition expressions (8) and (10) defines a sum of the values obtained by multiplying the respective refracting powers with the abnormal dispersibilities of the respective negative lenses included in the fifth lens group 15. As the value is decreased, the abnormal dispersibility of the negative lens becomes strong. Therefore, as each value of the condition expressions (8) and (10) is increased, the abnormal dispersibility of the positive lens goes to the Krutz side and the abnormal dispersibility of the negative lens goes to the Lange side. Therefore, with respect to the lens, the magnification chromatic aberration is able to be biased to the minus direction. The light beam passing through the inside of the fifth lens group 15 passes at a high position from the optical axis closer to the wide-angle end than to the telephoto end, and the magnification chromatic aberration at the wide-angle end is larger than the magnification chromatic aberration at the telephoto end and is biased to the minus direction. Therefore, the condition expression (8) or (10) is satisfied, so that it is possible to reduce the difference in the magnification chromatic aberration between the wide-angle end and the telephoto end. In addition, each of the condition expressions (9) and (11) defines a movement amount of the fifth lens group during changing of magnification. As the movement amount of the fifth lens group is increased, the height of the light beam passing through the inside of the lens varies at the telephoto end and the wide-angle end. Therefore, the condition expression (9) or (11) is satisfied, so that it is possible to effectively reduce the difference in the magnification chromatic aberration.

In this manner, the variable magnification projection optical system 1 according to the embodiment satisfies the condition expressions (8) and (10) or satisfies the condition expressions (9) and (11), and the glass material having the abnormal dispersibility is effectively used for the fifth lens group 15 which is moved during changing of magnification. Therefore, the variation of the magnification chromatic aberration according to the changing of magnification is suppressed, so that it is possible to reduce the difference in the magnification chromatic aberration at the telephoto end and the wide-angle end.

In addition, in the above-described variable magnification projection optical system 1 according to the embodiment, the first lens group 11 includes one or more negative lens satisfying the following condition expression (12).

$$0.03 \leq \Delta\theta_{gF} \leq 0.055 \tag{12}$$

Although the difference in the magnification chromatic aberration at the telephoto end and the wide-angle end is suppressed by moving the fifth lens group 15 using the lens having the abnormal dispersibility during changing of magnification, the difference is not necessarily 0. Therefore, the variable magnification projection optical system 1 according to the embodiment employs the negative lens satisfying the condition expression (12) and having the abnormal dispersibility as the first lens group 11, so that it is possible to further suppress the difference in the magnification chromatic aberration.

In addition, in the above-described variable magnification projection optical system according to the embodiment, the first to fourth lens groups 11 to 14 satisfy the following condition expressions (13) and (14).

$$|\phi_{14T}/\phi_T| \leq 0.3 \tag{13}$$

$$|\phi_{14W}/\phi_W| 0.3 \tag{14}$$

wherein, $\phi_{14T}$ is a composite refracting power of the first to fourth lens groups 11 to 14 at the telephoto end, and $\phi_{14W}$ is a composite refracting power of the first to fourth lens groups 11 to 14 at the wide-angle end.

The condition expressions (13) and (14) define afocal properties. A combined system of the first to fourth lens groups 11 to 14 arranged from the optical stop 17 in the magnification conjugate side is substantially afocal, so that the width of light flux between the fourth lens group 14 and the fifth lens group 15 are substantially parallel along the optical axis direction. Therefore, since the change in the F number according to the movement of the fifth lens group 15 does not easily occur, in the variable magnification projection optical system 1 according to the embodiment, it is possible to suppress the variation of the F number at the telephoto end and the wide-angle end during changing of magnification.

From this point of view, more preferably, the condition expression (13A) is expressed as follows.

$$|\phi_{14T}/\phi_T| \leq 0.28 \tag{13A}$$

From this point of view, more preferably, the condition expression (14A) is expressed as follows.

$$|\phi_{14W}/\phi_W| \leq 0.28 \tag{14A}$$

In addition, in the above-described variable magnification projection optical system 1 according to the embodiment, the second lens group 12 is configured to include, in order from the magnification conjugate side to the reduction conjugate side, one or more negative lenses (in the example of FIGS. 1A and 1B, the 7th lens 121) and one or more positive lenses (in the example illustrated in FIGS. 1A and 1B, the 8th lens 122) and satisfies the following condition expression (15).

$$1.8 \leq d_{Z2}/f_W \leq 2.5 \tag{15}$$

wherein, $d_{Z2}$ is a movement amount of the second lens group 12 from the magnification conjugate side to the reduction conjugate side during changing of magnification from the telephoto end to the wide-angle end.

In the above-described variable magnification projection optical system 1, the variation of the light beam passing position of the on-axis light is smaller at the reduction conjugate side than at the optical stop 17 during changing of magnification. Therefore, the range of the axial chromatic aberration during changing of magnification occurring at the rear group may be allowed to be smaller than that at the optical stop 17. However, in the entire system of the variable magnification projection optical system 1, the difference in the axial chromatic aberration during changing of magnification is not necessarily small. Therefore, in the variable magnification projection optical system 1 according to the embodiment, the movement amount of the second lens group 12 is set so that the condition expression (15) is satisfied, so that it is possible to suppress the variation of the light beam passing position of the on-axis light in the so-called variator group which greatly contributes to the change of magnification, and it is possible to allow the difference in the axial chromatic aberration during changing of magnification to be small.

From this point of view, more preferably, the condition expression (15A) is expressed as follows.

$$1.9 \leq d_{Z2}/f_W \leq 2.3 \tag{15A}$$

In addition, in the above-described variable magnification projection optical system 1 according to the embodiment, the condition expressions (16) and (17) are satisfied.

$$f_T/f_W \geq 1.45 \tag{16}$$

$$\omega_W \geq 26.5 \tag{17}$$

wherein, $\omega_W$ is a half angle of view at the wide-angle end.

In the configuration of the related art, in the cased where the condition expression (16) is satisfied, if various types of aberration such as spherical aberration, image surface curvature, axial chromatic aberration, and magnification chromatic aberration are suppressed, the half angle of view $\omega_W$ at the wide-angle end is not allowed to be large. On the other hand, in the configuration of the related art, in the cased where the condition expression (17) is satisfied, if various types of aberration such as spherical aberration, image surface curvature, axial chromatic aberration, and magnification chromatic aberration are suppressed, the variable magnification ratio is not allowed to be large. However, in the variable magnification projection optical system according to the embodiment, since the condition expressions (1) to (15) are appropriately satisfied, as described above, the various types of aberration are able to be suppressed. In addition, in the case where the condition expressions (16) and (17) are satisfied, in the variable magnification projection optical system 1 according to the embodiment, it is possible to implement high magnification and a high angle of view (wide angle) while suppressing the various types of aberration such as spherical aberration, image surface curvature, axial chromatic aberration, and magnification chromatic aberration.

In addition, since the above-described image projection apparatus according to the embodiment includes the variable magnification projection optical system, it is possible to sufficiently suppress the various types of aberration such as spherical aberration, image surface curvature, axial chromatic aberration, and magnification chromatic aberration and to implement a higher resolving power.

<Description of More Detailed Embodiments (Examples) of Variable Magnification Projection Optical System>

Hereinafter, detailed configurations of the variable magnification projection optical system 1 illustrated in FIGS. 1A and 1B will be described with reference to the drawings.

FIGS. 4A and 4B, FIGS. 6A and 6B, FIGS. 8A and 8B, FIGS. 10A and 10B, FIGS. 12A and 12B, and FIGS. 14A and 14B are cross-sectional diagrams illustrating arrangement of lenses in each of the variable magnification projection optical systems of Examples 1 to 6. FIG. 4A, FIG. 6A, FIG. 8A, FIG. 10A, FIG. 12A, and FIG. 14A illustrate the cases of the telephoto end, and FIG. 4B, FIG. 6B, FIG. 8B, FIG. 10B, FIG. 12B, and FIG. 14B illustrate the cases of the wide-angle end. In FIGS. 4A and 4B, FIGS. 6A and 6B, FIGS. 8A and 8B, FIGS. 10A and 10B, FIGS. 12A and 12B, and FIGS. 14A and 14B, a number ri (i=1, 2, 3, ...) assigned to each lens surface indicates an i-th lens surface when it is counted from the magnification conjugate side (herein, a lens cementing surface is counted as one surface). In addition, a one-side surface (surface of the magnification conjugate side) of the optical stop ST, both surfaces of the prism P1, both surfaces of the plate-shaped optical member P2, and an image forming surface of the image forming element IG are also treated as one surface, respectively. The above-described treatments and symbol notations are the same in each of Examples 1 to 6. However, it does not denote that the treatment and symbol notations are completely the same. For example, in FIGS. 4A and 4B, FIGS. 6A and 6B, FIGS. 8A and 8B, FIGS. 10A and 10B, FIGS. 12A and 12B, and FIGS. 14A and 14B of Examples 1 to 6, although the lens surfaces arranged closest to the magnification conjugate side are assigned with the same symbol (r1), it does not denote that the curvature or the like are the same in Examples 1 to 6. In addition, FIG. 5, FIG. 7, FIG. 9, FIG. 11, FIG. 13, and FIG. 15 are diagrams for describing the movement amount of each lens group during changing of magnification in each of the variable magnification projection optical systems of Examples 1 to 6. In each of FIG. 5, FIG. 7, FIG. 9, FIG. 11, FIG. 13, and FIG. 15, the horizontal axis denotes each state from the telephoto end (=0) to the wide-angle end (=90), and the vertical axis denotes the movement amount in units of mm.

As illustrated in FIGS. 4A and 4B, FIGS. 6A and 6B, FIGS. 8A and 8B, FIGS. 10A and 10A, FIGS. 12A and 12B, FIGS. 14A and 14B, each of the variable magnification projection optical systems 1A to 1F according to Examples 1 to 6 is configured to include, in order from the magnification conjugate side to the reduction conjugate side, a first lens group Gr1 having a totally negative refracting power and being stationary during changing of magnification, a second lens group Gr2 having a totally positive refracting power and being movable during changing of magnification, a third lens group Gr3 having a totally positive refracting power and being movable during changing of magnification, a fourth lens group Gr4 having a totally negative refracting power and being stationary or movable during changing of magnification, a fifth lens group Gr5 having a totally positive refracting power and being movable during changing of magnification, a sixth lens group Gr6 having a totally positive refracting power and being stationary during changing of magnification, and an optical stop ST which is arranged between a lens arranged closest to the reduction conjugate side in the fourth lens group Gr4 and a lens arranged closest to the magnification conjugate side in the fifth lens group Gr5, and the fourth lens group Gr4 is configured to include, in order from the magnification conjugate side to the reduction conjugate side, two or more negative lenses and a positive lens.

In addition, a prism P1, a plate-shaped optical member P2 such as various optical filters or a cover glass, and an image forming element IG are arranged in order from the magnification conjugate side to the reduction conjugate side at the reduction conjugate side of the sixth lens group Gr6.

Under this configuration, the image light formed in the image forming element IG passes, in order along the optical axis AX, through the plate-shaped optical member P2, the prism P1, the sixth lens group Gr6, the fifth lens group Gr5, the fourth lens group Gr4 (passing through the optical stop ST in advance), the third lens group Gr3, the second lens group Gr2, and the first lens group Gr1 to be guided to the screen with an appropriate variable magnification ratio, so that the image light in the image forming element IG is magnified and projected onto the screen.

Figure 5:
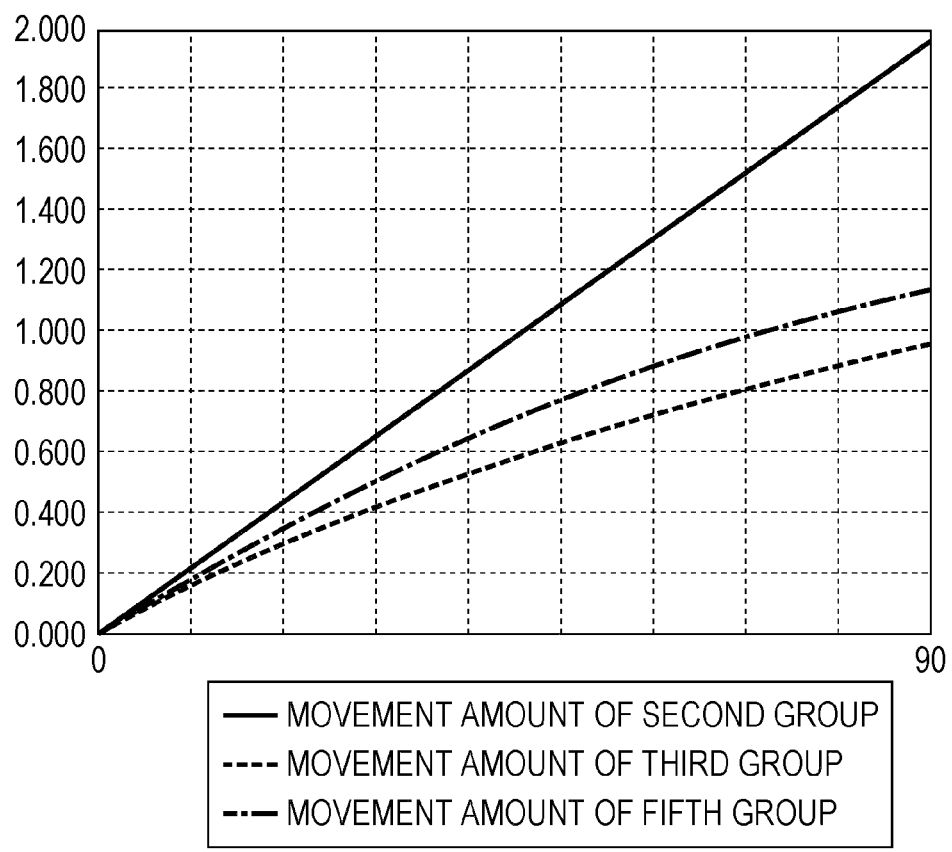
FIG. 5 is a diagram for describing a movement amount of each lens group during changing of magnification in the variable magnification projection optical system according to Example 1.
Figure 7:
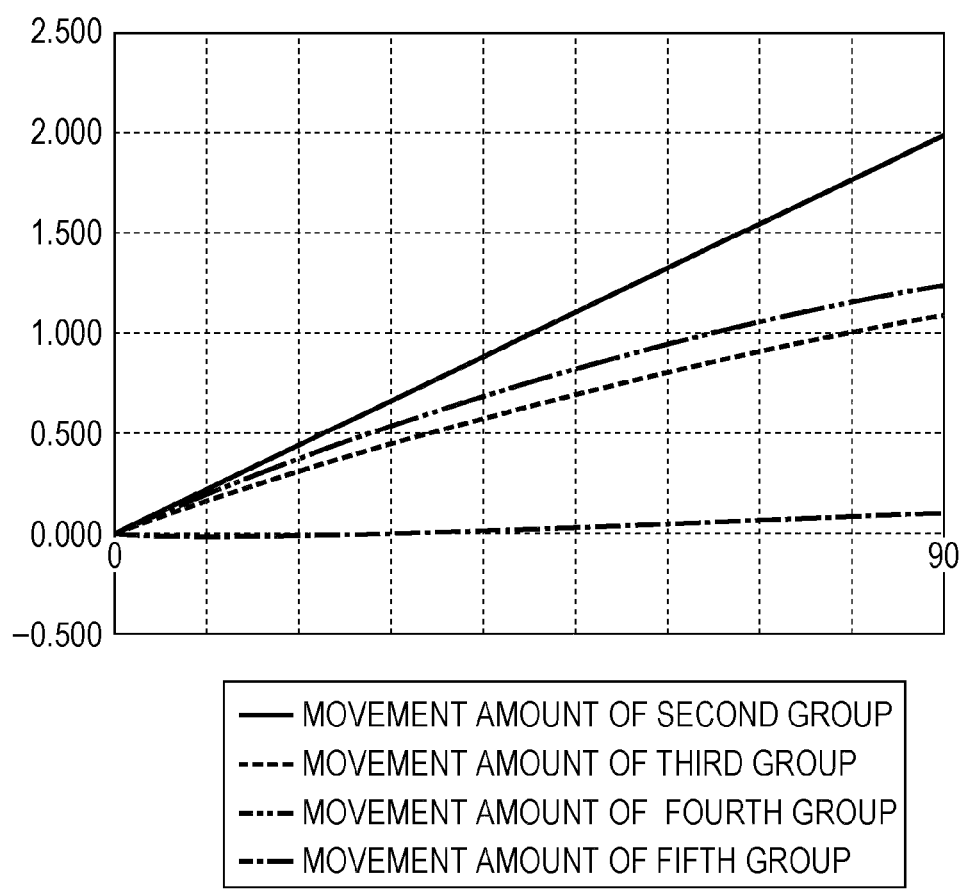
FIG. 7 is a diagram for describing a movement amount of each lens group during changing of magnification in the variable magnification projection optical system according to Example 2.
Figure 8A:
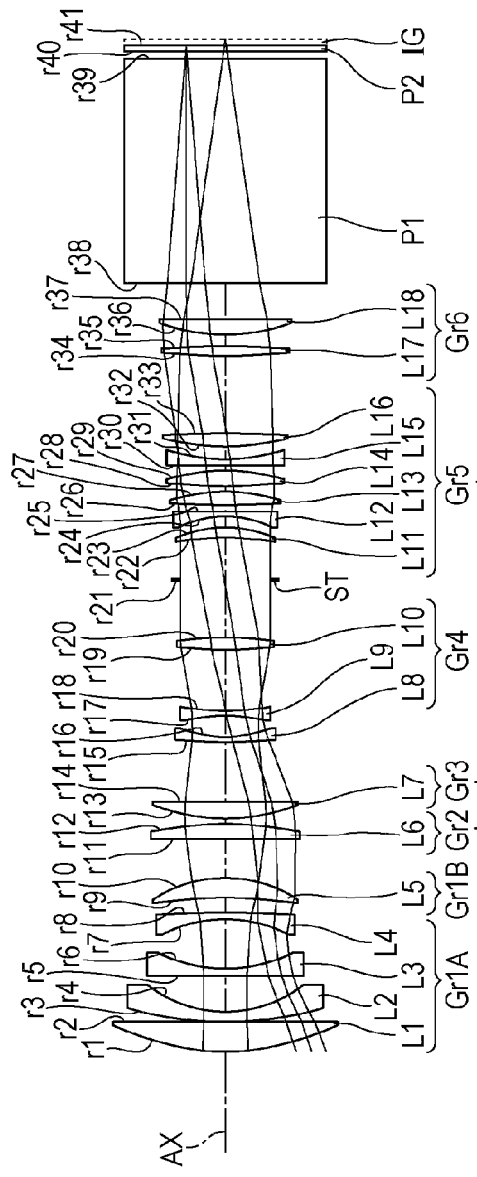
FIGS. 8A and 8B are cross-sectional diagrams illustrating lens arrangement of a variable magnification projection optical system according to Example 3.
Figure 8B:
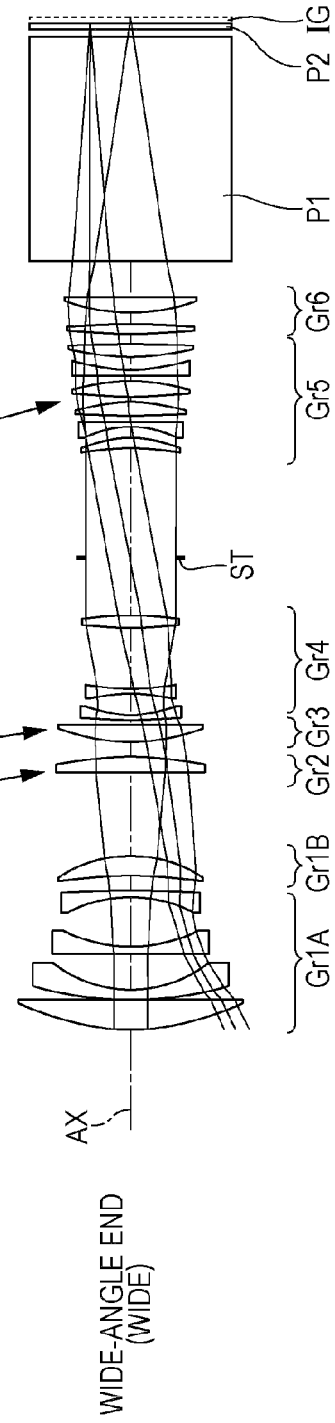
Figure 13:
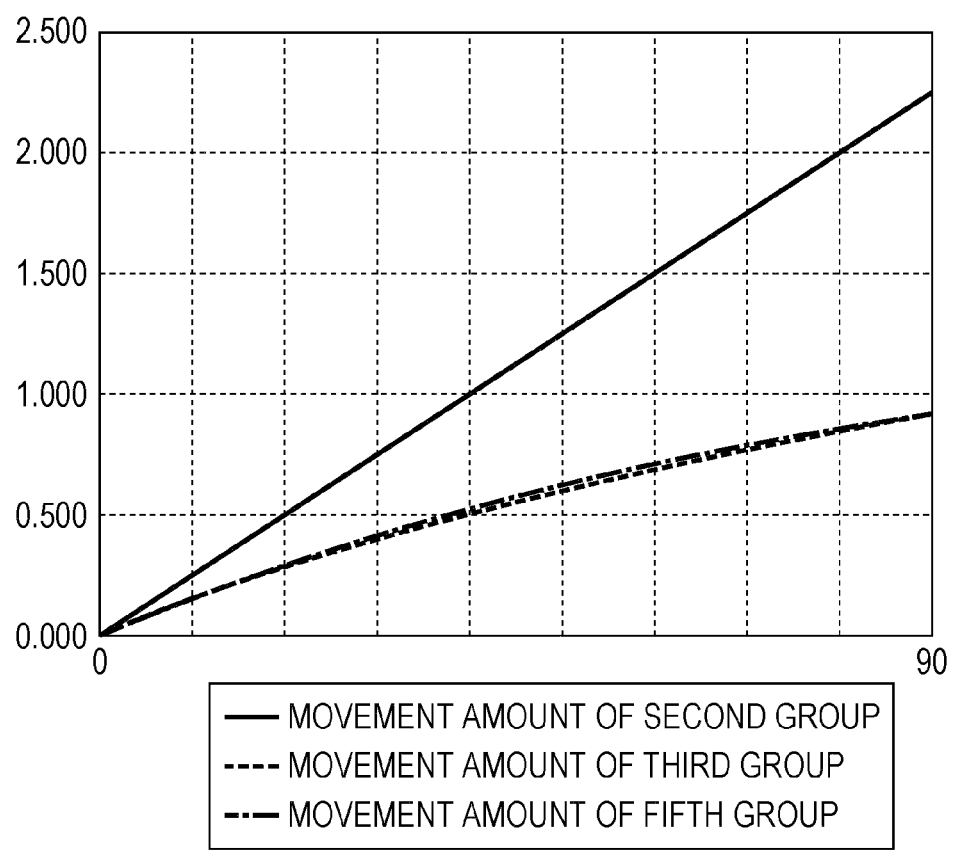
FIG. 13 is a diagram for describing a movement amount of each lens group during changing of magnification in the variable magnification projection optical system according to Example 5.
Figure 14:
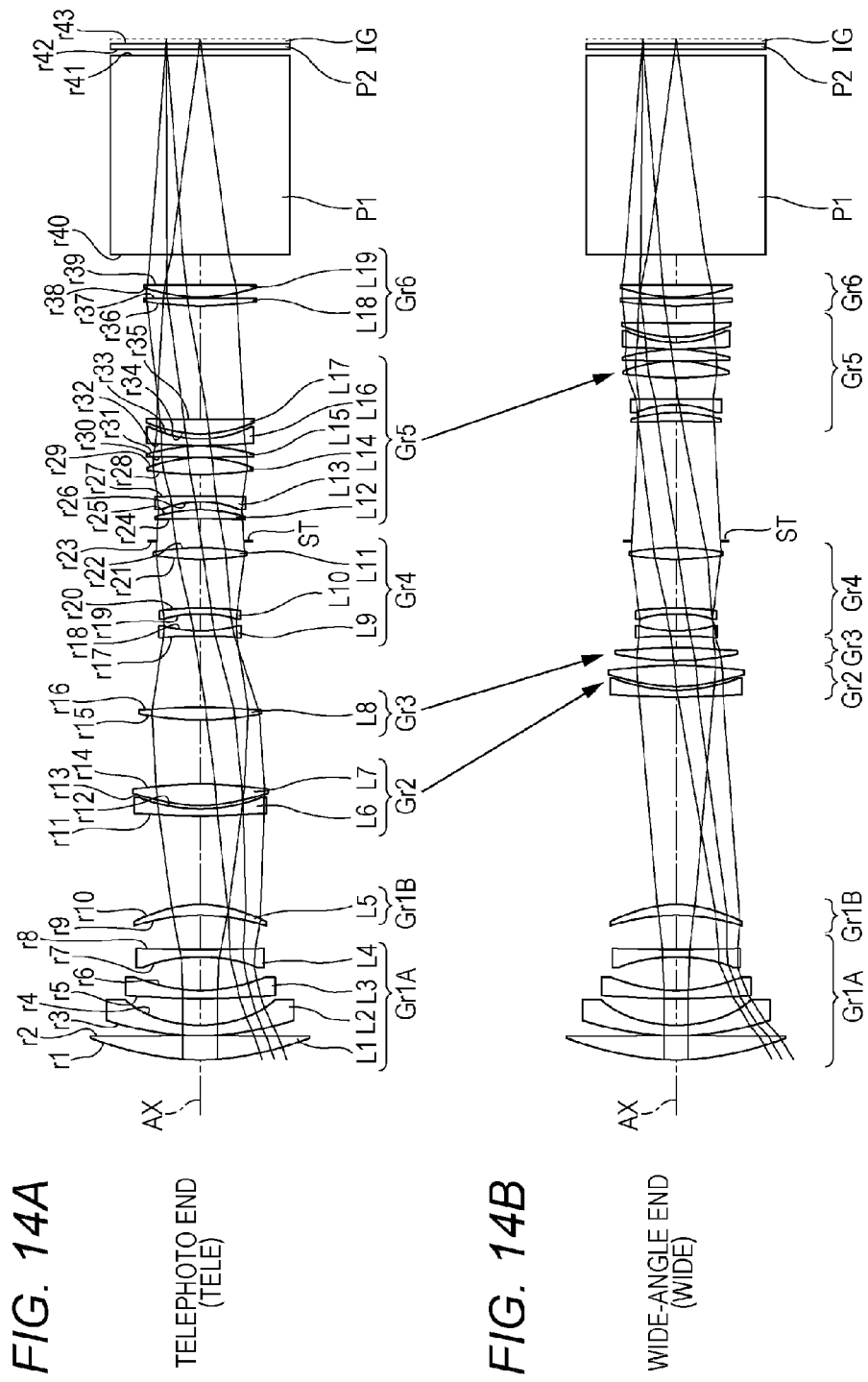
FIGS. 14A and 14B are cross-sectional diagrams illustrating lens arrangement of a variable magnification projection optical system according to Example 6.

More specifically, in each of the variable magnification projection optical systems 1A, 1B, and 1E according to Examples 1, 2, and 5, the first lens group Gr1 is configured to include six lenses of the 1st to 6th lenses L1 to L6, the second lens group Gr2 is configured to include two lenses of the 7th and 8th lenses L7 and L8, the third lens group Gr3 is configured to include one lens of the 9th lens L9, the fourth lens group Gr4 is configured to include three lenses of the 10th to 12th lenses L10 to L12, the fifth lens group Gr5 is configured to include six lenses of the 13th to 18th lenses L13 to L18, and the sixth lens group Gr6 is configured to include one lens of the 19th lens L19. In other words, each of the variable magnification projection optical systems 1A, 1B, and 1E according to Examples 1, 2, and 5 is configured to include 19 lenses of the 1st to 19th lenses L1 to L19. The optical stop ST is an aperture stop ST, and in Examples 1 and 5, the aperture stop ST may be included in the fourth lens group Gr4 so as to be arranged closest to the reduction conjugate side in the fourth lens group, may be arranged between a lens arranged closest to the reduction conjugate side in the fourth lens group Gr4 and a lens arranged closest to the magnification conjugate side in the fifth lens group Gr5 so as to be independent, or may be included in the fifth lens group Gr5 so as to be arranged closest to the magnification conjugate side in the fifth lens group Gr5. In Example 2, since the aperture stop ST is moved together with the lens included in the fourth lens group Gr4, the aperture stop is included in the fourth lens group Gr4 so as to be arranged closest to the reduction conjugate side in the fourth lens group Gr4. In addition, in each of the variable magnification projection optical systems 1A, 1B, and 1E according to Examples 1, 2, and 5, as illustrated in FIG. 5, FIG. 7, and FIG. 13, during changing of magnification from the telephoto end to the wide-angle end the second, third, and fifth lens groups Gr2, Gr3, and Gr5 are substantially monotonously moved in the direction from the magnification conjugate side to the reduction conjugate side. More specifically, as illustrated in FIG. 5, FIG. 7, and FIG. 13, the second lens group Gr2 is monotonously moved with a proportional relationship in the direction from the magnification conjugate side to the reduction conjugate side so that the locus becomes a straight line, and the third and fifth lens groups Gr3 and Gr5 are monotonously moved with a movement ratio being gradually decreased in the direction from the magnification conjugate side to the reduction conjugate side so that the locus becomes a curved line. In addition, in each of the variable magnification projection optical systems 1A and 1E of Examples 1 and 5, during changing of magnification from the telephoto end to the wide-angle end, the fourth lens group Gr4 is stationary, and in the variable magnification projection optical system 1B of Example 2, during changing of magnification from the telephoto end to the wide-angle end, the fourth lens group Gr4 is monotonously moved with a movement ratio being gradually decreased in the direction from the magnification conjugate side to the reduction conjugate side.

In addition, during focusing (focusing manipulation, focus alignment manipulation), the first lens group Gr1 is divided into a front group Gr1A having a totally negative refracting power which is configured to include the 1st to 5th lenses L1 to L5 and a rear group Gr1B which is configured to include the 6th lens L6. In addition, during focusing, Examples 1, 2, and 5 operate according to the aspect illustrated in FIG. 3A described above. In addition, Examples 1 and 2 may operate according to the aspect illustrated in FIG. 2B described above. In addition, Example 5 may operate according to the aspect illustrated in FIG. 2B described above or may operate according to the aspect illustrated in FIG. 3B described above.

Herein, the variable magnification projection optical system 1A according to Example 1 is different from the variable magnification projection optical system 1B according to Example 2 in terms of 4th, 5th, 13th, and 17th lenses L4, L5, L13, and L17. The variable magnification projection optical system 1A according to Example 1 is different from the variable magnification projection optical system 1E according to Example 5 in terms of 4th, 5th, 13th, 14th, and 17th lenses L4, L5, L13, L14, and L17. On the other hand, the variable magnification projection optical system 1B according to Example 2 is different from the variable magnification projection optical system 1E according to Example 5 in terms of 13th and 14th lenses L13 and L14.

More specifically, in each of the first lens group Gr1 of the variable magnification projection optical systems 1A, 1B, and 1E according to Examples 1, 2, and 5, the 1st lens L1 is a positive meniscus lens which is convex to the magnification conjugate side, the 2nd lens L2 is a negative meniscus lens which is convex to the magnification conjugate side, and the 3rd lens L3 is a negative meniscus lens which is convex to the magnification conjugate side. In addition, in Example 1, the 4th lens L4 is a plano-concave negative lens of which magnification conjugate side is planar, and in Examples 2 and 5, the 4th lens L4 is a biconcave negative lens. In Example 1, the 5th lens L5 is a plano-concave negative lens of which reduction conjugate side is planar, and in Examples 2 and 5, the 5th lens L5 is a biconcave negative lens. In all Examples 1, 2, and 5, the 6th lens L6 is a positive meniscus lens which is convex to the reduction conjugate side.

In each of the second lens group Gr2 of the variable magnification projection optical systems 1A, 1B, and 1E according to Examples 1, 2, and 5, the 7th lens L7 is a negative meniscus lens which is convex to the magnification conjugate side, and the 8th lens L8 is a biconvex positive lens.

In each of the third lens group Gr3 of the variable magnification projection optical systems 1A, 1B, and 1E according to Examples 1, 2, and 5, the 9th lens L9 is a biconvex positive lens.

In each of the fourth lens group Gr4 of the variable magnification projection optical systems 1A, 1B, and 1E according to Examples 1, 2, and 5, the 10th lens L10 is a biconcave negative lens, the 11th lens L11 is a negative meniscus lens which is convex to the reduction conjugate side, and the 12th lens L12 is a biconvex positive lens. In addition, the aperture stop ST is included in the fourth lens group Gr4. Therefore, during changing of magnification from the telephoto end to the wide-angle end, in Examples 1 and 5, the aperture stop ST is stationary, and in Example 2, the aperture stop ST is moved.

In each of the fifth lens group Gr5 of the variable magnification projection optical systems 1A, 1B, and 1E according to Examples 1, 2, and 5, in Example 1, the 13th lens L13 is a plano-convex positive lens which is convex to the reduction conjugate side, in Example 2, the 13th lens L13 is a positive meniscus lens which is convex to the reduction conjugate side, and in Example 5, the 13th lens L13 is a biconvex positive lens. In Examples 1 and 2, the 14th lens L14 is a plano-concave negative lens of which reduction conjugate side is planar, and in Example 5, the 14th lens L14 is a biconcave negative lens. In all Examples 1, 2, and 5, the 15th lens L15 is a biconvex positive lens, and the 16th lens L16 is also a biconvex positive lens. In Example 1, the 17th lens L17 is a plano-concave negative lens of which magnification conjugate side is planar, and in Examples 2 and 5, the 17th lens L17 is a negative meniscus lens which is convex to the magnification conjugate side. In all Examples 1, 2, and 5, the 18th lens L18 is a biconvex positive lens.

In each of the sixth lens group Gr6 of the variable magnification projection optical systems 1A, 1B, and 1E according to Examples 1, 2, and 5, the 19th lens L19 is a biconvex positive lens.

Figure 9:
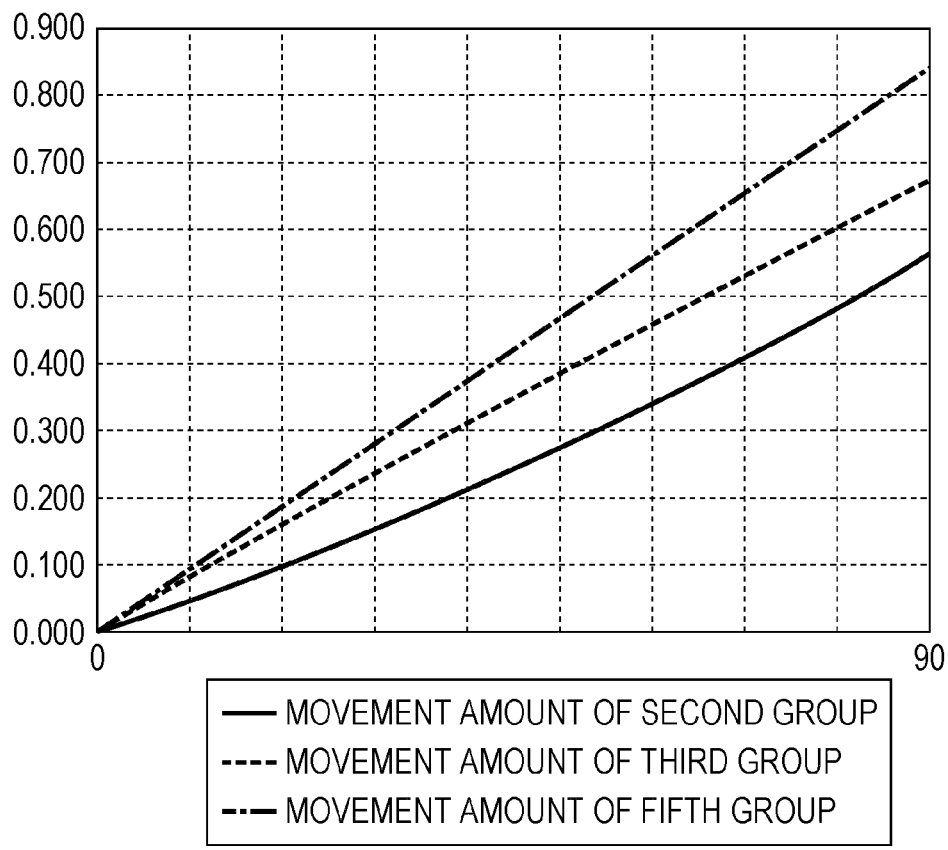
FIG. 9 is a diagram for describing a movement amount of each lens group during changing of magnification in the variable magnification projection optical system according to Example 3.
Figure 11:
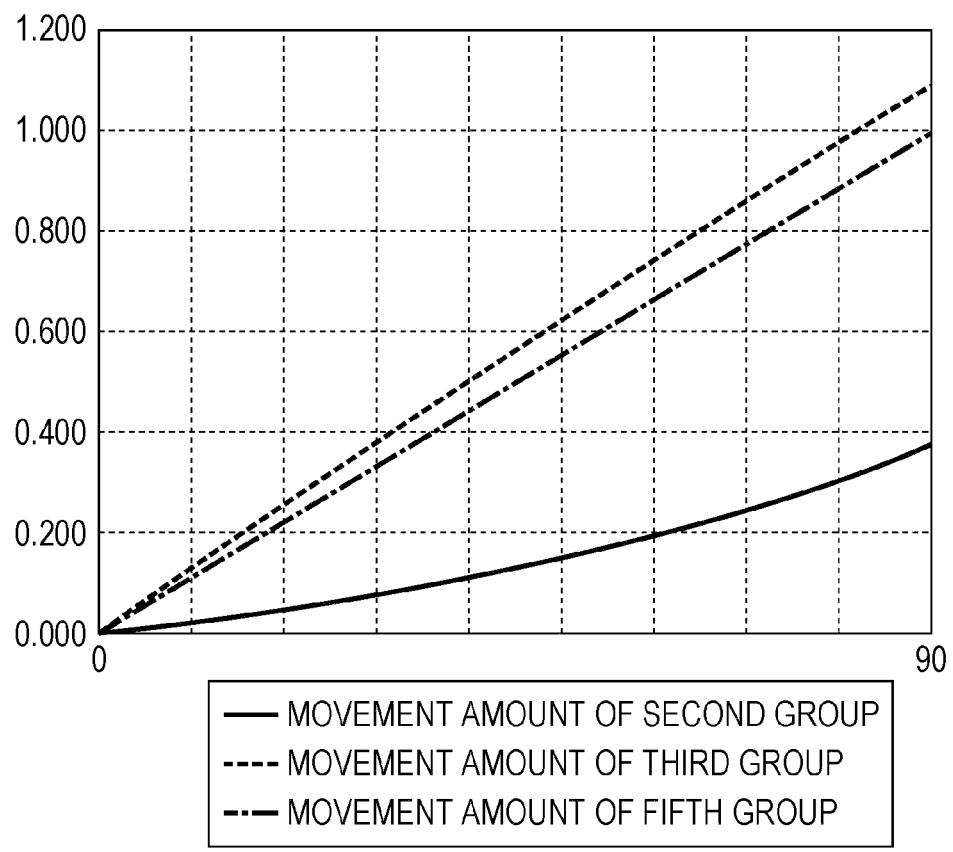
FIG. 11 is a diagram for describing a movement amount of each lens group during changing of magnification in the variable magnification projection optical system according to Example 4.

In addition, in each of the variable magnification projection optical systems 1C and 1D of Examples 3 and 4, the first lens group Gr1 is configured to include five lenses of the 1st to 5th lenses L1 to L5, the second lens group Gr2 is configured to include one lens of the 6th lens L6, the third lens group Gr3 is configured to include one lens of the 7th lens L7, the fourth lens group Gr4 is configured to include three lenses of the 8th to 10th lenses L8 to L10, the fifth lens group Gr5 is configured to include six lenses of the 11th to 16th lenses L11 to L16, and the sixth lens group Gr6 is configured to include two lenses of the 17th and 18th lenses L17 and L18. In other words, each of the variable magnification projection optical systems 1C and 1D according to Examples 3 and 4 is configured to include 18 lenses of the 1st to 18th lenses L1 to L18. The optical stop ST is an aperture stop ST, and in Examples 3 and 4, the aperture stop ST may be included in the fourth lens group Gr4 so as to be arranged closest to the reduction conjugate side in the fourth lens group, may be arranged between a lens arranged closest to the reduction conjugate side in the fourth lens group Gr4 and a lens arranged closest to the magnification conjugate side in the fifth lens group Gr5 so as to be independent, or may be included in the fifth lens group Gr5 so as to be arranged closest to the magnification conjugate side in the fifth lens group Gr5. In addition, in each of the variable magnification projection optical systems 1C and 1D of Examples 3 and 4, as illustrated in FIG. 9 and FIG. 11, during changing of magnification from the telephoto end to the wide-angle end, the second, third, and fifth lens groups Gr2, Gr3, and Gr5 are substantially monotonously moved in the direction from the magnification conjugate side to the reduction conjugate side. More specifically, as illustrated in FIG. 9 and FIG. 11, the second lens group Gr2 is monotonously moved with the movement ratio being gradually decreased in the direction from the magnification conjugate side to the reduction conjugate side so that the locus becomes a curved line, and the third and fifth lens groups Gr3 and Gr5 are monotonously moved with a proportional relationship in the direction from the magnification conjugate side to the reduction conjugate side so that the locus becomes a straight line. In addition, in each of the variable magnification projection optical systems 1C and 1D of Examples 3 and 4, during changing of magnification from the telephoto end to the wide-angle end, the fourth lens group Gr4 is stationary.

In addition, during focusing (focusing manipulation, focus alignment manipulation), the first lens group Gr1 is divided into a front group Gr1A having a totally negative refracting power which is configured to include the 1st to 4th lenses L1 to L4 and a rear group Gr1B which is configured to include the 5th lens L5. In addition, during focusing, Examples 3 and 4 operate according to the aspect illustrated in FIG. 3A described above. In addition, Examples 3 and 4 may operate according to the aspect illustrated in FIG. 2B described above or may operate according to the aspect illustrated in FIG. 3B described above.

Herein, the variable magnification projection optical system 1C according to Example 3 is different from the variable magnification projection optical system 1D according to Example 4 in terms of 3rd, 4th, 6th, 14th, and 15th lenses L3, L4, L6, L14, and L15.

More specifically, in each of the first lens groups Gr1 of the variable magnification projection optical systems 1C and 1D according to Examples 3 and 4, the 1st lens L1 is a plano-convex positive lens which is convex to the magnification conjugate side, and the 2nd lens L2 is a negative meniscus lens which is convex to the magnification conjugate side. In addition, in Example 3, the 3rd lens L3 is a negative meniscus lens which is convex to the magnification conjugate side, and in Example 4, the 3rd lens L3 is a plano-concave negative lens of which magnification conjugate side is planar. In Example 1, the 4th lens L4 is a negative meniscus lens which is convex to the reduction conjugate side, and in Example 4, the 4th lens L4 is a biconcave negative lens. In both of Examples 3 and 4, the 5th lens L5 is a positive meniscus lens which is convex to the reduction conjugate side.

In each of the second lens groups Gr2 of the variable magnification projection optical systems 1C and 1D according to Examples 3 and 4, in Example 3, the 6th lens L6 is a plano-convex positive lens which is convex to the reduction conjugate side, and in Example 4, the 6th lens L6 is a plano-convex positive lens which is convex to the magnification conjugate side.

In each of the third lens groups Gr3 of the variable magnification projection optical systems 1C and 1D according to Examples 3 and 4, the 7th lens L7 is a plano-convex positive lens which is convex to the magnification conjugate side.

In each of the fourth lens groups Gr4 of the variable magnification projection optical systems 1C and 1D according to Examples 3 and 4, the 8th lens L8 is a negative meniscus lens which is convex to the magnification conjugate side, the 9th lens L9 is a biconcave negative lens, and the 10th lens L10 is a biconvex positive lens. In addition, the aperture stop ST is included in the fourth lens group Gr4. Therefore, in both of Examples 3 and 4, during changing of magnification from the telephoto end to the wide-angle end, the aperture stop ST is stationary.

In each of the fifth lens groups Gr5 of the variable magnification projection optical systems 1C and 1D according to Examples 3 and 4, the 11th lens L11 is a positive meniscus lens which is convex to the reduction conjugate side, the 12th lens L12 is a negative meniscus lens which is convex to the reduction conjugate side, and the 13th lens L13 is a biconvex positive lens. In addition, in Example 3, the 14th lens L14 is a biconvex positive lens, and in Example 4, the 14th lens L14 is a plano-convex positive lens which is convex to the reduction conjugate side. In Example 3, the 15th lens L15 is a biconcave negative lens, and in Example 4, the 15th lens L15 is a plano-concave negative lens of which magnification conjugate side is planar. In both of Examples 3 and 4, the 16th lens L16 is a biconvex positive lens.

In each of the sixth lens groups Gr6 of the variable magnification projection optical systems 1C and 1D according to Examples 3 and 4, the 17th lens L17 is a biconvex positive lens, and the 18th lens L18 is a plano-convex positive lens which is convex to the magnification conjugate side.

Figure 15:
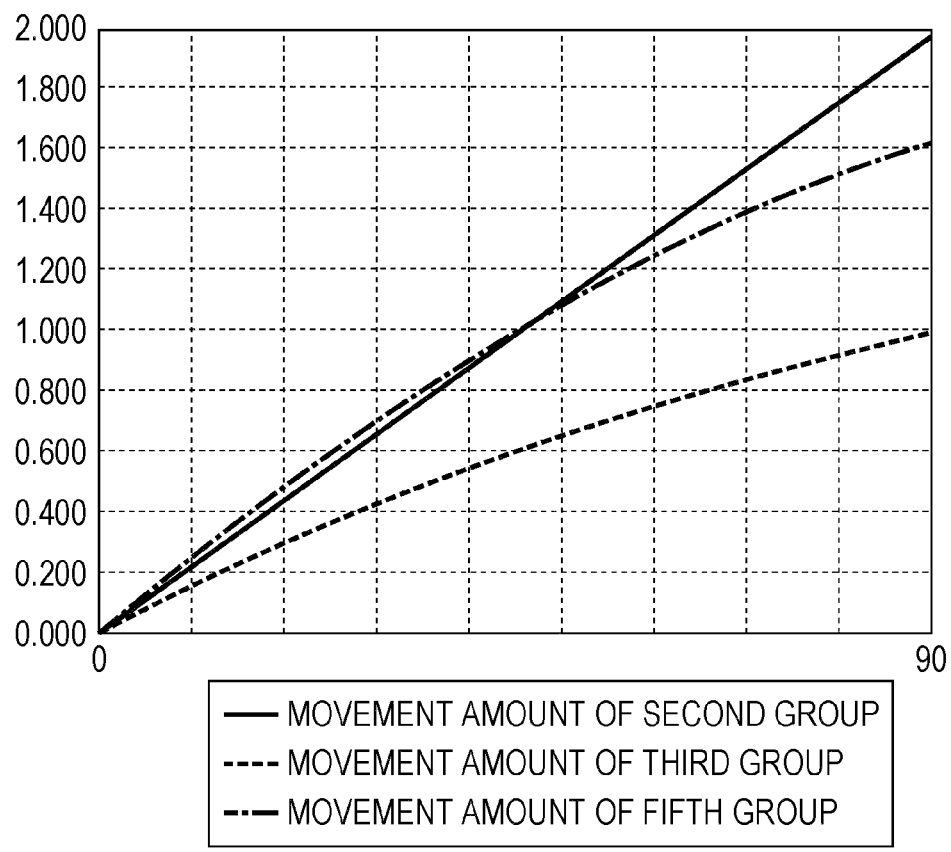
FIG. 15 is a diagram for describing a movement amount of each lens group during changing of magnification in the variable magnification projection optical system according to Example 6.
Figure 16A:
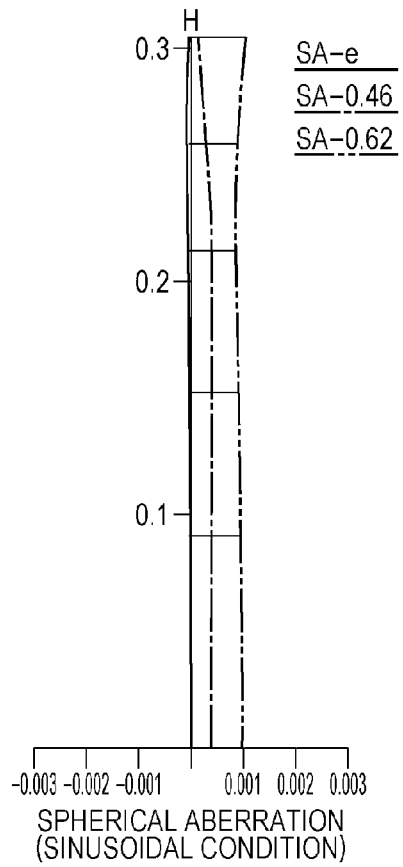
FIGS. 16A to 16D are aberration graphs at the telephoto end of the variable magnification projection optical system of Example 1.
Figure 16B:
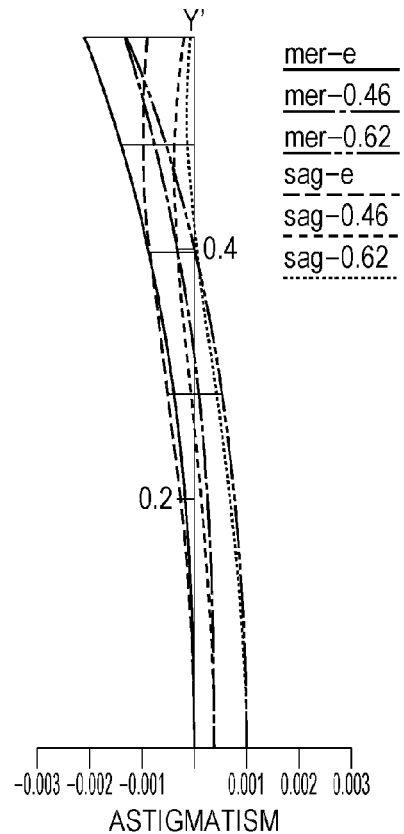
Figure 16C:
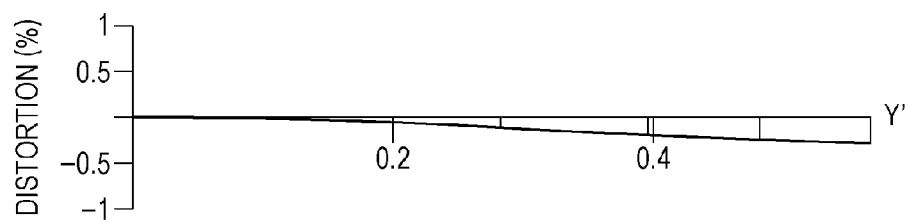
Figure 16D:
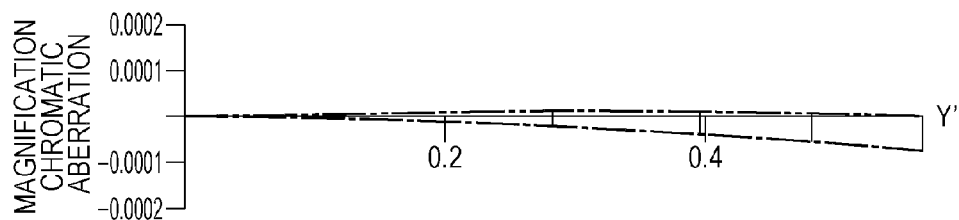
Figure 17A:
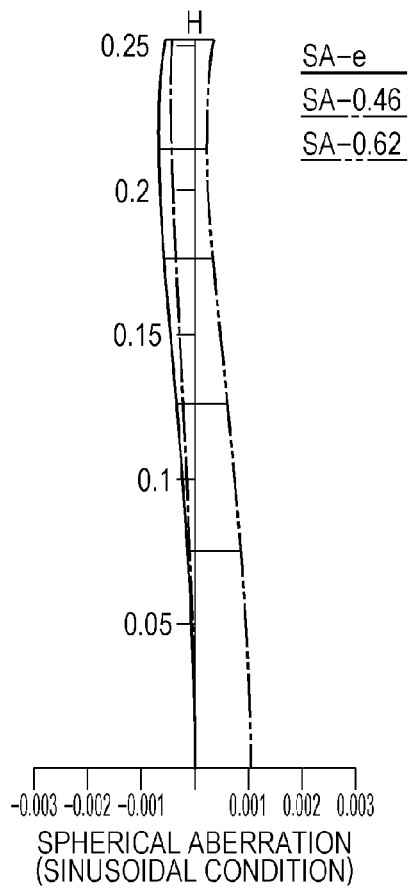
FIGS. 17A to 17D are aberration graphs at the intermediate point of the variable magnification projection optical system of Example 1.
Figure 17B:
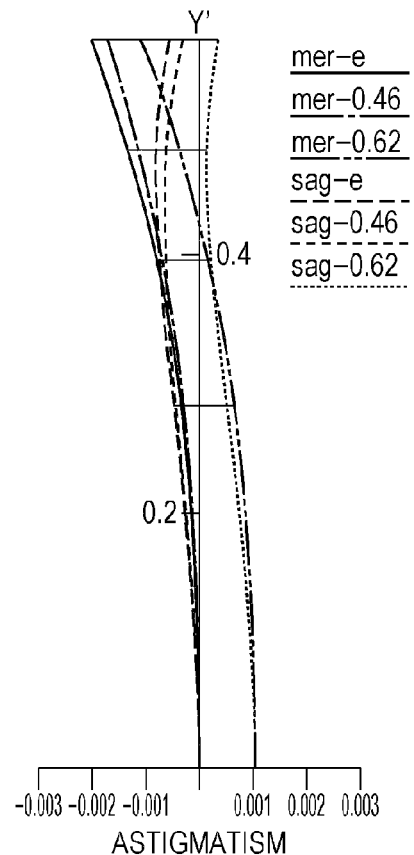
Figure 17C:
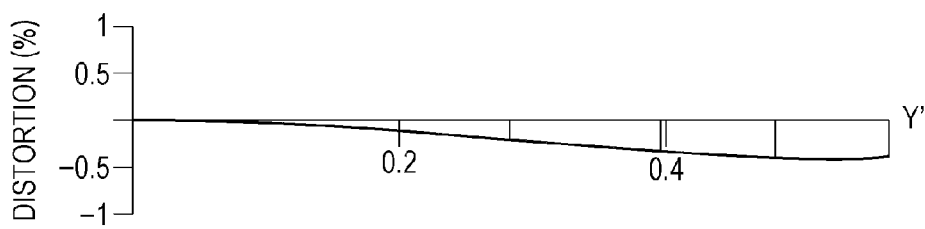
Figure 17D:
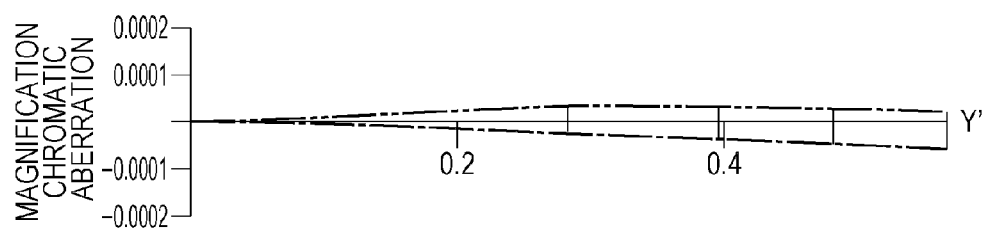
Figure 18A:
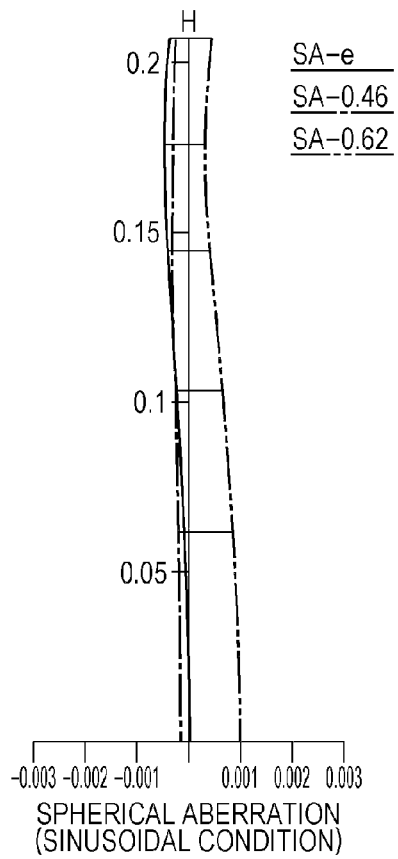
FIGS. 18A to 18D are aberration graphs at the wide-angle end of the variable magnification projection optical system of Example 1.
Figure 18B:
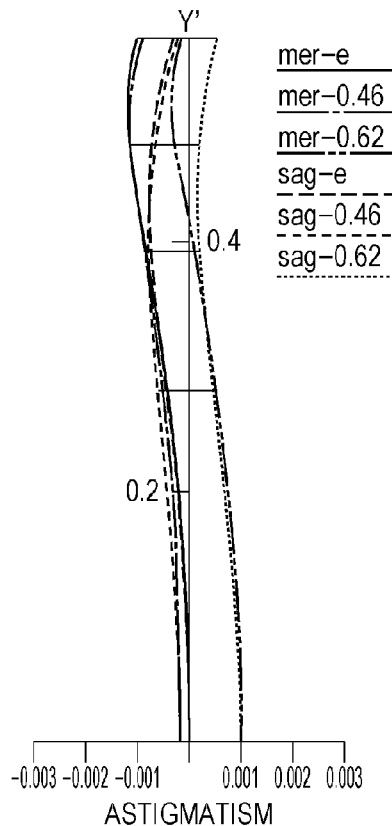
Figure 18C:
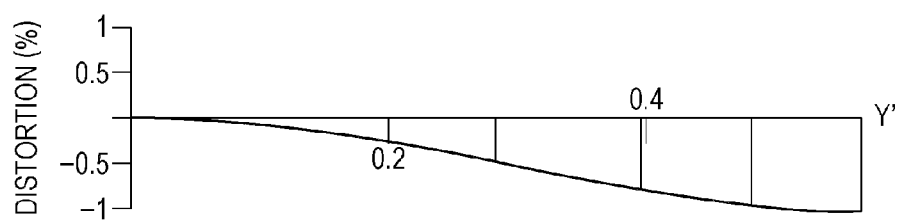
Figure 18D:
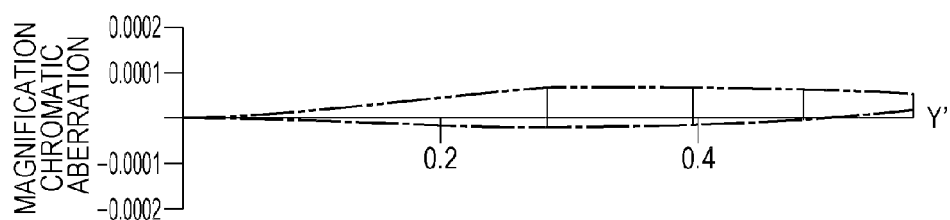
Figure 19A:
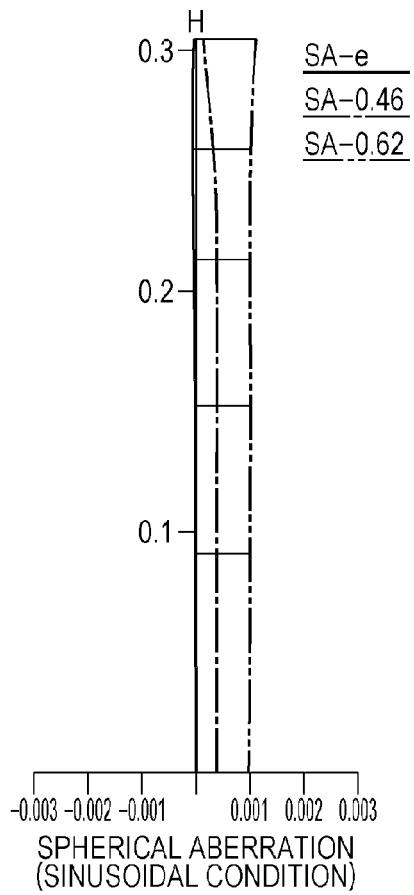
FIGS. 19A to 19D are aberration graphs at the telephoto end of the variable magnification projection optical system of Example 2.
Figure 19B:
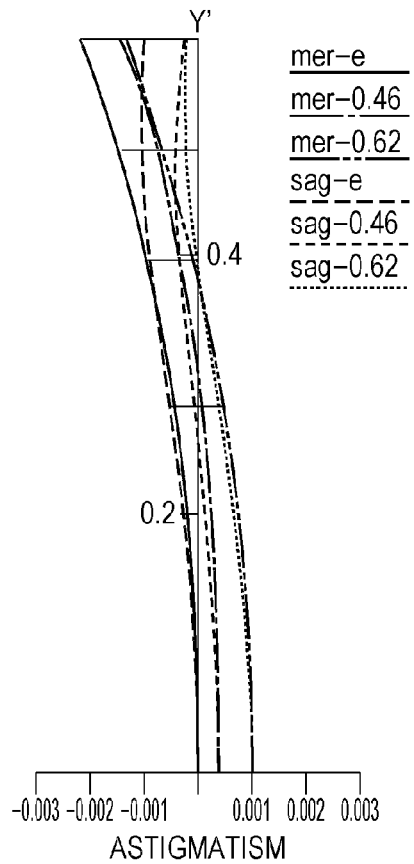
Figure 19C:
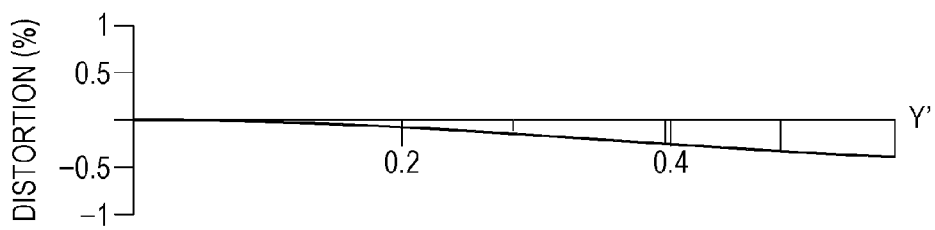
Figure 19D:
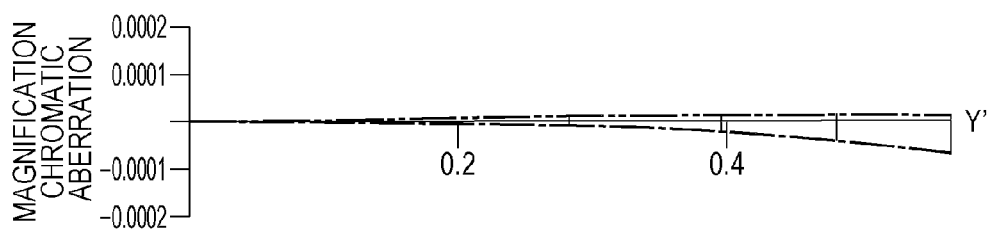
Figure 21A:
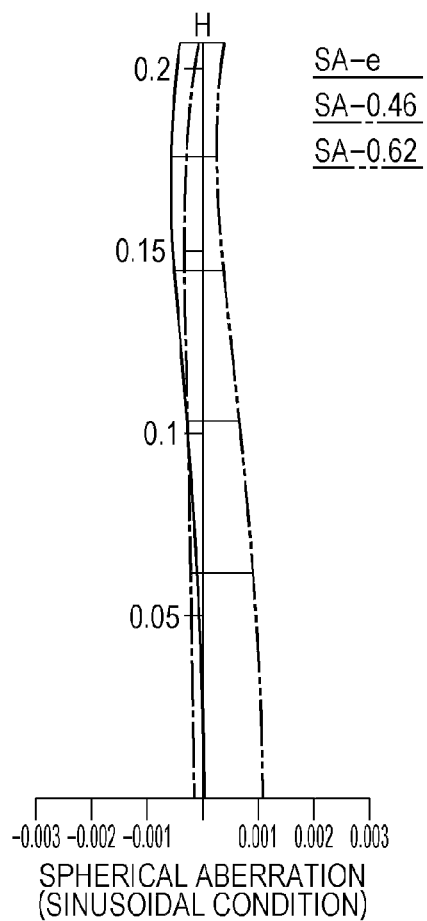
FIGS. 21A to 21D are aberration graphs at the wide-angle end of the variable magnification projection optical system of Example 2.
Figure 21B:
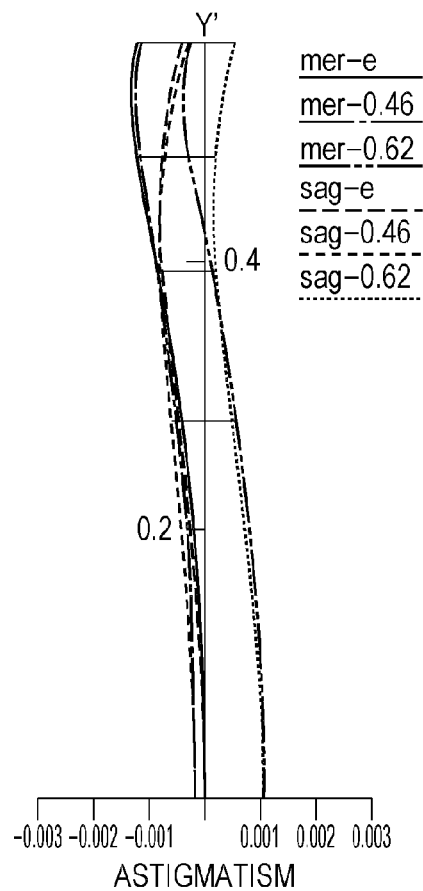
Figure 21C:
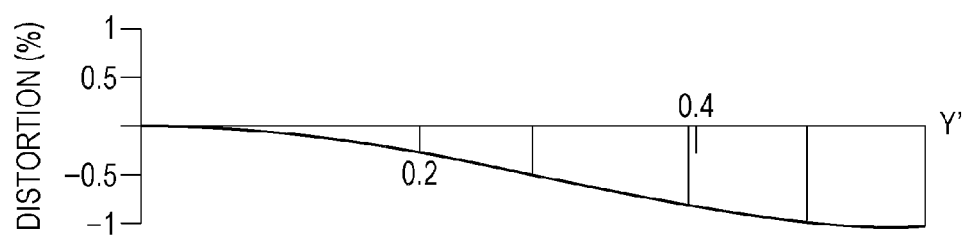
Figure 21D:
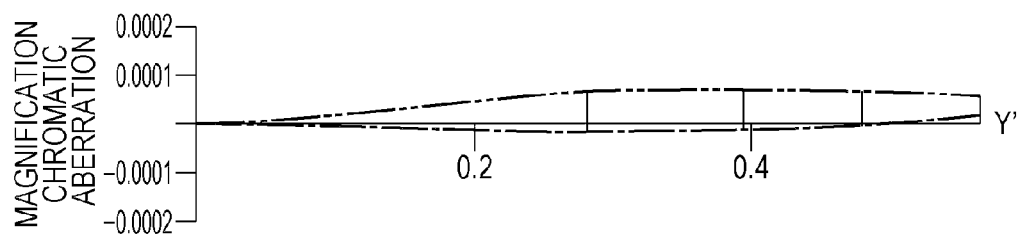
Figure 22A:
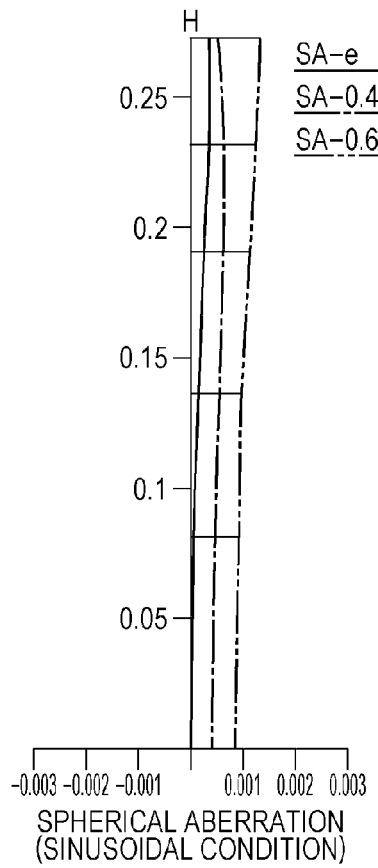
FIGS. 22A to 22D are aberration graphs at the telephoto end of the variable magnification projection optical system of Example 3.
Figure 22B:
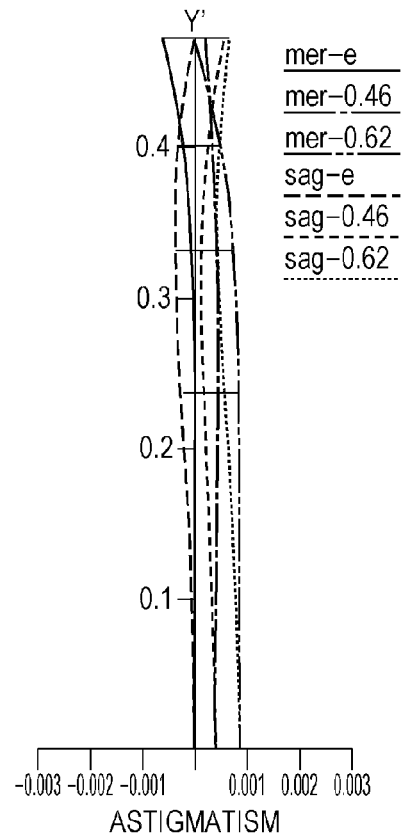
Figure 22C:
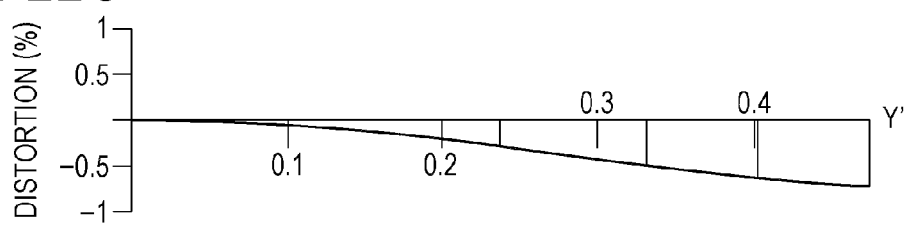
Figure 22D:
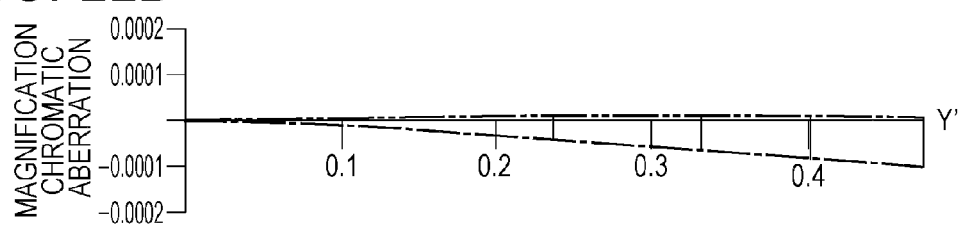
Figure 23A:
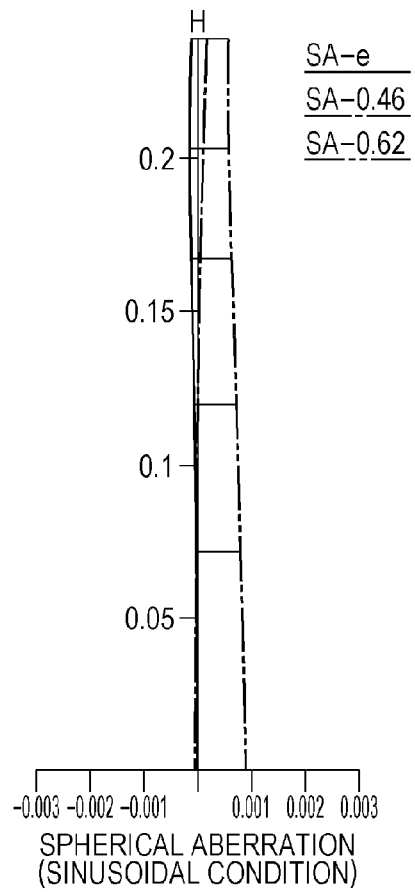
FIGS. 23A to 23D are aberration graphs at the intermediate point of the variable magnification projection optical system of Example 3.
Figure 23B:
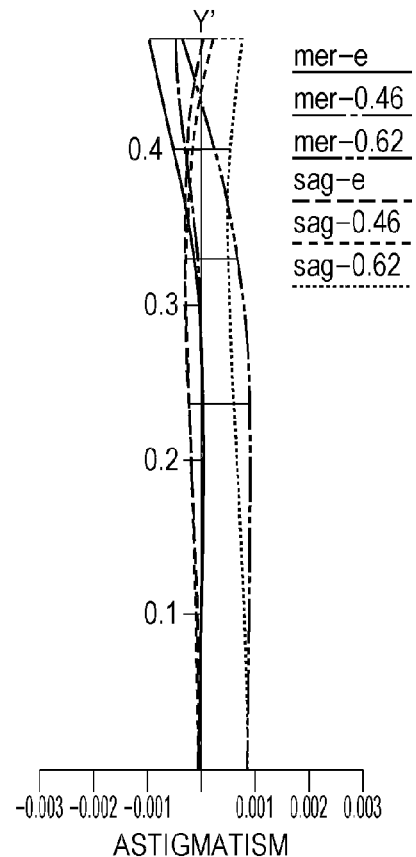
Figure 23C:
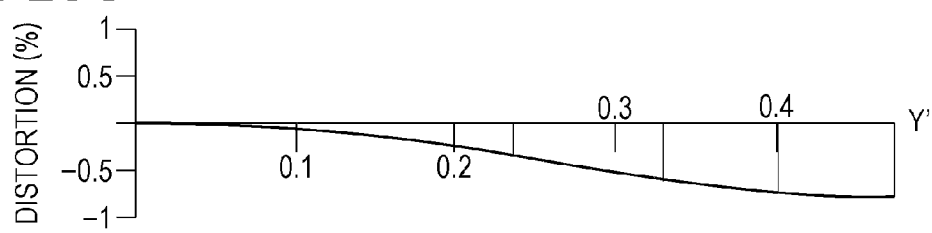
Figure 23D:
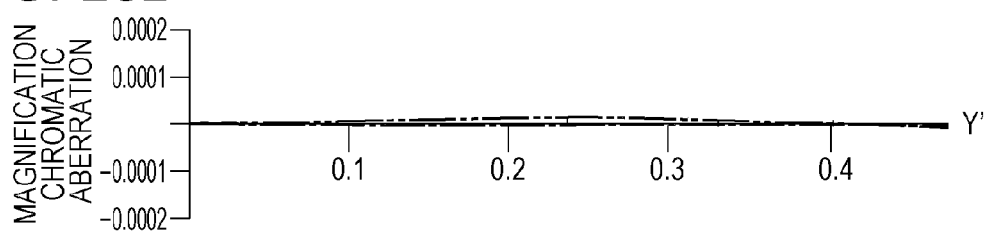
Figure 24A:
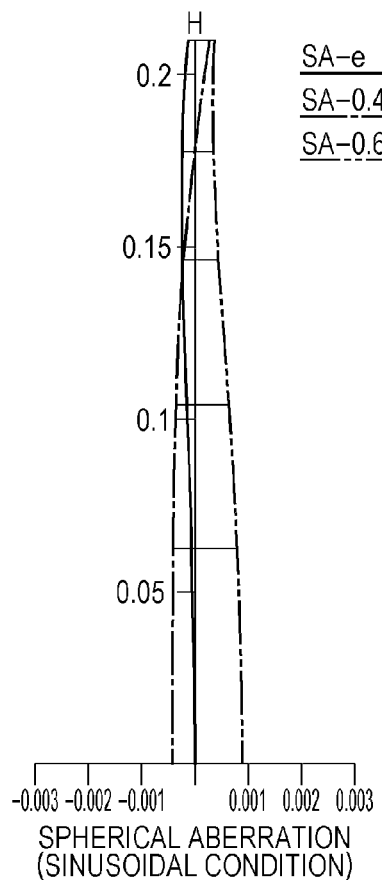
FIGS. 24A to 24D are aberration graphs at the wide-angle end of the variable magnification projection optical system of Example 3.
Figure 24B:
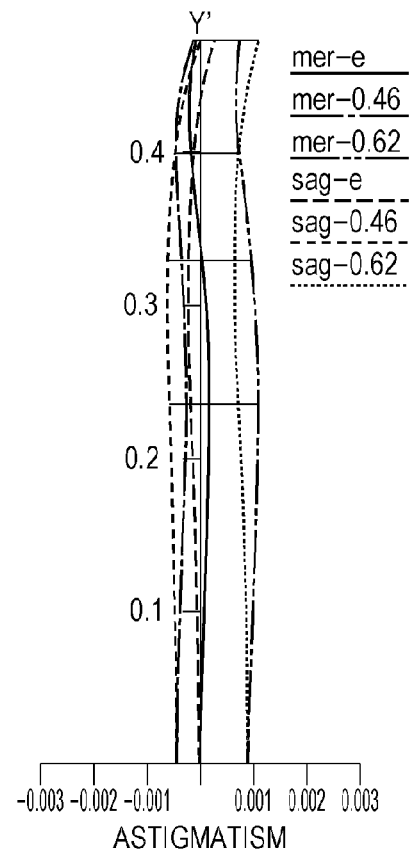
Figure 24C:
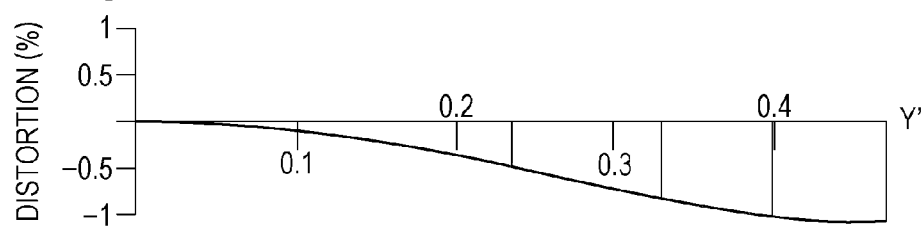
Figure 24D:
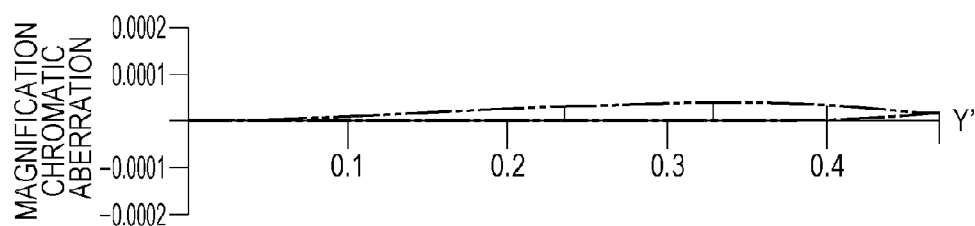
Figure 25A:
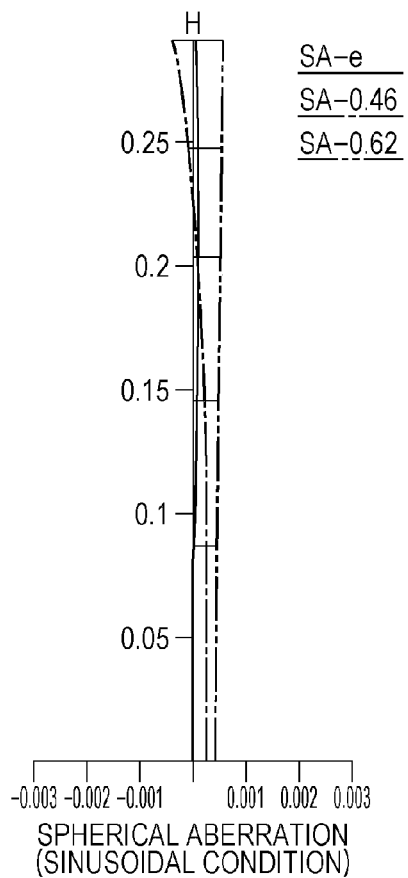
FIGS. 25A to 25D are aberration graphs at the telephoto end of the variable magnification projection optical system of Example 4.
Figure 25B:
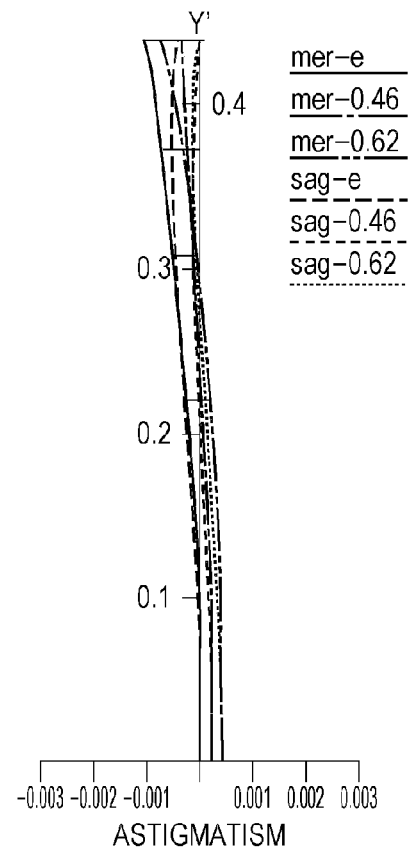
Figure 25C:
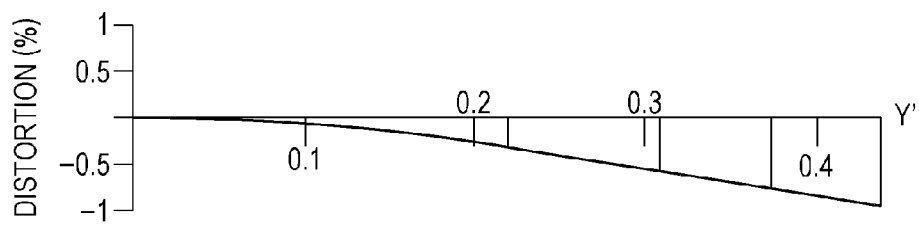
Figure 25D:
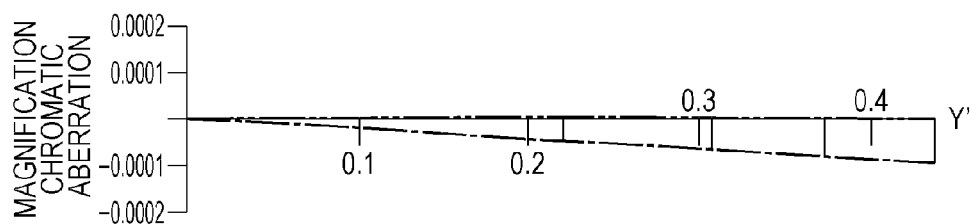
Figure 26A:
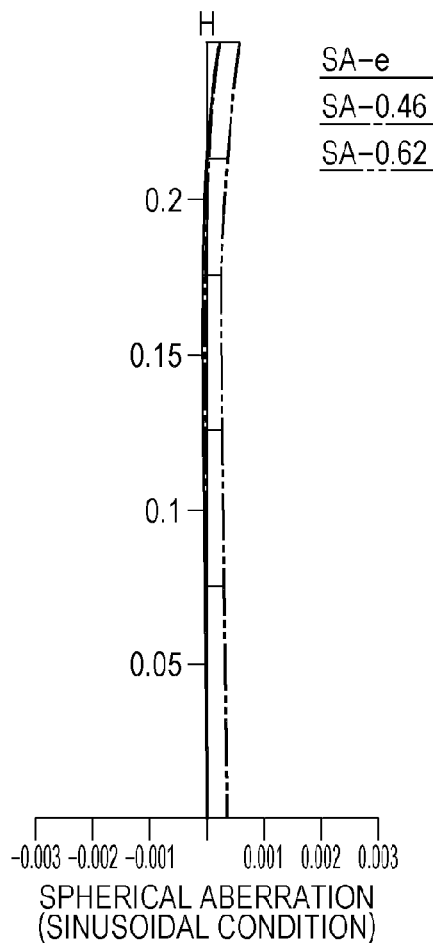
FIGS. 26A to 26D are aberration graphs at the intermediate point of the variable magnification projection optical system of Example 4.
Figure 26B:
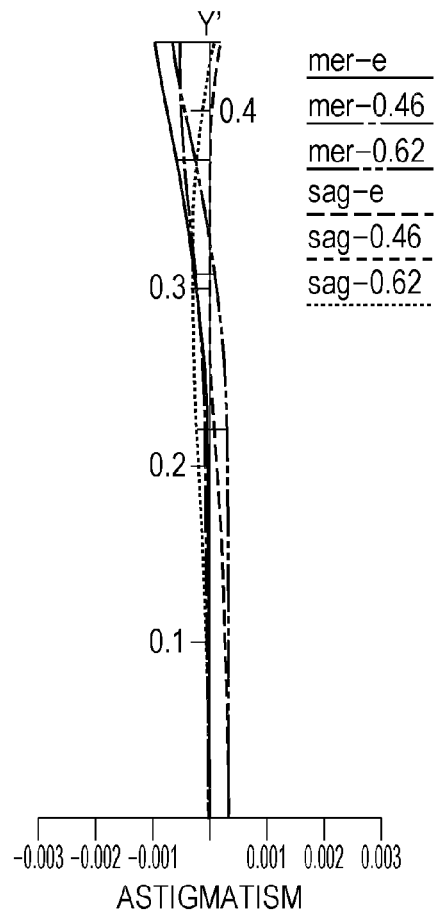
Figure 26C:
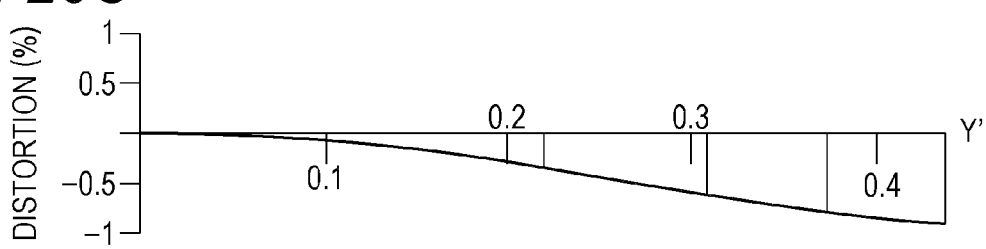
Figure 26D:
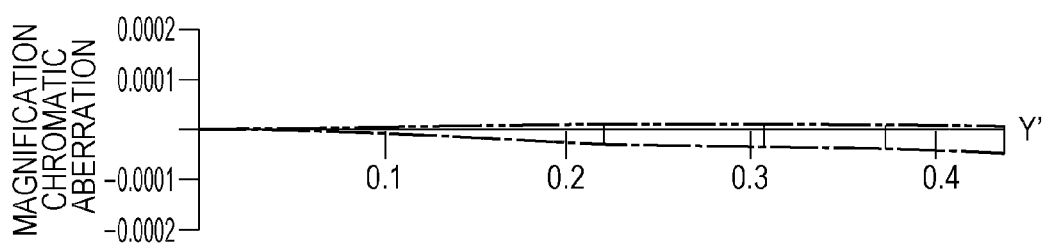
Figure 27A:
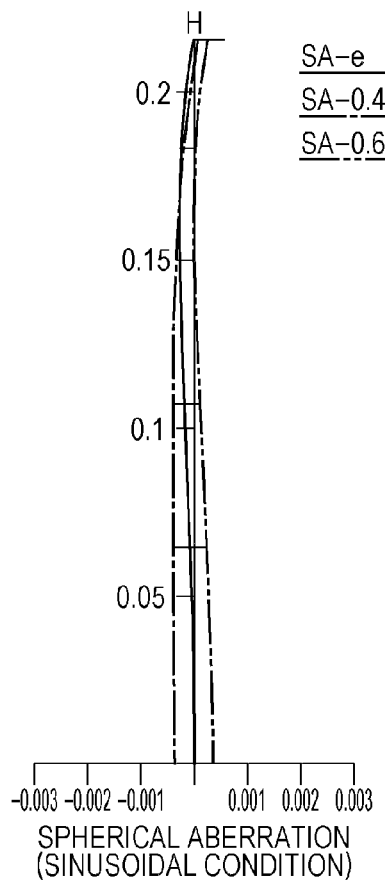
FIGS. 27A to 27D are aberration graphs at the wide-angle end of the variable magnification projection optical system of Example 4.
Figure 27B:
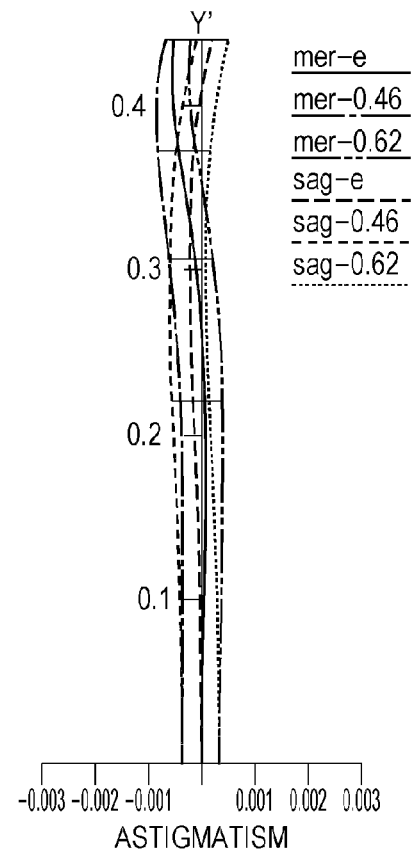
Figure 27C:
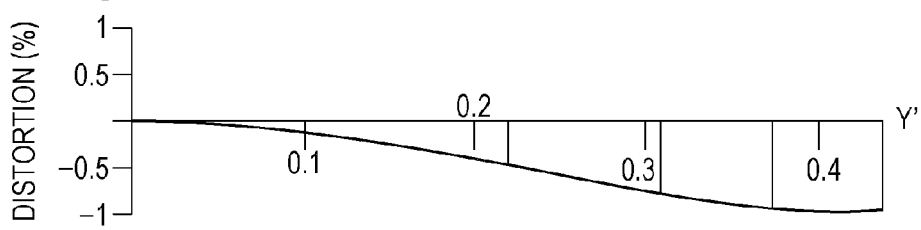
Figure 27D:
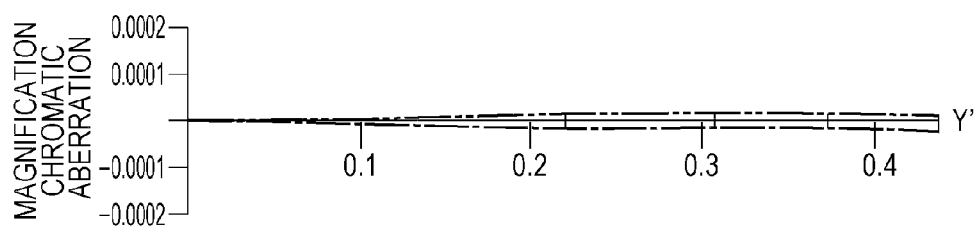
Figure 29A:
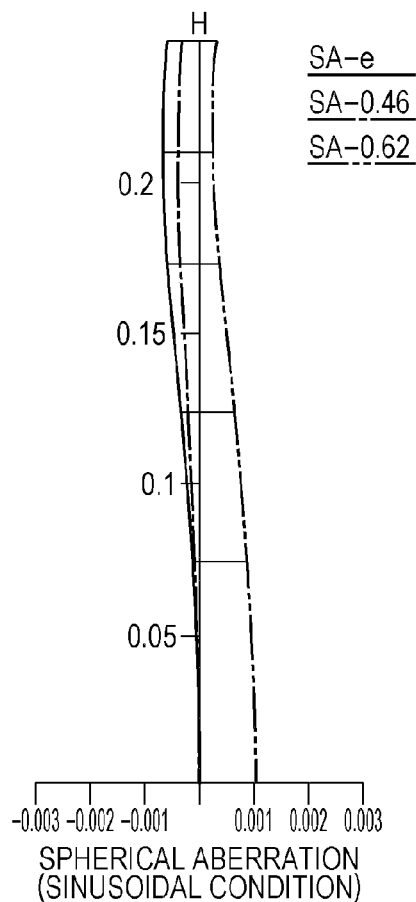
FIGS. 29A to 29D are aberration graphs at the intermediate point of the variable magnification projection optical system of Example 5.
Figure 29B:
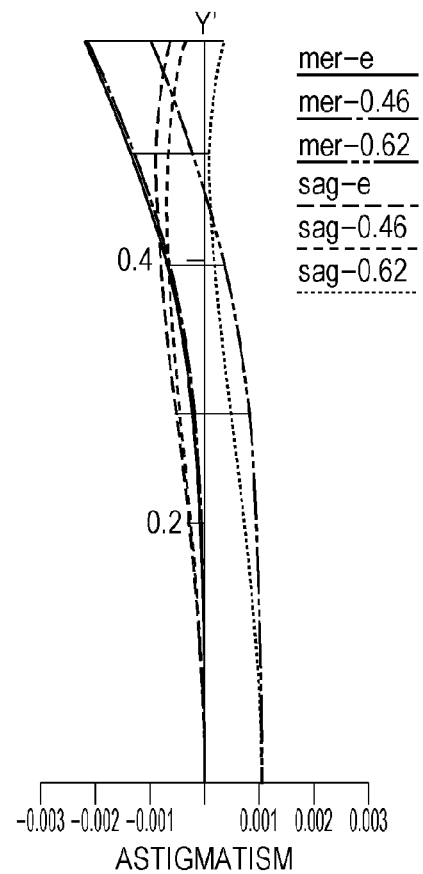
Figure 29C:
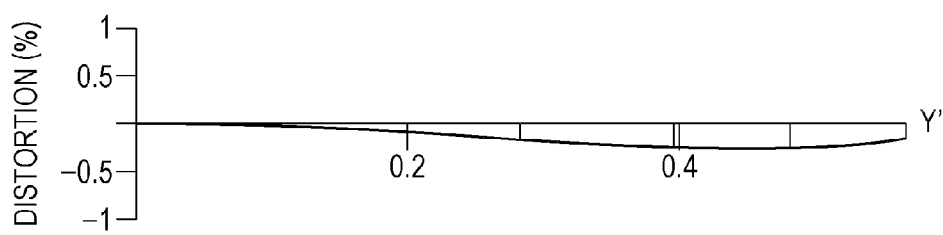
Figure 29D:
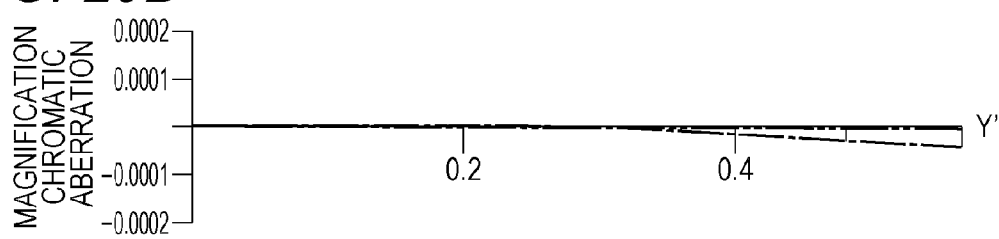
Figure 31A:
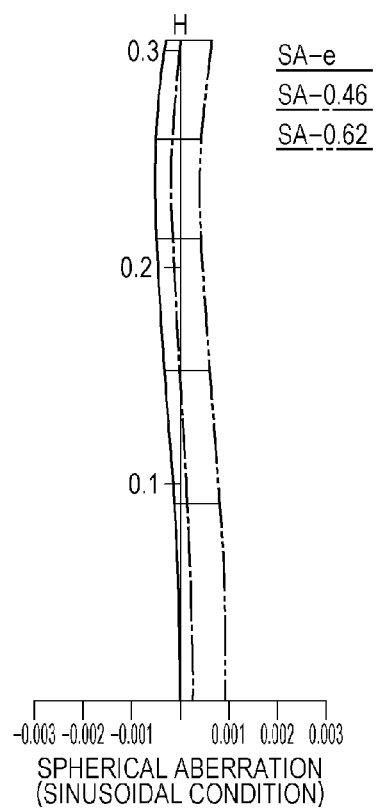
FIGS. 31A to 31D are aberration graphs at the telephoto end of the variable magnification projection optical system of Example 6.
Figure 31B:
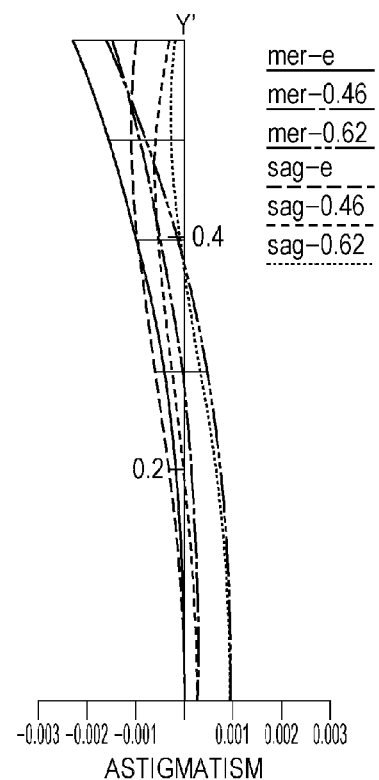
Figure 31C:
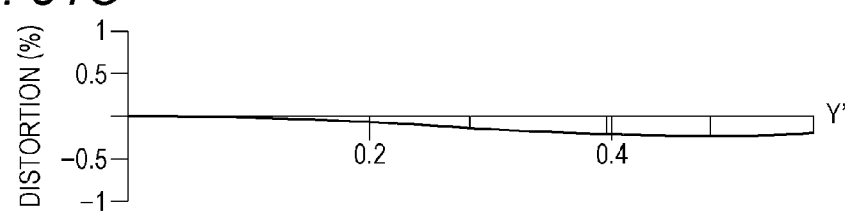
Figure 31D:
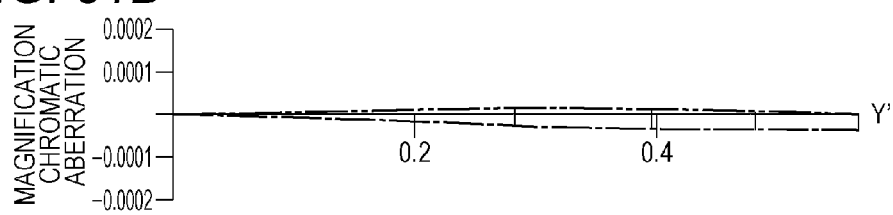
Figure 33A:
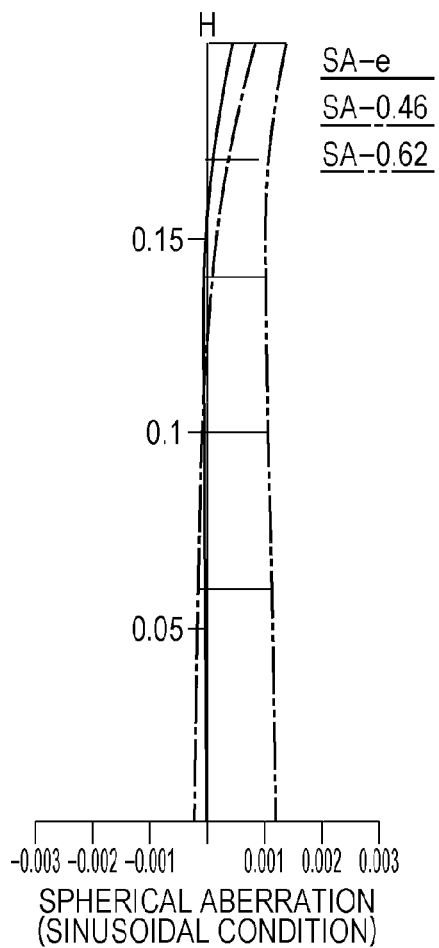
FIGS. 33A to 33D are aberration graphs at the wide-angle end of the variable magnification projection optical system of Example 6.
Figure 33B:
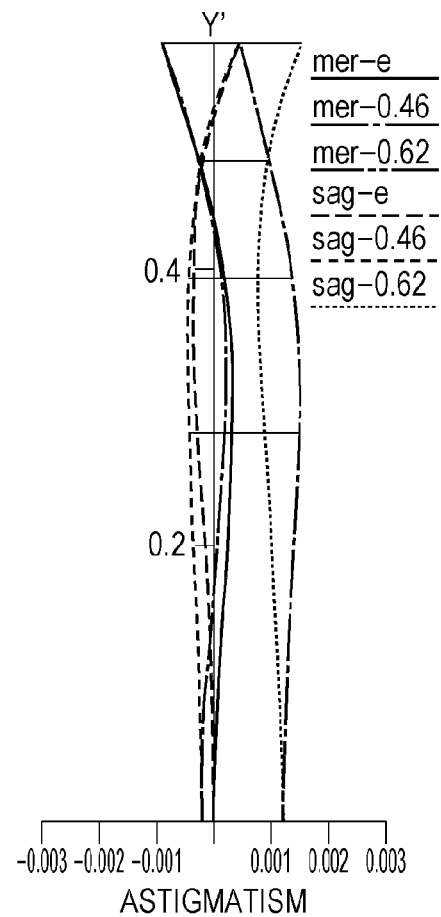
Figure 33C:
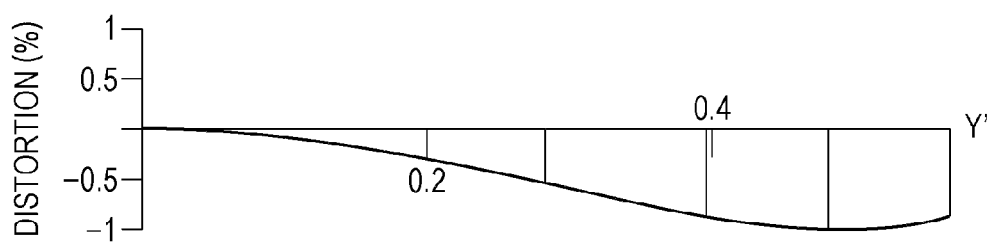
Figure 33D:
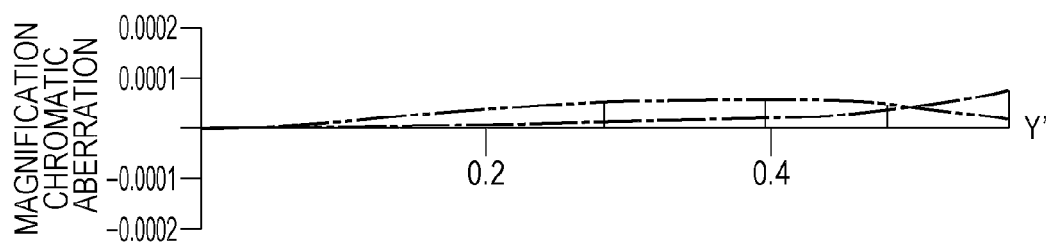

In addition, in the variable magnification projection optical system. 1F of Example 6, the first lens group Gr1 is configured to include five lenses of the 1st to 5th lenses L1 to L5, the second lens group Gr2 is configured to include two lenses of the 6th and 7th lenses L6 and L7, the third lens group Gr3 is configured to include one lens of the 8th lens L8, the fourth lens group Gr4 is configured to include three lenses of the 9th to 11th lenses L9 to L11 and the aperture stop ST as the optical stop ST, the fifth lens group Gr5 is configured to include six lenses of the 12th to 17th lenses L12 to L17, and the sixth lens group Gr6 is configured to include two lenses of the 18th and 19th lenses L18 and L19. In other words, the variable magnification projection optical system 1F according to Example 6 is configured to include 19 lenses of the 1st to 19th lenses L1 to L19. The optical stop ST is an aperture stop ST, and in Example 6, the aperture stop ST may be included in the fourth lens group Gr4 so as to be arranged closest to the reduction conjugate side in the fourth lens group, may be arranged between a lens arranged closest to the reduction conjugate side in the fourth lens group Gr4 and a lens arranged closest to the magnification conjugate side in the fifth lens group Gr5 so as to be independent, or may be included in the fifth lens group Gr5 so as to be arranged closest to the magnification conjugate side in the fifth lens group Gr5. In addition, by comparing the variable magnification projection optical system 1F according to Example 6 and each of the variable magnification projection optical systems according to Examples 3 and 4, the second lens group Gr2 is configured to include one lens in Examples 3 and 4, but the second lens group Gr2 is configured to include two lenses in Example 6. In addition, in the variable magnification projection optical system 1F of Example 6, as illustrated in FIG. 15, during changing of magnification from the telephoto end to the wide-angle end, the second, third, and fifth lens groups Gr2, Gr3, and Gr5 are substantially monotonously moved in the direction from the magnification conjugate side to the reduction conjugate side. More specifically, as illustrated in FIG. 15, the second lens group Gr2 is monotonously moved with a proportional relationship in the direction from the magnification conjugate side to the reduction conjugate side so that the locus becomes a straight line, and the third and fifth lens groups Gr3 and Gr5 are monotonously moved with a movement ratio being gradually decreased in the direction from the magnification conjugate side to the reduction conjugate side so that the locus becomes a curved line. In addition, in the variable magnification projection optical system 1F of Example 6, during changing of magnification from the telephoto end to the wide-angle end, the fourth lens group Gr4 is stationary.

In addition, during focusing (focusing manipulation, focus alignment manipulation), the first lens group Gr1 is divided into a front group Gr1A having a totally negative refracting power which is configured to include the 1st to 4th lenses L1 to L4 and a rear group Gr1B which is configured to include the 5th lens L5. In addition, during focusing, Example 6 operates according to the aspect illustrated in FIG. 3A described above. In addition, Example 6 may operate according to the aspect illustrated in FIG. 2B described above or may operate according to the aspect illustrated in FIG. 3B described above.

More specifically, in the first lens group Gr1 of the variable magnification projection optical system 1F of Example 6, the 1st lens L1 is a biconvex positive lens, the 2nd lens L2 is a negative meniscus lens which is convex to the magnification conjugate side, the 3rd lens L3 is a negative meniscus lens which is convex to the magnification conjugate side, the 4th lens L4 is a biconcave negative lens, and the 5th lens L5 is a positive meniscus lens which is convex to the reduction conjugate side.

In the second lens group Gr2 of the variable magnification projection optical system 1F of Example 6, the 6th lens L6 is a negative meniscus lens which is convex to the magnification conjugate side, and the 7th lens L7 is a biconvex positive lens.

In the third lens group Gr3 of the variable magnification projection optical system 1F of Example 6, the 8th lens L8 is a biconvex positive lens.

In the fourth lens group Gr4 of the variable magnification projection optical system 1F of Example 6, the 9th lens L9 is a biconcave negative lens, the 10th lens L10 is a negative meniscus lens which is convex to the reduction conjugate side, and the 11th lens L11 is a biconvex positive lens. In addition, the aperture stop ST is included in the fourth lens group Gr4. Therefore, during changing of magnification from the telephoto end to the wide-angle end the aperture stop ST is stationary.

In the fifth lens group Gr5 of the variable magnification projection optical system 1F of Example 6, the 12th lens L12 is a positive meniscus lens which is convex to the reduction conjugate side, the 13th lens L13 is a negative meniscus lens which is convex to the reduction conjugate side, the 14th lens L14 is a biconvex positive lens, the 15th lens L15 is a biconvex positive lens, the 16th lens L16 is a negative meniscus lens which is convex to the magnification conjugate side, and the 17th lens L17 is a positive meniscus lens which is convex to the magnification conjugate side.

In the sixth lens group Gr6 of the variable magnification projection optical system 1F of Example 6, the 18th lens L18 is a plano-convex positive lens which is convex to the magnification conjugate side, and the 19th lens L19 is a plano-convex positive lens which is convex to the magnification conjugate side.

In the above-described variable magnification projection optical systems 1A to 1F according to Examples 1 to 6, construction data of each lens are as follows. In addition, "CR" denotes a radius of curvature (unit: mm) of each surface, "d" denotes an interval (interval of surfaces on the optical axis) of each lens surface of on-axis light at an infinity focused state (focused state in infinite distance), "$n_d$" denotes a refractive index of each lens with respect to d-line (wavelength of 587.56 nm), "vd" denotes an Abbe number, and "R" denotes an effective optical path radius. In addition, since the surfaces of the aperture stop ST and the image forming surfaces of the image forming element IG are planar, the radius of curvature thereof is ∞ (infinity). In addition, with respect to the both surfaces of the prism P1 and both surfaces of the plate-shaped optical member P2 arranged if necessary, the radius of curvature is ∞ (infinity).

First, construction data of the lenses in the variable magnification projection optical system 1A of Example 1 are represented as follows.

Numerical Example 1

| Unit mm | | | | | |
|---|---|---|---|---|---|
| Surface Data | | | | | |
| Surface Number | CR | d | $n_d$ | vd | R |
| Projection Surface | ∞ | ∞ | | | |
| 1 | 4.362 | 0.431 | 1.51680 | 64.20 | 1.83 |
| 2 | 36.099 | 0.028 | | | 1.79 |
| 3 | 3.804 | 0.159 | 1.72342 | 37.99 | 1.51 |
| 4 | 2.054 | 0.434 | | | 1.30 |

-continued

| Unit mm | | | | | |
|---|---|---|---|---|---|
| 5 | 6.595 | 0.131 | 1.49700 | 81.61 | 1.24 |
| 6 | 2.358 | 0.363 | | | 1.11 |
| 7 | ∞ | 0.114 | 1.49700 | 81.61 | 1.08 |
| 8 | 3.294 | 0.479 | | | 1.01 |
| 9 | −2.490 | 0.108 | 1.69895 | 30.05 | 0.98 |
| 10 | ∞ | 0.273 | | | 0.99 |
| 11 | −3.770 | 0.179 | 1.64769 | 33.84 | 1.01 |
| 12 | −2.155 | 1.793 | | | 1.01 |
| 13 | 9.862 | 0.103 | 1.72825 | 28.32 | 0.93 |
| 14 | 3.516 | 0.057 | | | 0.93 |
| 15 | 3.517 | 0.275 | 1.51680 | 64.20 | 0.94 |
| 16 | −5.872 | 1.048 | | | 0.94 |
| 17 | 4.940 | 0.173 | 1.80610 | 33.27 | 0.85 |
| 18 | −11.784 | 1.201 | | | 0.84 |
| 19 | −3.722 | 0.080 | 1.49700 | 81.61 | 0.66 |
| 20 | 2.179 | 0.298 | | | 0.66 |
| 21 | −2.517 | 0.084 | 1.43700 | 95.10 | 0.67 |
| 22 | −10.727 | 0.382 | | | 0.69 |
| 23 | 4.525 | 0.243 | 1.54072 | 47.20 | 0.80 |
| 24 | −3.225 | 0.113 | | | 0.80 |
| 25 (Stop) | ∞ | 1.115 | | | 0.79 |
| 26 | ∞ | 0.210 | 1.43700 | 95.10 | 0.76 |
| 27 | −2.150 | 0.092 | | | 0.76 |
| 28 | −1.933 | 0.084 | 1.80610 | 40.73 | 0.74 |
| 29 | ∞ | 0.086 | | | 0.76 |
| 30 | 7.108 | 0.206 | 1.43700 | 95.10 | 0.78 |
| 31 | −3.633 | 0.317 | | | 0.78 |
| 32 | 5.414 | 0.239 | 1.49700 | 81.61 | 0.84 |
| 33 | −3.755 | 0.028 | | | 0.84 |
| 34 | ∞ | 0.093 | 1.80610 | 40.73 | 0.84 |
| 35 | 2.490 | 0.143 | | | 0.83 |
| 36 | 4.738 | 0.200 | 1.49700 | 81.61 | 0.85 |
| 37 | −5.893 | 1.518 | | | 0.85 |
| 38 | 2.685 | 0.225 | 1.49700 | 81.61 | 0.90 |
| 39 | −48.402 | 0.511 | | | 0.89 |
| 40 (Prism) | ∞ | 3.305 | 1.51680 | 64.20 | |
| 41 | ∞ | 0.142 | | | |
| 42 (Cover) | ∞ | 0.085 | 1.48749 | 70.44 | |
| 43 | ∞ | | | | |

| Various Data | Telephoto End | Intermediate Point | Wide-Angle End |
|---|---|---|---|
| Focal Length (FL) (mm) | 1.522 | 1.234 | 1.000 |
| Lens Back (LB) (mm) | 0.014 | 0.015 | 0.015 |
| F number (Fno) | 2.500 | 2.448 | 2.418 |
| Half Angle of View ($\omega_0$) (degrees) | 20.44 | 24.70 | 29.57 |

| Refracting Power of Lens Groups | |
|---|---|
| First Lens Group; 1st Surface to 12th Surface | −0.9054 |
| 1A-th Lens Group (Front Group); 1st Surface to 10th Surface | −0.6622 |
| 1B-th Lens Group (Rear Group); 9th Surface to 12th Surface | 0.1353 |
| Second Lens Group; 13th Surface to 16th Surface | 0.1029 |
| Third Lens Group; 17th Surface to 18th Surface | 0.2322 |
| Fourth Lens Group; 19th Surface to 25th Surface | −0.1145 |
| Fifth Lens Group; 26th Surface to 37th Surface | 0.0764 |
| Sixth Lens Group; 38th Surface to 39th Surface | 0.1956 |

| Distance between Lenses (mm) | Telephoto End | Intermediate Point | Wide-Angle End |
|---|---|---|---|
| 10th Surface and 11th Surface | 0.273 | 0.273 | 0.273 |
| 12th Surface and 13th Surface | 1.793 | 2.681 | 3.760 |
| 16th Surface and 17th Surface | 1.048 | 0.699 | 0.051 |
| 18th Surface and 19th Surface | 1.201 | 0.662 | 0.231 |
| 25th Surface and 26th Surface | 1.115 | 1.768 | 2.263 |
| 37th Surface and 38th Surface | 1.518 | 0.866 | 0.370 |

Next, construction data of the lenses in the variable magnification projection optical system 1B of Example 2 are represented as follows.

Numerical Example 2

Unit mm

Surface Data

| Surface Number | CR | d | $n_d$ | vd | R |
|---|---|---|---|---|---|
| Projection Surface | ∞ | ∞ | | | |
| 1 | 4.440 | 0.406 | 1.51680 | 64.20 | 1.76 |
| 2 | 45.136 | 0.028 | | | 1.72 |
| 3 | 4.002 | 0.155 | 1.72342 | 37.99 | 1.47 |
| 4 | 2.020 | 0.419 | | | 1.26 |
| 5 | 6.503 | 0.128 | 1.49700 | 81.61 | 1.21 |
| 6 | 2.353 | 0.350 | | | 1.09 |
| 7 | −1235.04 | 0.111 | 1.49700 | 81.61 | 1.06 |
| 8 | 3.502 | 0.461 | | | 0.99 |
| 9 | −2.449 | 0.107 | 1.69895 | 30.05 | 0.96 |
| 10 | 262.713 | 0.259 | | | 0.98 |
| 11 | −4.159 | 0.203 | 1.64769 | 32.17 | 0.99 |
| 12 | −2.227 | 1.641 | | | 1.01 |
| 13 | 22.590 | 0.101 | 1.72825 | 28.32 | 0.92 |
| 14 | 3.907 | 0.055 | | | 0.91 |
| 15 | 3.854 | 0.273 | 1.51680 | 64.20 | 0.93 |
| 16 | −4.966 | 0.960 | | | 0.93 |
| 17 | 4.674 | 0.180 | 1.80610 | 33.27 | 0.86 |
| 18 | −11.801 | 1.224 | | | 0.85 |
| 19 | −3.812 | 0.080 | 1.49700 | 81.61 | 0.67 |
| 20 | 2.191 | 0.592 | | | 0.66 |
| 21 | −2.448 | 0.118 | 1.43700 | 95.10 | 0.71 |
| 22 | −7.779 | 0.097 | | | 0.74 |
| 23 | 4.671 | 0.244 | 1.54072 | 47.20 | 0.78 |
| 24 | −3.045 | 0.114 | | | 0.79 |
| 25 (Stop) | ∞ | 1.206 | | | 0.78 |
| 26 | −14.307 | 0.162 | 1.43700 | 95.10 | 0.75 |
| 27 | −2.420 | 0.095 | | | 0.74 |
| 28 | −1.962 | 0.096 | 1.80610 | 40.73 | 0.74 |
| 29 | ∞ | 0.097 | | | 0.76 |
| 30 | 7.390 | 0.249 | 1.43700 | 95.10 | 0.79 |
| 31 | −2.745 | 0.135 | | | 0.80 |
| 32 | 5.590 | 0.232 | 1.49700 | 81.61 | 0.85 |
| 33 | −3.983 | 0.028 | | | 0.85 |
| 34 | 90.944 | 0.094 | 1.80610 | 40.73 | 0.85 |
| 35 | 2.470 | 0.137 | | | 0.84 |
| 36 | 4.279 | 0.211 | 1.49700 | 81.61 | 0.86 |
| 37 | −6.144 | 1.547 | | | 0.86 |
| 38 | 2.677 | 0.293 | 1.49700 | 81.61 | 0.90 |
| 39 | −68.387 | 0.511 | | | 0.89 |
| 40 (Prism) | ∞ | 3.306 | 1.51680 | 64.20 | |
| 41 | ∞ | 0.142 | | | |
| 42 (Cover) | ∞ | 0.085 | 1.48749 | 70.44 | |
| 43 | ∞ | | | | |

| Various Data | Telephoto End | Intermediate Point | Wide-Angle End |
|---|---|---|---|
| Focal Length (FL) (mm) | 1.522 | 1.234 | 1.000 |
| Lens Back (LB) (mm) | 0.014 | 0.015 | 0.015 |
| F number (Fno) | 2.500 | 2.448 | 2.410 |
| Half Angle of View ($\omega_0$) (degrees) | 20.45 | 24.71 | 29.58 |

Refracting Power of Lens Groups

| | |
|---|---|
| First Lens Group; 1st Surface to 12th Surface | −0.9152 |
| 1A-th Lens Group (Front Group); 1st Surface to 10th Surface | −0.6844 |
| 1B-th Lens Group (Rear Group); 10th Surface to 12th Surface | 0.1473 |
| Second Lens Group; 13th Surface to 16th Surface | 0.0859 |
| Third Lens Group; 17th Surface to 18th Surface | 0.2413 |
| Fourth Lens Group; 19th Surface to 25th Surface | −0.1087 |
| Fifth Lens Group; 26th Surface to 37th Surface | 0.0770 |
| Sixth Lens Group; 38th Surface to 39th Surface | 0.1932 |

Unit mm

| Distance between Lenses (mm) | Telephoto End | Intermediate Point | Wide-Angle End |
|---|---|---|---|
| 10th Surface and 11th Surface | 0.259 | 0.259 | 0.259 |
| 12th Surface and 13th Surface | 1.641 | 2.533 | 3.643 |
| 16th Surface and 17th Surface | 0.960 | 0.642 | 0.052 |
| 18th Surface and 19th Surface | 1.224 | 0.666 | 0.230 |
| 25th Surface and 26th Surface | 1.206 | 1.876 | 2.349 |
| 37th Surface and 38th Surface | 1.547 | 0.860 | 0.303 |

Next, construction data of the lenses in the variable magnification projection optical system 1C of Example 3 are represented as follows.

Numerical Example 3

Unit mm

Surface Data

| Surface Number | CR | d | $n_d$ | vd | R |
|---|---|---|---|---|---|
| Projection Surface | ∞ | ∞ | | | |
| 1 | 3.129 | 0.355 | 1.51680 | 56.04 | 1.32 |
| 2 | ∞ | 0.007 | | | 1.29 |
| 3 | 4.296 | 0.123 | 1.65844 | 50.85 | 1.14 |
| 4 | 1.543 | 0.448 | | | 0.96 |
| 5 | 83.309 | 0.097 | 1.49700 | 81.61 | 0.90 |
| 6 | 1.908 | 0.609 | | | 0.81 |
| 7 | −1.582 | 0.082 | 1.75520 | 27.53 | 0.76 |
| 8 | −12.787 | 0.184 | | | 0.80 |
| 9 | −5.349 | 0.244 | 1.51823 | 58.96 | 0.83 |
| 10 | −1.585 | 0.480 | | | 0.85 |
| 11 | ∞ | 0.190 | 1.62004 | 36.30 | 0.87 |
| 12 | −4.543 | 0.071 | | | 0.87 |
| 13 | 2.478 | 0.203 | 1.74400 | 44.90 | 0.84 |
| 14 | ∞ | 0.742 | | | 0.82 |
| 15 | 8.283 | 0.063 | 1.43700 | 95.10 | 0.58 |
| 16 | 1.474 | 0.265 | | | 0.53 |
| 17 | −1.941 | 0.056 | 1.43700 | 95.10 | 0.51 |
| 18 | 2.935 | 0.764 | | | 0.49 |
| 19 | 5.598 | 0.144 | 1.74400 | 44.90 | 0.55 |
| 20 | −4.645 | 0.708 | | | 0.55 |
| 21 (Stop) | ∞ | 0.522 | | | 0.54 |
| 22 | −3.656 | 0.127 | 1.49700 | 81.61 | 0.57 |
| 23 | −1.456 | 0.142 | | | 0.57 |
| 24 | −1.276 | 0.060 | 1.78590 | 43.93 | 0.56 |
| 25 | −8.233 | 0.083 | | | 0.59 |
| 26 | 19.662 | 0.159 | 1.49700 | 81.61 | 0.63 |
| 27 | −2.279 | 0.071 | | | 0.64 |
| 28 | 6.903 | 0.190 | 1.49700 | 81.61 | 0.67 |
| 29 | −2.441 | 0.071 | | | 0.68 |
| 30 | −42.002 | 0.073 | 1.80610 | 40.73 | 0.67 |
| 31 | 2.282 | 0.164 | | | 0.67 |
| 32 | 3.388 | 0.153 | 1.49700 | 81.61 | 0.71 |
| 33 | −11.557 | 0.959 | | | 0.72 |
| 34 | 8.909 | 0.120 | 1.49700 | 81.61 | 0.74 |
| 35 | −6.836 | 0.147 | | | 0.74 |
| 36 | 2.525 | 0.195 | 1.49700 | 81.61 | 0.75 |
| 37 | ∞ | 0.439 | | | 0.75 |
| 38 (Prism) | ∞ | 2.767 | 1.51680 | 64.20 | |
| 39 | ∞ | 0.119 | | | |
| 40 (Cover) | ∞ | 0.071 | 1.48749 | 70.44 | |
| 41 | ∞ | | | | |

| Various Data | Telephoto End | Intermediate Point | Wide-Angle End |
|---|---|---|---|
| Focal Length (FL) (mm) | 1.363 | 1.167 | 1.000 |
| Lens Back (LB) (mm) | 0.012 | 0.012 | 0.012 |
| F number (Fno) | 2.500 | 2.447 | 2.398 |

| Unit mm | | | |
|---|---|---|---|
| Half Angle of View ($\omega_0$) (degrees) | 19.22 | 22.14 | 25.41 |

| Refracting Power of Lens Groups | |
|---|---|
| First Lens Group; 1st Surface to 10th Surface | −0.9361 |
| 1A-th Lens Group (Front Group); 1st Surface to 8th Surface | −0.8049 |
| 1B-th Lens Group (Rear Group); 9th Surface to 10th Surface | 0.2360 |
| Second Lens Group; 11th Surface to 12th Surface | 0.1374 |
| Third Lens Group; 13th Surface to 14th Surface | 0.3018 |
| Fourth Lens Group; 15th Surface to 21st Surface | −0.1754 |
| Fifth Lens Group; 22nd Surface to 33rd Surface | 0.0589 |
| Sixth Lens Group; 34th Surface to 37th Surface | 0.3213 |

| Distance between Lenses (mm) | Telephoto End | Intermediate Point | Wide-Angle End |
|---|---|---|---|
| 8th Surface and 9th Surface | 0.184 | 0.184 | 0.184 |
| 10th Surface and 11th Surface | 0.480 | 0.720 | 1.045 |
| 12th Surface and 13th Surface | 0.071 | 0.183 | 0.177 |
| 14th Surface and 15th Surface | 0.742 | 0.390 | 0.071 |
| 21st Surface and 22nd Surface | 0.522 | 0.946 | 1.363 |
| 33rd Surface and 34th Surface | 0.959 | 0.536 | 0.119 |

Next, construction data of the lenses in the variable magnification projection optical system 1D of Example 4 are represented as follows.

Numerical Example 4

| Unit mm | | | | |
|---|---|---|---|---|
| Surface Data | | | | |
| Surface Number | CR | d | $n_d$ | vd | R |
| Projection Surface | ∞ | ∞ | | | |
| 1 | 2.825 | 0.332 | 1.58913 | 61.25 | 1.22 |
| 2 | ∞ | 0.007 | | | 1.19 |
| 3 | 4.542 | 0.115 | 1.49700 | 81.61 | 1.07 |
| 4 | 1.276 | 0.431 | | | 0.87 |
| 5 | ∞ | 0.091 | 1.49700 | 81.61 | 0.83 |
| 6 | 2.288 | 0.385 | | | 0.76 |
| 7 | −1.835 | 0.080 | 1.75520 | 27.53 | 0.73 |
| 8 | 16.304 | 0.322 | | | 0.74 |
| 9 | −3.393 | 0.177 | 1.56732 | 42.84 | 0.77 |
| 10 | −1.593 | 0.276 | | | 0.79 |
| 11 | 3.531 | 0.166 | 1.58913 | 61.25 | 0.81 |
| 12 | ∞ | 0.109 | | | 0.81 |
| 13 | 3.360 | 0.150 | 1.83400 | 37.34 | 0.79 |
| 14 | ∞ | 1.164 | | | 0.78 |
| 15 | 3.327 | 0.071 | 1.43700 | 95.10 | 0.47 |
| 16 | 1.281 | 0.200 | | | 0.44 |
| 17 | −1.617 | 0.071 | 1.49700 | 81.61 | 0.42 |
| 18 | 3.850 | 0.690 | | | 0.41 |
| 19 | 5.551 | 0.133 | 1.70154 | 41.15 | 0.54 |
| 20 | −3.143 | 0.221 | | | 0.54 |
| 21 (Stop) | ∞ | 0.235 | | | 0.54 |
| 22 | −3.470 | 0.146 | 1.49700 | 81.61 | 0.55 |
| 23 | −1.300 | 0.066 | | | 0.55 |
| 24 | −1.214 | 0.066 | 1.80610 | 40.73 | 0.54 |
| 25 | −6.632 | 0.093 | | | 0.56 |
| 26 | 7.800 | 0.172 | 1.49700 | 81.61 | 0.59 |
| 27 | −2.194 | 0.211 | | | 0.60 |
| 28 | ∞ | 0.155 | 1.49700 | 81.61 | 0.64 |
| 29 | −2.827 | 0.349 | | | 0.64 |
| 30 | ∞ | 0.077 | 1.80610 | 40.73 | 0.65 |
| 31 | 2.203 | 0.080 | | | 0.65 |
| 32 | 2.865 | 0.168 | 1.49700 | 81.61 | 0.67 |
| 33 | −6.632 | 1.095 | | | 0.67 |
| 34 | 4.052 | 0.121 | 1.49700 | 81.61 | 0.69 |
| 35 | −39.194 | 0.137 | | | 0.69 |
| 36 | 2.609 | 0.150 | 1.49700 | 81.61 | 0.70 |
| 37 | ∞ | 0.398 | | | 0.69 |
| 38 (Prism) | ∞ | 2.576 | 1.51680 | 64.20 | |
| 39 | ∞ | 0.111 | | | |
| 40 (Cover) | ∞ | 0.066 | 1.48749 | 70.44 | |
| 41 | ∞ | | | | |

| Various Data | Telephoto End | Intermediate Point | Wide-Angle End |
|---|---|---|---|
| Focal Length (FL) (mm) | 1.453 | 1.206 | 1.000 |
| Lens Back (LB) (mm) | 0.011 | 0.011 | 0.011 |
| F number (Fno) | 2.500 | 2.411 | 2.325 |
| Half Angle of View ($\omega_0$) (degrees) | 16.93 | 20.14 | 23.85 |

| Refracting Power of Lens Groups | |
|---|---|
| First Lens Group; 1st Surface to 10th Surface | −0.9627 |
| 1A-th Lens Group (Front Group); 1st Surface to 8th Surface | −0.7412 |
| 1B-th Lens Group (Rear Group); 9th Surface to 10th Surface | 0.1957 |
| Second Lens Group; 11th Surface to 12th Surface | 0.1668 |
| Third Lens Group; 13th Surface to 14th Surface | 0.2482 |
| Fourth Lens Group; 15th Surface to 21st Surface | −0.1240 |
| Fifth Lens Group; 22nd Surface to 33rd Surface | 0.0873 |
| Sixth Lens Group; 34th Surface to 37th Surface | 0.3203 |

| Distance between Lenses (mm) | Telephoto End | Intermediate Point | Wide-Angle End |
|---|---|---|---|
| 8th Surface and 9th Surface | 0.322 | 0.322 | 0.322 |
| 10th Surface and 11th Surface | 0.276 | 0.408 | 0.652 |
| 12th Surface and 13th Surface | 0.109 | 0.546 | 0.829 |
| 14th Surface and 15th Surface | 1.164 | 0.595 | 0.068 |
| 21st Surface and 22nd Surface | 0.235 | 0.741 | 1.235 |
| 33rd Surface and 34th Surface | 1.095 | 0.589 | 0.095 |

Next, construction data of the lenses in the variable magnification projection optical system 1E of Example 5 are represented as follows.

Numerical Example 5

| Unit mm | | | | | |
|---|---|---|---|---|---|
| Surface Data | | | | | |
| Surface Number | CR | d | $n_d$ | vd | R |
| Projection Surface | ∞ | ∞ | | | |
| 1 | 4.910 | 0.396 | 1.51680 | 64.20 | 1.75 |
| 2 | 1339.510 | 0.009 | | | 1.71 |
| 3 | 5.037 | 0.173 | 1.67270 | 32.17 | 1.50 |
| 4 | 2.110 | 0.386 | | | 1.27 |
| 5 | 7.338 | 0.142 | 1.49700 | 81.61 | 1.23 |
| 6 | 2.528 | 0.373 | | | 1.11 |
| 7 | −30.911 | 0.124 | 1.49700 | 81.61 | 1.07 |
| 8 | 4.200 | 0.471 | | | 1.01 |
| 9 | −2.299 | 0.113 | 1.67270 | 32.17 | 0.98 |
| 10 | 38.486 | 0.269 | | | 1.01 |
| 11 | −5.249 | 0.262 | 1.67270 | 32.17 | 1.03 |
| 12 | −2.250 | 1.894 | | | 1.04 |
| 13 | 7.878 | 0.121 | 1.67270 | 32.17 | 0.97 |
| 14 | 2.937 | 0.060 | | | 0.96 |
| 15 | 2.983 | 0.324 | 1.51680 | 64.20 | 0.97 |
| 16 | −6.378 | 1.443 | | | 0.97 |
| 17 | 4.835 | 0.176 | 1.72342 | 37.99 | 0.85 |
| 18 | −9.197 | 1.148 | | | 0.85 |
| 19 | −4.453 | 0.084 | 1.43700 | 95.10 | 0.67 |
| 20 | 1.797 | 0.312 | | | 0.66 |
| 21 | −2.849 | 0.083 | 1.49700 | 81.61 | 0.67 |
| 22 | −11.462 | 0.212 | | | 0.69 |

-continued

Unit mm

| | | | | | |
|---|---|---|---|---|---|
| 23 | 2.965 | 0.231 | 1.54814 | 45.82 | 0.74 |
| 24 | −5.007 | 0.006 | | | 0.75 |
| 25 (Stop) | ∞ | 0.928 | | | 0.74 |
| 26 | 9.243 | 0.170 | 1.43700 | 95.10 | 0.69 |
| 27 | −2.865 | 0.197 | | | 0.69 |
| 28 | −2.003 | 0.081 | 1.80610 | 40.73 | 0.65 |
| 29 | 3.403 | 0.096 | | | 0.66 |
| 30 | 5.836 | 0.201 | 1.49700 | 81.61 | 0.69 |
| 31 | −2.985 | 0.500 | | | 0.70 |
| 32 | 5.188 | 0.336 | 1.49700 | 81.61 | 0.87 |
| 33 | −2.288 | 0.006 | | | 0.88 |
| 34 | 29.139 | 0.109 | 1.80610 | 40.73 | 0.87 |
| 35 | 2.388 | 0.119 | | | 0.85 |
| 36 | 3.426 | 0.204 | 1.49700 | 81.61 | 0.87 |
| 37 | −13.106 | 0.987 | | | 0.88 |
| 38 | 2.625 | 0.226 | 1.49700 | 81.61 | 0.90 |
| 39 | −77.078 | 0.511 | | | 0.89 |
| 40 (Prism) | ∞ | 3.307 | 1.51680 | 64.20 | |
| 41 | ∞ | 0.142 | | | |
| 42 (Cover) | ∞ | 0.085 | 1.48749 | 70.44 | |
| 43 | ∞ | | | | |

| Various Data | Telephoto End | Intermediate Point | Wide-Angle End |
|---|---|---|---|
| Focal Length (FL) (mm) | 1.522 | 1.234 | 1.000 |
| Lens Back (LB) (mm) | 0.013 | 0.014 | 0.014 |
| F number (Fno) | 2.500 | 2.492 | 2.491 |
| Half Angle of View ($\omega_0$) (degrees) | 20.45 | 24.71 | 29.59 |

Refracting Power of Lens Groups

| | |
|---|---|
| First Lens Group; 1st Surface to 12th Surface | −0.9089 |
| 1A-th Lens Group (Front Group); 1st Surface to 10th Surface | −0.7200 |
| 1B-th Lens Group (Rear Group); 11th Surface to 12th Surface | 0.1782 |
| Second Lens Group; 13th Surface to 16th Surface | 0.1120 |
| Third Lens Group; 17th Surface to 18th Surface | 0.2285 |
| Fourth Lens Group; 19th Surface to 25th Surface | −0.1156 |
| Fifth Lens Group; 26th Surface to 37th Surface | 0.0595 |
| Sixth Lens Group; 38th Surface to 39th Surface | 0.1962 |

| Distance between Lenses (mm) | Telephoto End | Intermediate Point | Wide-Angle End |
|---|---|---|---|
| 10th Surface and 11th Surface | 0.269 | 0.269 | 0.269 |
| 12th Surface and 13th Surface | 1.894 | 2.963 | 4.164 |
| 16th Surface and 17th Surface | 1.443 | 0.905 | 0.099 |
| 18th Surface and 19th Surface | 1.148 | 0.618 | 0.223 |
| 25th Surface and 26th Surface | 0.928 | 1.474 | 1.858 |
| 37th Surface and 38th Surface | 0.987 | 0.441 | 0.057 |

Next, construction data of the lenses in the variable magnification projection optical system 1F of Example 6 are represented as follows.

Numerical Example 6

Unit mm

Surface Data

| Surface Number | CR | d | $n_d$ | vd | R |
|---|---|---|---|---|---|
| Projection Surface | ∞ | ∞ | | | |
| 1 | 5.266 | 0.395 | 1.51680 | 64.20 | 1.75 |
| 2 | −68.988 | 0.009 | | | 1.72 |
| 3 | 4.409 | 0.161 | 1.65844 | 50.85 | 1.46 |
| 4 | 1.955 | 0.457 | | | 1.23 |
| 5 | 12.704 | 0.130 | 1.49700 | 81.61 | 1.18 |
| 6 | 2.499 | 0.567 | | | 1.06 |
| 7 | −2.813 | 0.116 | 1.80610 | 33.27 | 1.01 |

-continued

Unit mm

| | | | | | |
|---|---|---|---|---|---|
| 8 | 11.406 | 0.581 | | | 1.01 |
| 9 | −3.620 | 0.182 | 1.64769 | 33.84 | 1.04 |
| 10 | −2.228 | 1.493 | | | 1.05 |
| 11 | 18.145 | 0.121 | 1.75520 | 27.53 | 1.05 |
| 12 | 3.246 | 0.065 | | | 1.05 |
| 13 | 3.365 | 0.357 | 1.65844 | 50.85 | 1.07 |
| 14 | −6.462 | 1.064 | | | 1.07 |
| 15 | 4.846 | 0.211 | 1.80610 | 33.27 | 0.97 |
| 16 | −10.392 | 1.197 | | | 0.97 |
| 17 | −6.155 | 0.081 | 1.43700 | 95.10 | 0.65 |
| 18 | 1.980 | 0.284 | | | 0.61 |
| 19 | −2.276 | 0.105 | 1.49700 | 81.61 | 0.61 |
| 20 | −6.594 | 0.815 | | | 0.63 |
| 21 | 5.184 | 0.190 | 1.51823 | 58.96 | 0.75 |
| 22 | −3.809 | 0.114 | | | 0.75 |
| 23 (Stop) | ∞ | 0.369 | | | 0.74 |
| 24 | −24.988 | 0.156 | 1.43700 | 95.10 | 0.71 |
| 25 | −2.374 | 0.133 | | | 0.71 |
| 26 | −1.722 | 0.080 | 1.77250 | 49.62 | 0.69 |
| 27 | −140179.337 | 0.369 | | | 0.71 |
| 28 | 7.142 | 0.281 | 1.43700 | 95.10 | 0.80 |
| 29 | −2.307 | 0.006 | | | 0.82 |
| 30 | 28.423 | 0.185 | 1.49700 | 81.61 | 0.84 |
| 31 | −3.245 | 0.023 | | | 0.84 |
| 32 | 25.970 | 0.097 | 1.80610 | 40.73 | 0.83 |
| 33 | 1.929 | 0.086 | | | 0.82 |
| 34 | 2.172 | 0.233 | 1.49700 | 81.61 | 0.85 |
| 35 | 50.581 | 1.919 | | | 0.85 |
| 36 | 7.555 | 0.111 | 1.49700 | 81.61 | 0.89 |
| 37 | ∞ | 0.028 | | | 0.89 |
| 38 | 2.963 | 0.198 | 1.49700 | 81.61 | 0.90 |
| 39 | ∞ | 0.511 | | | 0.89 |
| 40 (Prism) | ∞ | 3.307 | 1.51680 | 64.20 | |
| 41 | ∞ | 0.142 | | | |
| 42 (Cover) | ∞ | 0.085 | 1.48749 | 70.44 | |
| 43 | ∞ | | | | |

| Various Data | Telephoto End | Intermediate Point | Wide-Angle End |
|---|---|---|---|
| Focal Length (FL) (mm) | 1.522 | 1.234 | 1.000 |
| Lens Back (LB) (mm) | 0.013 | 0.014 | 0.013 |
| F number (Fno) | 2.500 | 2.492 | 2.500 |
| Half Angle of View ($\omega_0$) (degrees) | 20.45 | 24.71 | 29.58 |

Refracting Power of Lens Groups

| | |
|---|---|
| First Lens Group; 1st Surface to 10th Surface | −0.9022 |
| 1A-th Lens Group (Front Group); 1st Surface to 8th Surface | −0.6296 |
| 1B-th Lens Group (Rear Group); 9th Surface to 10th Surface | 0.1184 |
| Second Lens Group; 11th Surface to 14th Surface | 0.1097 |
| Third Lens Group; 15th Surface to 16th Surface | 0.2441 |
| Fourth Lens Group; 17th Surface to 23rd Surface | −0.0887 |
| Fifth Lens Group; 24th Surface to 35th Surface | 0.0176 |
| Sixth Lens Group; 36th Surface to 39th Surface | 0.2331 |

| Distance between Lenses (mm) | Telephoto End | Intermediate Point | Wide-Angle End |
|---|---|---|---|
| 8th Surface and 9th Surface | 0.581 | 0.269 | 0.269 |
| 10th Surface and 11th Surface | 1.493 | 2.963 | 4.164 |
| 14th Surface and 15th Surface | 1.064 | 0.905 | 0.099 |
| 16th Surface and 17th Surface | 1.197 | 0.618 | 0.223 |
| 23rd Surface and 24th Surface | 0.369 | 1.474 | 1.858 |
| 35th Surface and 36th Surface | 1.919 | 0.441 | 0.057 |

Under the lens arrangement and configurations described above, the aberrations in the variable magnification projection optical systems 1A to 1F according to Examples 1 to 6 are illustrated in FIGS. 16A to 16D to FIGS. 33A to 33D. FIGS. 16A to 16D, FIGS. 19A to 19D, FIGS. 22A to 22D, FIGS. 25A to 25D, FIGS. 28A to 28D, and FIGS. 31A to 31D are aberration graphs at the telephoto end, FIGS. 17A to 17D, FIGS. 20A to 20D, FIGS. 23A to 23D, FIGS. 26A to 26D, FIGS. 29A to 29D, and FIGS. 32A to 32D are aberration graphs at the intermediate point, and FIGS. 18A to 18D, FIGS. 21A to 21D, FIGS. 24A to 24D, FIGS. 27A to 27D, FIGS. 30A to 30D, and FIGS. 33A to 33D are aberration graphs at the wide-angle end.

FIGS. 16A to 33A illustrate spherical aberration (sinusoidal condition). The horizontal axis denotes deviation of focal positions in units of mm, and the vertical axis denotes coordinates of light beams on the entrance pupil in units of mm. The solid line indicates spherical aberration with respect to e-line, the one-dot dashed line indicates spherical aberration with respect to wavelength 460 nm, and the two-dot dashed line indicates spherical aberration with respect to wavelength 620 nm. FIGS. 16B to 33B illustrate astigmatism. The horizontal axis denotes deviation of focal positions in units of mm, and the vertical axis denotes image heights in units of mm. The solid line indicates astigmatism with respect to e-line on the tangential (meridional) surface, the one-dot dashed line indicates astigmatism with respect to wavelength 460 nm on the tangential surface, and the two-dot dashed line indicates astigmatism with respect to wavelength 620 nm on the tangential surface. In addition, the broken line by the line having the shortest length indicates astigmatism on the sagittal (radial) surface with respect to e-line, the broken line by the line having the next shortest length (intermediate length) indicates astigmatism on the sagittal surface with respect to wavelength 460 nm, and the broken line by the line having the longest length indicates astigmatism on the sagittal surface with respect to wavelength 620 nm. FIGS. 16C to 33C illustrate distortion. The vertical axis denotes actual image heights as a ratio (%) to an ideal image height, and the horizontal axis denotes image heights in units of mm. FIGS. 16D to 33D illustrate magnification chromatic aberration. The vertical axis denotes deviation of coordinates of light beams on an image plane with respect to d-line in units of mm, and the horizontal axis denotes image heights in units of mm. The solid line indicates magnification chromatic aberration with respect to e-line, the one-dot dashed line indicates magnification chromatic aberration with respect to wavelength 460 nm, and the two-dot dashed line indicates magnification chromatic aberration with respect to wavelength 620 nm.

Table 1 lists examples of the glass material having abnormal dispersibility which can be very appropriately used for each lens of the variable magnification projection optical systems 1A to 1F according to Examples 1 to 6 described above.

TABLE 1

| | Name of Glass Material | Maker | νd | θgF | ΔθgF | nC | nd | nF | ng |
|---|---|---|---|---|---|---|---|---|---|
| 1 | FC5 | HOYA | 70.44 | 0.53059 | 0.00528 | 1.48535 | 1.48749 | 1.49227 | 1.49594 |
| | N-FK5 | SCHOTT | 70.41 | 0.52897 | 0.00359 | 1.48535 | 1.48749 | 1.49227 | 1.49593 |
| | S-FSL5 | OHARA | 70.24 | 0.53005 | 0.00439 | 1.48534 | 1.48749 | 1.49229 | 1.49596 |
| | E-FK5 | HIKARI | 70.41 | 0.52896 | 0.00359 | 1.48535 | 1.48749 | 1.49227 | 1.49593 |
| | H-QK3L | CDGM | 70.42 | 0.53037 | 0.00501 | 1.48535 | 1.48749 | 1.49227 | 1.49594 |
| 2 | FCD1 | HOYA | 81.61 | 0.53885 | 0.03232 | 1.49514 | 1.49700 | 1.50123 | 1.50451 |
| | NPK52A | SCHOTT | 81.61 | 0.53766 | 0.03113 | 1.49514 | 1.49700 | 1.50123 | 1.50450 |
| | S-FPL51 | OHARA | 81.55 | 0.53746 | 0.03082 | 1.49514 | 1.49700 | 1.50123 | 1.50451 |
| | E-FK01 | HIKARI | 81.63 | 0.53723 | 0.03073 | 1.49514 | 1.49700 | 1.50123 | 1.50450 |
| | H-FK61 | CDGM | 81.59 | 0.53699 | 0.03043 | 1.49513 | 1.49700 | 1.50122 | 1.50450 |
| 3 | FCD100 | HOYA | 95.10 | 0.53362 | 0.04978 | 1.43559 | 1.43700 | 1.44019 | 1.44264 |
| | S-FPL53 | OHARA | 94.95 | 0.53431 | 0.05020 | 1.43733 | 1.43875 | 1.44195 | 1.44442 |

In addition, Table 2 lists the numerical values in the case where the above-described condition expressions (1) to (17) are applied to the variable magnification projection optical systems 1A to 1F according to Examples 1 to 6.

TABLE 2

| | | Example 1 | Example 2 | Example 3 | Example 4 | Example 5 | Example 6 |
|---|---|---|---|---|---|---|---|
| $|Et/ft|$ | (1) | 37.28 | 37.30 | 34.88 | 29.75 | 37.30 | 37.29 |
| $|Ew/fw|$ | (2) | 56.74 | 56.83 | 71.61 | 43.88 | 56.78 | 56.77 |
| φ23t/φ23w | (3) | 0.929 | 0.943 | 1.010 | 1.079 | 0.898 | 0.924 |
| ΔθgF | (4) | 0.03232 | 0.03232 | 0.04978 | 0.03232 | 0.04978 | 0.04978 |
| | (6) | | | | | | |
| (Σ(ΔθgF4i × φ4i))/φw | (5) | −0.018 | −0.018 | −0.031 | −0.025 | −0.021 | −0.019 |
| | (7) | | | | | | |
| (Σ(ΔθgF5i × φ5i))/φw | (8) | 0.039 | 0.038 | 0.037 | 0.038 | 0.042 | 0.041 |
| | (10) | | | | | | |
| dz5/fw | (9) | 1.148 | 1.244 | 0.841 | 1.000 | 0.930 | 1.623 |
| | (11) | | | | | | |
| ΔθgF | (12) | 0.03232 | 0.03232 | 0.03232 | 0.03232 | 0.03232 | 0.03232 |
| φ14t/φt | (13) | 0.13589 | 0.14007 | −0.00760 | −0.02318 | 0.25253 | 0.25940 |
| φ14w/φw | (14) | 0.17127 | 0.17857 | −0.00031 | −0.00450 | 0.27451 | 0.26747 |
| dz2/fw | (15) | 1.967 | 2.002 | 0.565 | 0.376 | 2.270 | 1.987 |
| ft/fw | (16) | 1.52 | 1.52 | 1.36 | 1.45 | 1.52 | 1.52 |
| ωw | (17) | 29.57 | 29.58 | 25.41 | 23.85 | 29.59 | 29.58 |

Heretofore, as described above, the variable magnification projection optical systems 1A to 1F according to Examples 1 to 6 satisfy the above-described requirements, so that it is possible to sufficiently suppress various types of aberration such as spherical aberration, image surface curvature, axial chromatic aberration, and magnification chromatic aberration and implement a higher resolving power.

Although the present invention are appropriately and sufficiently described by employing the embodiments with reference to the drawings so as to represent the present invention, it should be noted that changes and/or modifications of the above-described embodiments can be easily made by the ordinarily skilled in the art. Therefore, it should be noted that the changes or modifications made by the ordinarily skilled are also included in the scope of the claims without departing from the scope disclosed in the claims.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A variable magnification projection optical system comprising: in order from a magnification conjugate side to a reduction conjugate side,
    a first lens group having a totally negative refracting power and being stationary during changing of magnification;
    a second lens group having a totally positive refracting power and being movable during changing of magnification;
    a third lens group having a totally positive refracting power and being movable during changing of magnification;
    a fourth lens group having a totally negative refracting power and being stationary or movable during changing of magnification;
    a fifth lens group having a totally positive refracting power and being movable during changing of magnification;
    a sixth lens group having a totally positive refracting power and being stationary during changing of magnification; and
    an optical stop which is arranged at any position from a front of a lens arranged closest to the magnification conjugate side in the fourth lens group to a front of a lens arranged closest to the magnification conjugate side in the fifth lens group,
    wherein the fourth lens group is configured to include, in order from the magnification conjugate side, two or more negative lenses and a positive lens, and
    wherein the following condition expressions (1), (2) and (3) are satisfied:

$$|E_T/f_T| \geq 10 \qquad (1)$$

$$|E_W/f_W| \geq 15 \qquad (2)$$

$$0.87 \leq \phi_{23T}/\phi_{23W} \leq 1.15 \qquad (3)$$

wherein,
    $E_T$; a paraxial exit pupil position at the telephoto end
    $E_W$; a paraxial exit pupil position at the wide-angle end
    $f_T$; a focal length at the telephoto end
    $f_W$; a focal length at the wide-angle end
    $\phi_{23T}$; a composite refracting power of the second and third lens groups at the telephoto end
    $\phi_{23W}$; a composite refracting power of the second and third lens groups at the wide-angle end.

2. The variable magnification projection optical system according to claim 1, wherein during changing of magnification from a telephoto end to a wide-angle end, the third and fifth lens groups are moved from the magnification conjugate side to the reduction conjugate side.

3. The variable magnification projection optical system according to claim 1,
    wherein at least one of the negative lenses included in the fourth lens group satisfies the following condition expression (4), and
    wherein the entire negative lenses included in the fourth lens group satisfy the following condition expression (5);

$$0.003 \leq \Delta\theta_{gF} \leq 0.055 \qquad (4)$$

$$-0.035 \leq (\Sigma(\Delta\theta_{gF4i} \times \phi_{4i}))/\phi_W \leq -0.001 \qquad (5)$$

wherein,
    $\Delta\theta_{gF4i}$; $\Delta\theta_{gF}$ of the i-th negative lens from the magnification conjugate side which is included in the fourth lens group $$\Delta\theta_{gF} = \theta_{gF} - (0.06438 - 0.01682 \times vd)$$

$$\theta_{gF} = (n_g - n_F)/(n_F - n_C)$$

vd; Abbe number
    $\phi_{4i}$; a refracting power of the i-th negative lens from the magnification conjugate side which is included in the fourth lens group
    $\phi_W$; a composite refracting power of the entire optical system at the wide-angle end.

4. The variable magnification projection optical system according to claim 1,
    wherein at least one of the negative lenses included in the fourth lens group satisfies the following condition expression (6), and
    wherein the entire negative lenses included in the fourth lens group satisfy the following condition expression (7);

$$0.03 \leq \Delta\theta_{gF} \leq 0.055 \qquad (6)$$

$$-0.035 \leq (\Sigma(\Delta\theta_{gF4i} \times \phi_{4i}))/\phi_W \leq -0.01 \qquad (7)$$

wherein,
    $\Delta\theta_{gF4i}$; $\Delta\theta_{gF}$ of the i-th negative lens from the magnification conjugate side which is included in the fourth lens group $$\Delta\theta_{gF} = \theta_{gF} - (0.06438 - 0.01682 \times vd)$$

$$\theta_{gF} = (n_g - n_F)/(n_F - n_C)$$

vd; Abbe number
    $\phi_{4i}$; a refracting power of the i-th negative lens from the magnification conjugate side which is included in the fourth lens group
    $\phi_W$; a composite refracting power of the entire optical system at the wide-angle end.

5. The variable magnification projection optical system according to claim 1, wherein lenses included in the fifth lens group satisfy the following condition expressions (8) and (9);

$$0.025 \leq (\Sigma(\Delta\theta_{gF5i} \times \phi_{5i}))/\phi_W \leq 0.065 \qquad (8)$$

$$0.8 \leq d_{z5}/f_W \leq 1.65 \qquad (9)$$

wherein,
    $\Delta\theta_{gF5i}$; $\Delta\theta_{gF}$ of the i-th lens from the magnification conjugate side which is included in the fifth lens group
    $\phi_{5i}$; a refracting power of the i-th lens from the magnification conjugate side which is included in the fifth lens group $d_{z5}$; a movement amount of the fifth lens group from the magnification conjugate side to the reduction conjugate side during changing of magnification from the telephoto end to the wide-angle end.

6. The variable magnification projection optical system according to claim 1, wherein lenses included in the fifth lens group satisfy the following condition expressions (10) and (11);

$$0.035 \leq (\Sigma(\Delta\theta_{gF5i} \times \phi_{5i}))/\phi_W \leq 0.045 \quad (10)$$

$$1 \leq d_{z5}/f_W \leq 1.65 \quad (11)$$

wherein, $\Delta\theta_{gF5i}$; $\Delta\theta_{gF}$ of the i-th lens from the magnification conjugate side which is included in the fifth lens group $\phi_{5i}$; a refracting power of the i-th lens from the magnification conjugate side which is included in the fifth lens group $d_{z5}$; a movement amount of the fifth lens group from the magnification conjugate side to the reduction conjugate side during changing of magnification from the telephoto end to the wide-angle end.

7. The variable magnification projection optical system according to claim 1, wherein the first lens group is configured to include one or more negative lenses satisfying the following condition expression (12);

$$0.03 \leq \Delta\theta_{gF} \leq 0.055 \quad (12)$$

wherein, $\Delta\theta_{gF} = \theta_{gF} - (0.06438 - 0.01682 \times vd)$ $\theta_{gF} = (n_g - n_F)/(n_F - n_C)$ vd; Abbe number.

8. The variable magnification projection optical system according to claim 1, wherein the first to fourth lens groups satisfy the following condition expressions (13) and (14);

$$|\phi_{14T}/\phi_T| \leq 0.3 \quad (13)$$

$$|\phi_{14W}/\phi_W| \leq 0.3 \quad (14)$$

wherein, $\phi_{14T}$; a composite refracting power of the first to fourth lens groups at the telephoto end $\phi_{14W}$; a composite refracting power of the first to fourth lens groups at the wide-angle end.

9. The variable magnification projection optical system according to claim 1, wherein the first lens group is divided into a plurality of sub lens groups during focusing, and at least one lens group of the plurality of sub lens groups is moved in the optical axis direction during focusing, so that focusing is performed.

10. The variable magnification projection optical system according to claim 9, wherein the plurality of sub lens groups include a 1A-th sub lens group having a totally negative refracting power and a 1B-th sub lens group, and wherein the 1A-th and 1B-th sub lens groups are moved during focusing so as to have different loci.

11. The variable magnification projection optical system according to claim 9, wherein the plurality of sub lens groups include a 1A-th lens group having a totally negative refracting power which is movable during focusing and a 1B-th lens group which is stationary during the focusing.

12. The variable magnification projection optical system according to claim 1, wherein the second lens group is configured to include, in order from the magnification conjugate side to the reduction conjugate side, one or more negative lenses and one or more positive lenses, and wherein the following condition expression (15) is satisfied:

$$1.8 \leq d_{Z2}/f_W \leq 2.5 \quad (15)$$

wherein, $d_{Z2}$; a movement amount of the second lens group from the magnification conjugate side to the reduction conjugate side during changing of magnification from the telephoto end to the wide-angle end.

13. The variable magnification projection optical system according to claim 1, wherein the following condition expressions (16) and (17) are satisfied:

$$f_T/f_W \geq 1.45 \quad (16)$$

$$\omega_W \geq 26.5 \quad (17)$$

wherein, $\omega_W$; a half angle of view at the wide-angle end.

14. An image projection apparatus comprising:

an image forming element which forms image light; and a projection optical system which magnifies and projects the image light formed in the image forming element, wherein the projection optical system is the variable magnification projection optical system according to claim 1.

* * * * *